US012082539B2

(12) United States Patent
Friedman

(10) Patent No.: US 12,082,539 B2
(45) Date of Patent: Sep. 10, 2024

(54) PERSONAL GROWING SYSTEM

(71) Applicant: KYND, LLC, Germantown, MD (US)

(72) Inventor: Elliot Friedman, Germantown, MD (US)

(73) Assignee: KYND, LLC, Germantown, MD (US)

( * ) Notice: Subject to any disclaimer, the term of this patent is extended or adjusted under 35 U.S.C. 154(b) by 25 days.

(21) Appl. No.: 17/503,715

(22) Filed: Oct. 18, 2021

(65) Prior Publication Data

US 2022/0117180 A1    Apr. 21, 2022

Related U.S. Application Data

(60) Provisional application No. 63/093,503, filed on Oct. 19, 2020.

(51) Int. Cl.
*A01G 31/02* (2006.01)
*A01G 7/04* (2006.01)

(52) U.S. Cl.
CPC ............. *A01G 31/02* (2013.01); *A01G 7/045* (2013.01)

(58) Field of Classification Search
CPC ................................ A01G 31/02; A01G 9/027
See application file for complete search history.

(56) References Cited

U.S. PATENT DOCUMENTS

| | | | |
|---|---|---|---|
| 4,212,134 A * | 7/1980 | Brokamp | A01G 9/027 47/82 |
| 4,603,506 A | 8/1986 | Powell, Jr. | |
| 4,625,454 A | 12/1986 | Daniell | |
| 4,860,490 A * | 8/1989 | Morris | A01G 31/02 47/59 R |
| 5,067,275 A * | 11/1991 | Constance | A01G 31/02 47/59 R |
| 6,951,076 B2 | 10/2005 | Winsbury | |
| 8,261,486 B2 | 9/2012 | Bissonnette et al. | |
| 8,549,788 B2 | 10/2013 | Bryan, III | |
| 8,726,568 B2 * | 5/2014 | Wilson | A01K 63/003 47/62 R |
| 8,904,705 B2 | 12/2014 | Downs, Sr. | |
| 9,763,392 B2 * | 9/2017 | Luciano, Jr. | A01G 17/06 |
| 9,974,243 B2 | 5/2018 | Martin | |
| 10,004,186 B2 | 6/2018 | Daugirdas | |
| 10,070,600 B2 * | 9/2018 | Orff | A01G 31/02 |

(Continued)

FOREIGN PATENT DOCUMENTS

| | | |
|---|---|---|
| EP | 1257164 B1 | 4/2005 |
| WO | 2015072076 A1 | 5/2015 |

OTHER PUBLICATIONS

International Search report PCT/US2021/055500 dated Jan. 31, 2022 (pp. 1-2).

(Continued)

*Primary Examiner* — Monica L Perry
(74) *Attorney, Agent, or Firm* — MILLEN, WHITE, ZELANO & BRANIGAN, P.C.; Ross James Christie

(57) ABSTRACT

The present invention relates to a modular personal growing system (PGS). The components of a PGS are designed to work in unison to grow plants hydroponically from seed to maturity. A PGS can be scaled and configured into a desired interior or exterior space requirement for residential or commercial use. The individual components of a PGS may include a stand, a trellis, a vessel, a luminaire and an enclosure.

23 Claims, 56 Drawing Sheets

(56) References Cited

U.S. PATENT DOCUMENTS

| | | | |
|---|---|---|---|
| 10,219,446 B2 * | 3/2019 | Paquette | F21V 11/186 |
| 10,349,588 B2 * | 7/2019 | Yano | A01G 31/00 |
| 10,433,498 B1 * | 10/2019 | Finch | A01G 17/06 |
| 10,602,686 B2 * | 3/2020 | Taylor | A01G 27/003 |
| 10,757,875 B2 * | 9/2020 | Loiske | A01G 7/045 |
| 10,869,436 B2 * | 12/2020 | Warrick | A01G 31/02 |
| 11,044,857 B1 * | 6/2021 | Goodwin | A01G 31/02 |
| 11,229,169 B2 * | 1/2022 | Mendes | A01G 31/02 |
| 11,533,860 B2 * | 12/2022 | Stevenson | A01G 9/027 |
| 11,622,510 B2 * | 4/2023 | Spiro | A01G 9/249 47/62 R |
| 2008/0302008 A1 * | 12/2008 | Jung | A01G 9/027 47/79 |
| 2009/0126269 A1 | 5/2009 | Wilson et al. | |
| 2009/0313894 A1 | 12/2009 | Bieber | |
| 2011/0154985 A1 | 6/2011 | Mittelmark | |
| 2011/0232190 A1 | 9/2011 | Pindus et al. | |
| 2012/0085026 A1 * | 4/2012 | Morris | A01G 31/06 47/62 A |
| 2016/0026232 A1 | 9/2016 | Yamane | |
| 2018/0007845 A1 | 1/2018 | Martin | |
| 2018/0368346 A1 * | 12/2018 | Watson | A01G 31/06 |
| 2019/0327921 A1 * | 10/2019 | Nelson | A01G 9/02 |

OTHER PUBLICATIONS

Bakeer, Hegab, El-Behairy, U El-Sawy, Effect Micro Irrigation Systems, Misr J. Ag. & Eng., 32 (2): 589-610, 2015, p. 607, Conclusion, //journals.ekb.eg.

* cited by examiner

PERSONAL GROWING SYSTEM

The present invention relates to a modular personal growing system (PGS). The components of a PGS are designed to work in unison to grow plants hydroponically from seed to maturity. A PGS can be scaled and configured into a desired interior or exterior space requirement for residential or commercial use. The individual components of a PGS may include a stand, a trellis, a vessel, a luminaire and an enclosure.

FIELD

The present invention pertains to the general field of horticulture and more specifically to systems and methods of plant agriculture, hydroponics, aeroponics and lighting for residential, commercial, indoor and outdoor hydroponic systems.

BACKGROUND

Hydroponics involves the cultivation of plants grown in a nutrient solution, specifically without the presence of soil. One skilled in the art is well aware of the labor needed to move the water within a hydroponic system and can understand the need for an apparatus which can alleviate the associated labor. Hydroponic systems attempt to produce better results than soil based systems by providing the user with a device or plurality of devices to specify and deliver environmental parameters which can provide an ideal density and variety of nutrients, dissolved oxygen, physical plant support, light spectrum, duration and density, temperature, humidity and air composition for a plant throughout all life phases.

Typical hydroponics systems utilize a plurality of devices comprising ergonomic, space conserving and modular design features. However, typical hydroponic systems are incomplete or are only built towards one type of use, are time consuming or have a negative impact on the maturity and or overall health of a plant.

Typical hydroponic systems do not allow adequate volume under a vessel for maintenance, do not offer adequate space for a mature plant, and/or do not allow for adequate space for maintenance of a reservoir vessel without lifting the growing vessel lid, and/or do not allow for adequate lamp movement to accommodate mature plant growth. Typical hydroponic systems also not utilize a plurality of modular vessels comprising specific abilities which can be formed from one standard vessel.

In typical hydroponic systems drainage and maintenance of the reservoir vessel is impeded by the growing lid and the live plants above and a centralized lamp will not provide adequate light for a plant to reach maturity. Additionally, typical hydroponic systems have exposed electrical connections which create a danger to the user and the apparatus if used outdoors. Additionally, the volume under the growing vessel and vessel support does not allow for maintenance. The roots of a plant within the growing vessel will eventually block the spray from a nutrient solution emitter and in turn cease aeration of the nutrient solution causing root damage and plant death.

In typical hydroponic systems the growing lid which contains a plurality of live seedlings must be removed and replacement of the lid causes damage to the roots of the live plants.

Thus, typical hydroponic systems are incomplete. The present invention overcomes the drawbacks and problems of the currently available hydroponic systems.

In addition, the prior art does not sufficiently provide a combination of the total known methods of hydroponic system assembly and use provided in the description herein to yield predictable results, wherein a simple substitution is not understood as simple if one skilled in the art requires extensive trials and experimentation to yield the devices and specific elements within the present invention. It will also be appreciated that there are a plurality of novel elements which have not been identified within the prior art and must be understood with the totality of devices within the present invention.

The present invention improves upon the prior art by providing a complete and extensive plurality of modular horticultural devices which can integrate into one hydroponic personal growing system intended tor residential or commercial, indoor or outdoor use which can support one or a plurality of a variety of desired plants from seed to maturity in a space conserving, ergonomic, simple, sustainable and infinite construction method.

SUMMARY

The present invention relates to a modular personal growing system (PGS). The components of a PGS are designed to work in unison to grow plants hydroponically from seed to maturity. A PGS can be scaled and configured into a desired interior or exterior space requirement for residential or commercial use. The individual components of a PGS may include a stand, a trellis, a vessel, a luminaire and an enclosure. Briefly, a personal growing system comprises at least one vessel for holding liquid. A vessel comprising a horizontal vessel floor (57) having at least one horizontal floor aperture (58) and at least one vessel wall (63). Optionally, a vessel comprising a liquid fill/capacity line (69) spaced above a vessel floor. An air pump support plateau (60) is spaced above a vessel floor and is capable of supporting an air pump. At least one of a vessel walls (63) comprising a vessel connection aperture (52) which allows for a connection of two or more vessels. A vessel is supported on a stand adapted to optionally connect to a plurality of additional PGSs and or PGS devices. A stand is preferably composed of at least one leg having a leg mounting aperture (6) and at least one crossbeam comprising a mounting aperture (8). A stand and vessel can be constructed and considered one device. In the preferred embodiment as presented in FIG. 2, a stand crossbeam (4) secures one stand leg (16) to another stand leg; wherein preferably a plurality of four crossbeams are bonded to a plurality of four stand legs.

Upon further study of the specification and appended claims, further objects and advantages of this invention will become apparent to those skilled in the art.

BRIEF DESCRIPTION OF THE DRAWINGS

Various features and attendant advantages of a Personal Growing System (PGS) of the present invention will be more fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
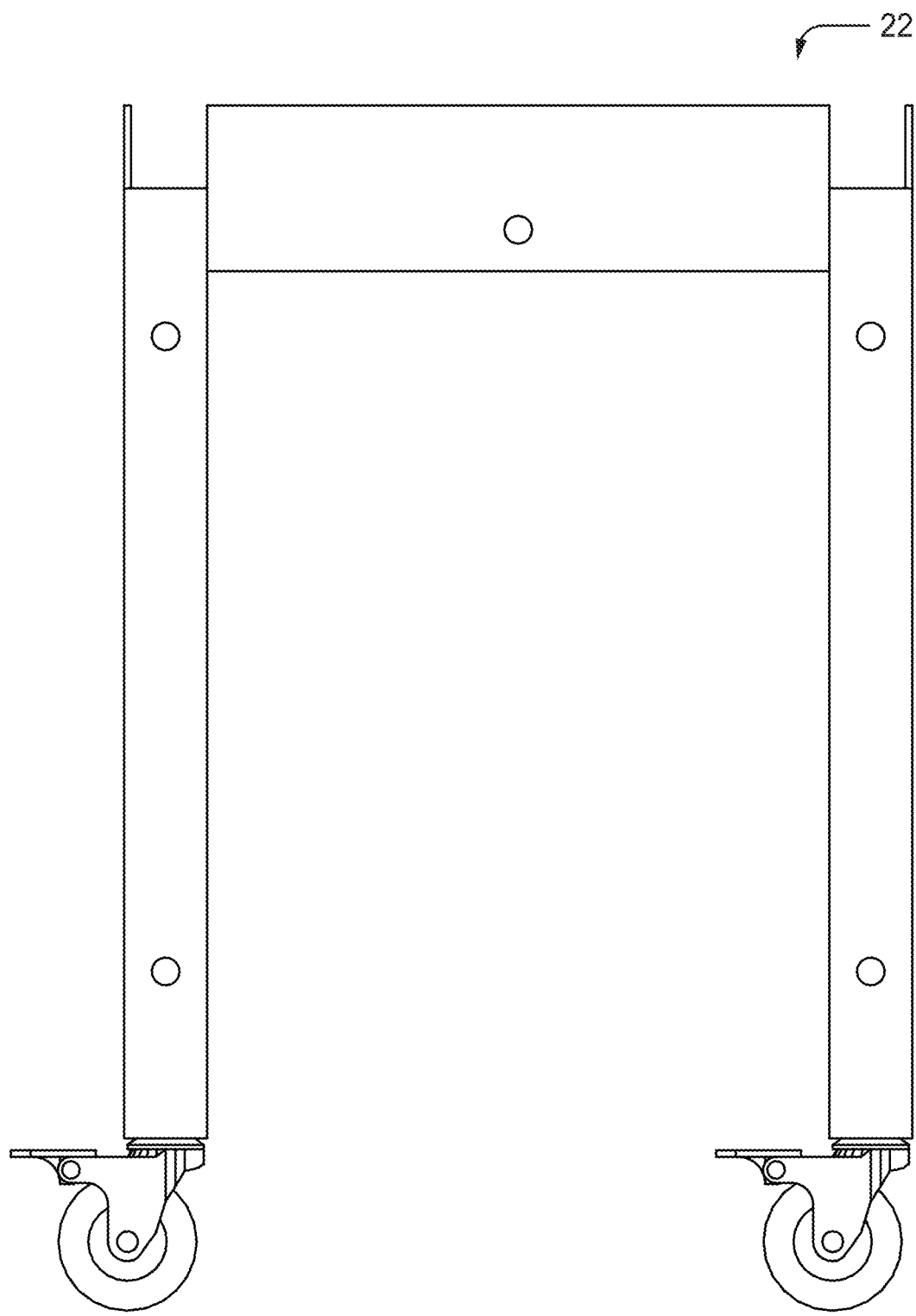
FIG. 1 is a side elevation view of a stand device for growing plants and seedlings.
Figure 2:
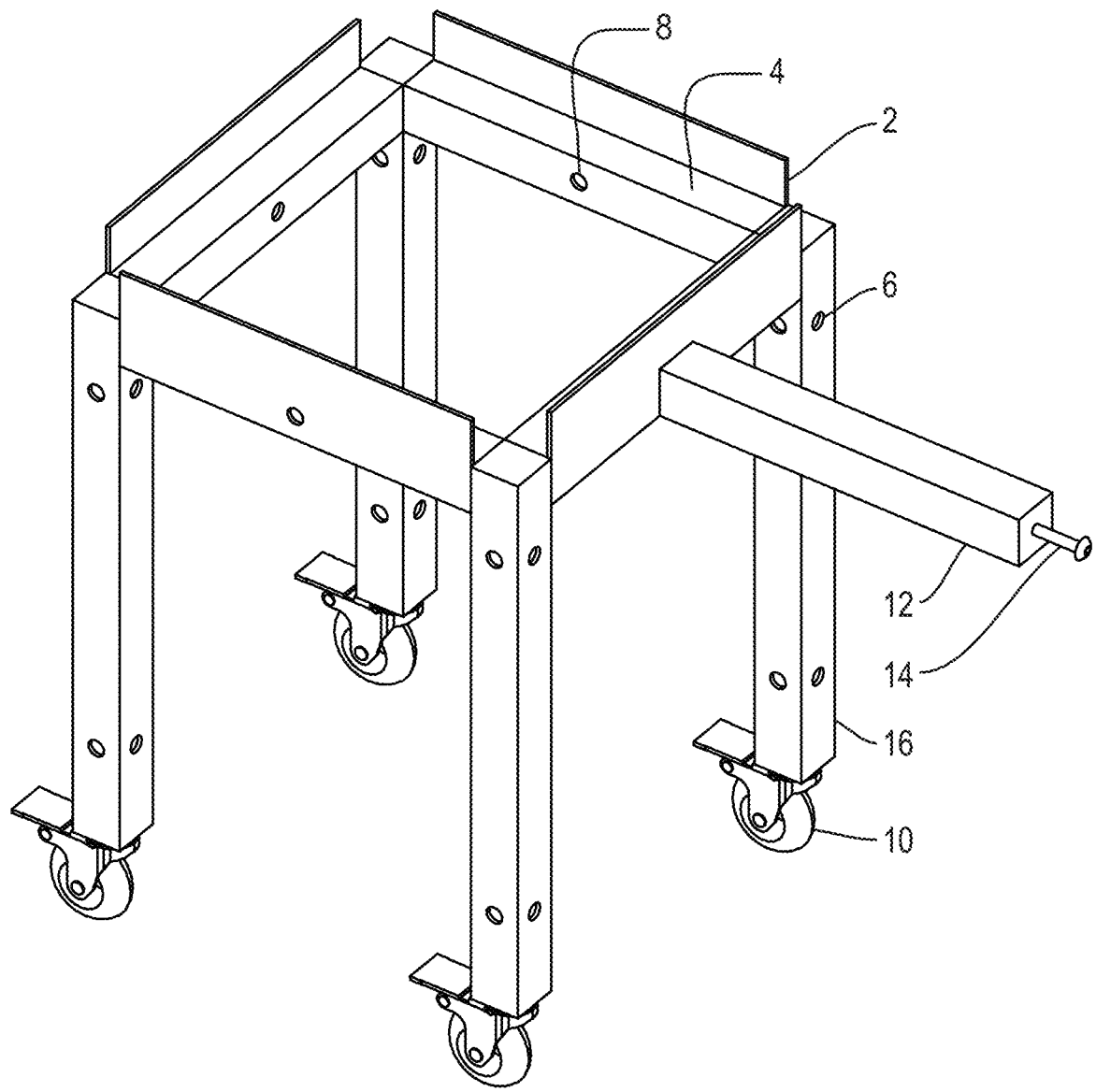
FIG. 2 is a perspective view of the device of FIG. 1 incorporating one stand connection beam.

An embodiment of modular devices which have the ability to form a Personal Growing System (PGS) are illustrated in the included figures as a stand 22 presented in FIGS. 1-4 and a trellis 45 in FIGS. 30-36, which act as an infrastructure on which a vessel body 46 and vessel lid 48 in FIGS. 5-29 can be supported and from which a luminaire 140 in FIGS. 37-46 and a respective enclosure 224 and 232 in FIGS. 37-53 can be suspended.

While this description provides one preferable method of constructing a PGS and growing plants 125 or seedlings 93 within, it will be appreciated that the invention is not limited to the exact specifications of the preferred embodiment, construction, operation and materials described and illustrated, that there are infinite successful methods of securing a stand 22, a vessel 46 and 48, a trellis 45, a luminaire 140, an enclosure 224 and 232 and any horticultural accessory described herein with or without securing hardware and that multiple modifications, equivalent substitutions, alterations to the embodiments disclosed herein will be apparent to one of skill in the art of hydroponics.

It will be understood that a growing volume is defined as the restricted volume in which a desired plant 125 or seedling 93 is allowed to grow within any PGS device.

Powered accessories utilized within and around water are designed and recommended to be utilized in conjunction with a ground fault connection interrupter device 74 for the safety of the user, the property of the user and any PGS device. It will be appreciated that any electrical device utilized within a PGS can be directly or indirectly powered with electricity obtained from renewable energy not limited to solar, wind, geothermal and water.

The embodiment of devices described herein can be utilized and modified to grow a plant at any stage of life from seed to maturity through all phases of plant growth not limited to germination, rooting of cuttings, seedling growth, vegetative growth, flowering growth, pollination, fertilization and fruiting within virtually any phylum, class, order, family, genus, species, variety, cultivar and hybrid, however priority is given to those plants which enhance and sustain human life and produce the highest return on investment of time and capital; wherein prime examples without limitation of plants which can thrive within a PGS include *Brassica oleracea, Cannabis indica, Cannabis sativa, Capsicum annuum, Cucumissativus, Curcurbita pepo, Ocimumbasilicum, Phaseolus vulgaris* and *Solanumlycopersicum.*

The present invention has been described in conjunction with standard hydroponic and aeroponic methods which can be understood as but not limited to deep water culture, top drip, drip irrigation, raft system, nutrient film technique, wick system, Kratky system, bato buckets and fogger technique; wherein all credit and respect is due to the inventors and pioneers of the hydroponic methods stated herein and no claim is made with regard to any individual hydroponic method. It will be appreciated that the invention described herein can be configured to operate within an aquaponic system. It will be appreciated that the term liquid, water and nutrient solution can be interchanged depending on the application and are deemed equal in regards to their meaning as it pertains to any device within a PGS. It will be appreciated that the term aperture, opening, gap, slit, perforation and the like can be interchanged depending on the application and are deemed equal in regards to their meaning as it pertains to any device within a PGS. It will be appreciated that the present invention is intended to and can be used with standard integrated pest management practices not limited to inspection, identification, physical elimination, implementation of control measures, and evaluation. It will be appreciated that the following description will be presented from a general understanding of hydroponics and plant biology.

Stand

A stand 22 as presented in FIG. 1 is the first of two basic components forming a Personal Growing System (PGS); wherein the modular structure of a stand creates a strong and level foundation for a vessel body 46, a trellis 45 and or bracket 20 to be secured. It is possible to construct a PGS with a plurality of stand devices that can range from one to infinity, wherein a PGS is infinite in size.

A stand is the foundation for a PGS utilizing any high flexural strength material that is resistant to oxidation and degradation; wherein preferably a stand leg 16, a crossbeam 4, a connection beam 12, casters 10, a bracket 20 and securing hardware 14 are comprised of aluminum, zinc plated steel, stainless steel, carbon fiber or any other high flexural strength material that resists oxidation without limitation.

A stand 22 is comprised of at least one stand leg 16 and one stand crossbeam 4; wherein the two devices can be constructed and considered one device. In the preferred embodiment as presented in FIG. 2, a stand crossbeam 4 secures one stand leg 16 to another stand leg; wherein preferably a plurality of four crossbeams are bonded to a plurality of four stand legs with the intent to support a minimum of the weight and dimensions of a vessel body 46 and vessel lid 48 filled with nutrient solution to a desired water-line 69 and a maximum of the weight and dimensions of all devices, possible accessories, materials and plants listed in the description herein.

Vertical protrusions 2 on the distal plane of the stand crossbeam 4 provide a preferable method to secure the vessel body 46 to the stand. It will be appreciated that the method described herein of securing a vessel to a stand 22 can be accomplished with a plurality of extensions, indentions or additional hardware within a stand or a vessel.

Figure 3:
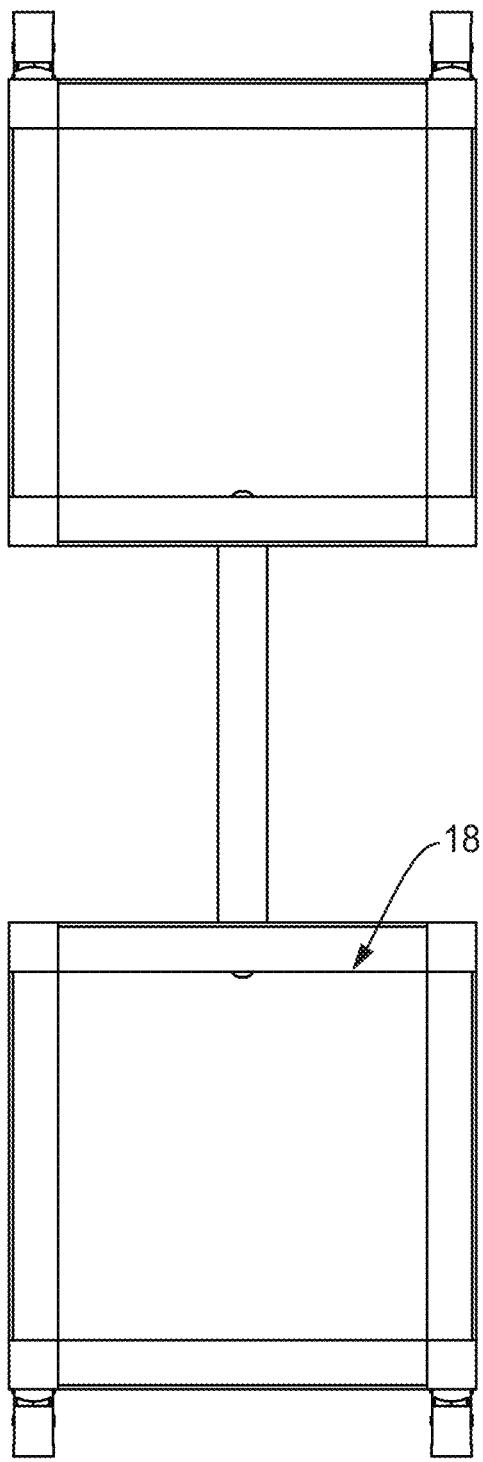
FIG. 3 is a top plan view of two devices of FIG. 1 incorporating one stand connection beam.
Figure 4:
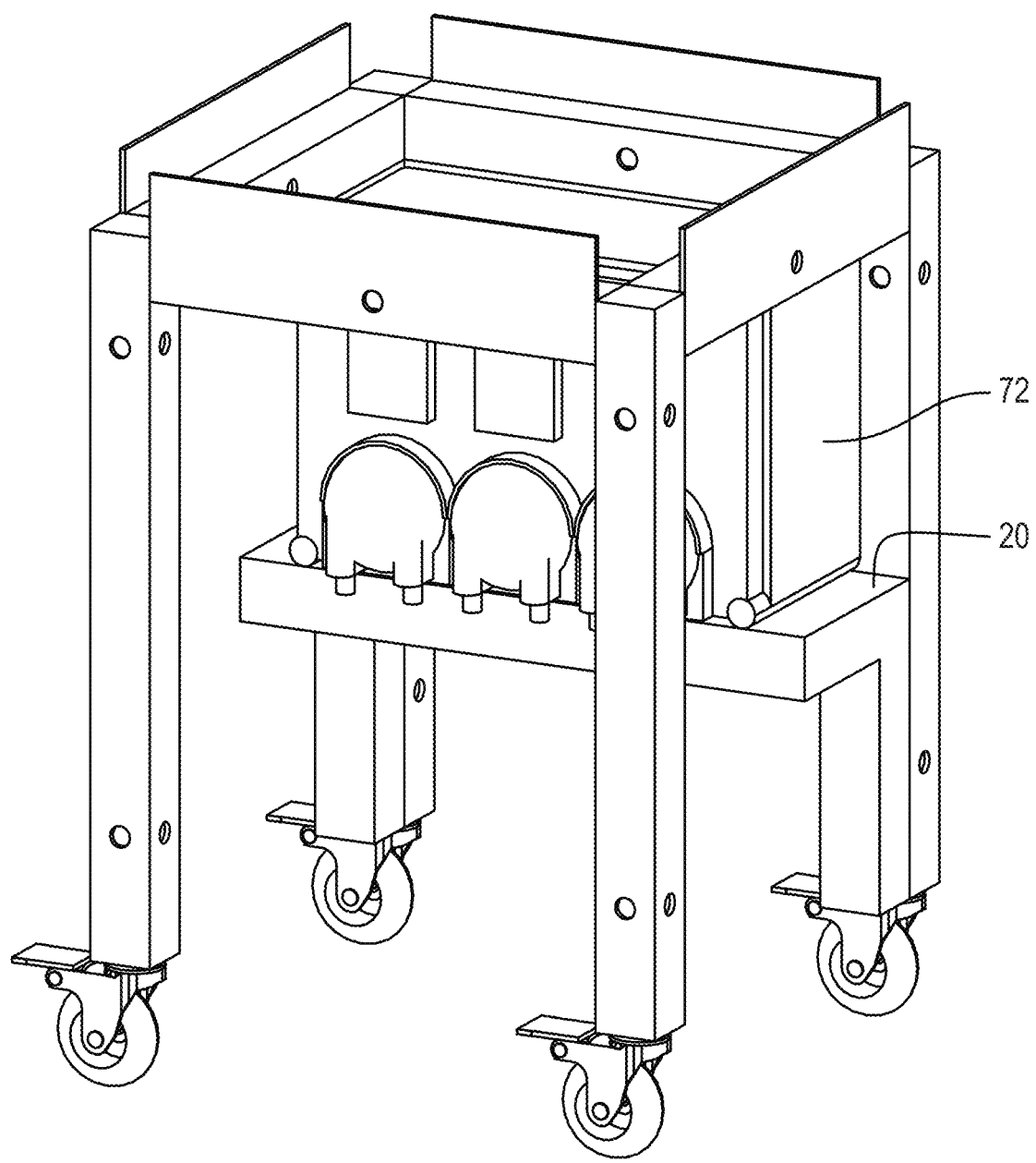
FIG. 4 is a perspective view of the device of FIG. 1 incorporating a stand bracket supporting a standard hydroponic automatic fertigation device.
Figure 5:
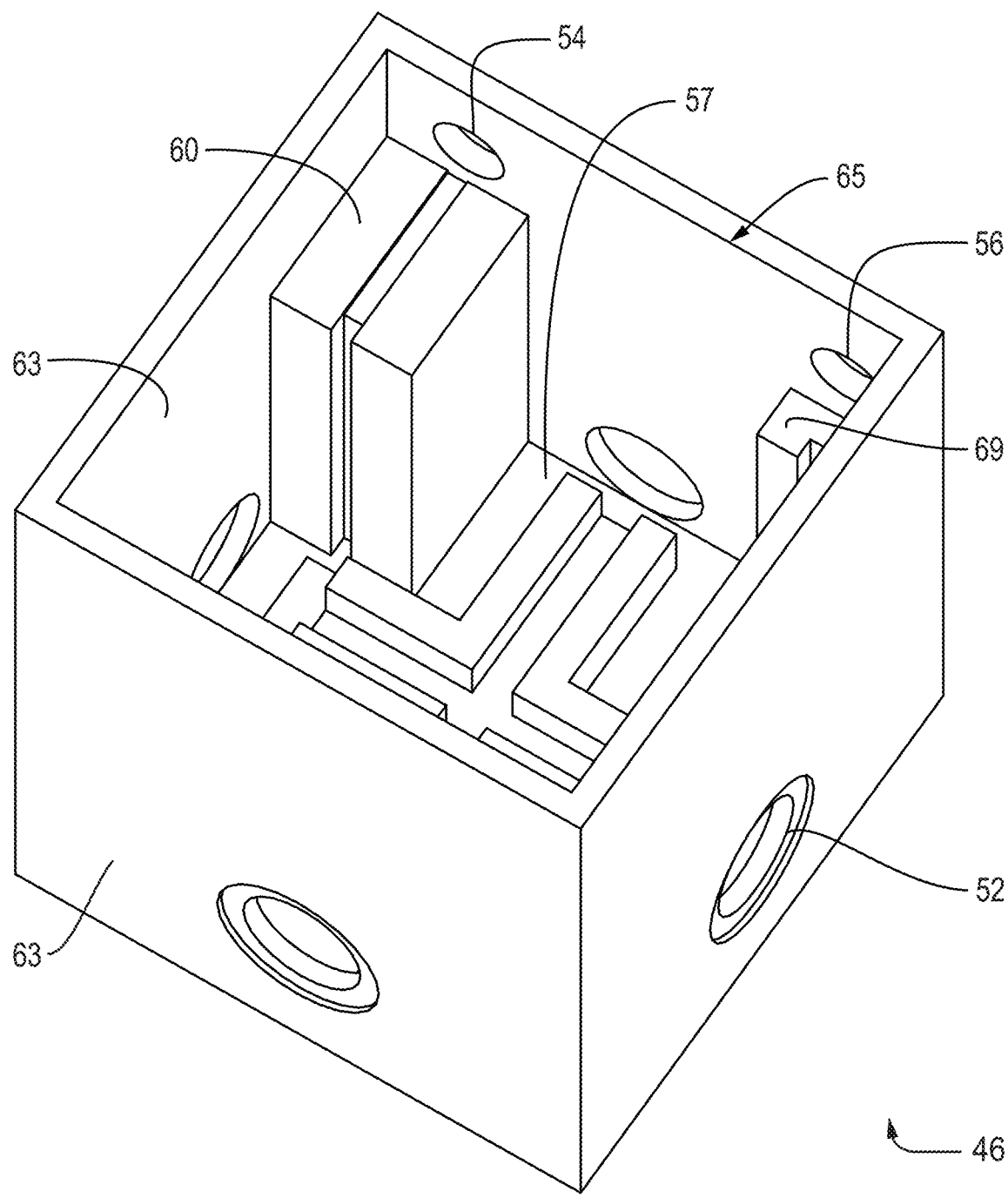
FIG. 5 is a perspective view of a vessel body device for growing plants and seedlings.
Figure 6:
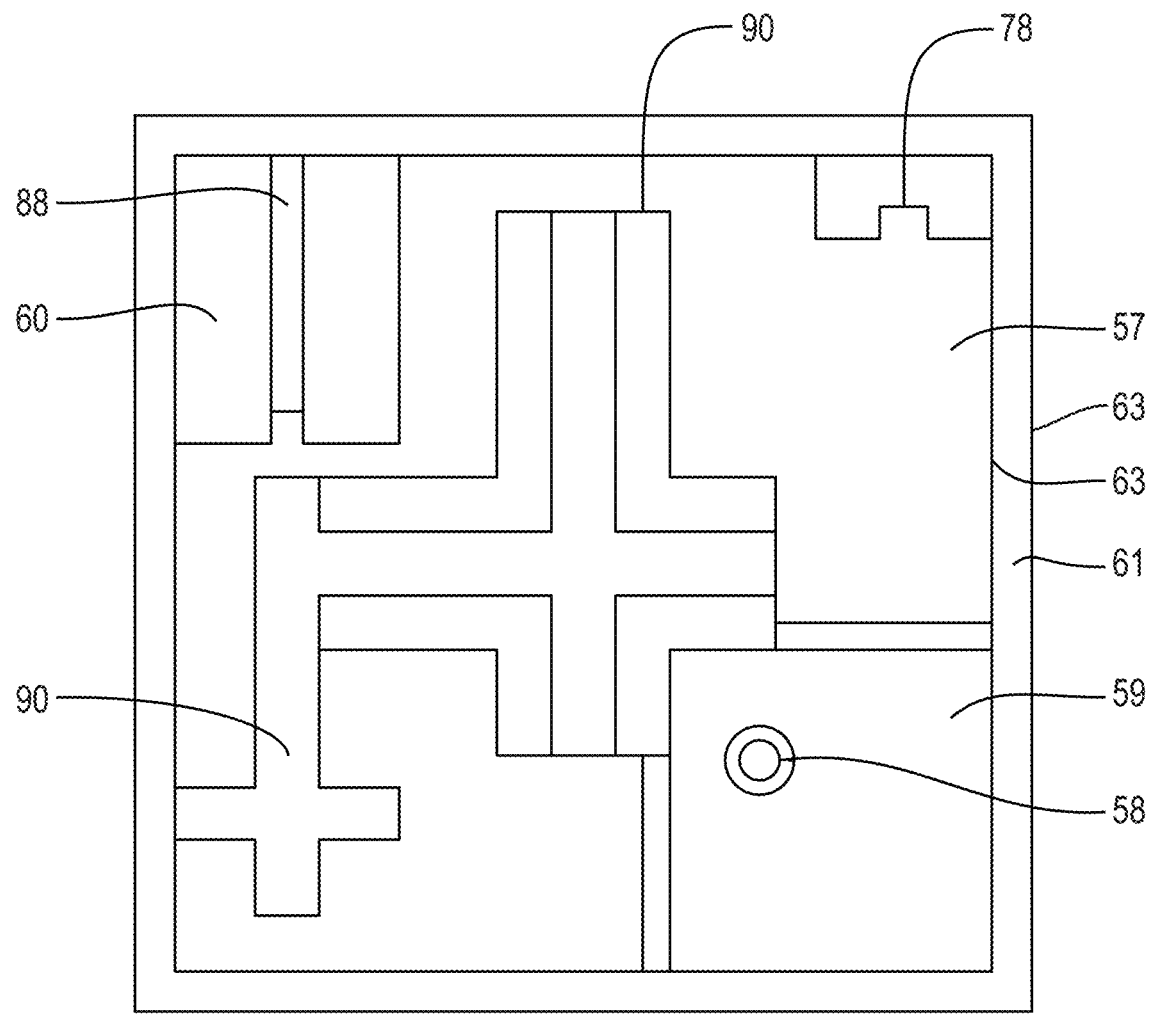
FIG. 6 is a top plan view of the device of FIG. 5.

Preferably as presented in FIG. 3, a stand crossbeam 4 provides a mounting aperture 8 from which a stand connection beam 12 utilizing stand securing hardware 14 can provide a strong connection from one stand to another stand. It will be appreciated that the strength and stability of a PGS increases when a stand connects to another stand utilizing a connection beam and can be constructed to an infinite size.

At least one leg on a stand provides at least one mounting point to bond a bracket 20 to support an additional or a plurality of hydroponic accessories or devices not limited to an automatic fertigation device 72 and or a trellis 45. A bracket 20 can be of any dimension with respect to a stand 22 which allows for the support and installation of an additional hydroponic accessory. In the preferred embodiment as presented in FIG. 2, a stand 22 comprising a plurality of two mounting apertures 6 on every plane of a stand leg 16 which offers the user a variety of modular installation mounting points to ensure the strength and stability of a desired connection to an accessory or a device not limited to a bracket 20 as presented in FIG. 4 which utilizes securing hardware 14 and or a trellis 45 which utilizes securing hardware 30 as presented in FIG. 33. It will be appreciated that the method described herein is one of an infinite plurality of methods of securing a bracket 20 and or a trellis 45 to a stand 22.

Preferably, a caster 10 with the ability to restrict movement and to self-level is installed on the inferior end a of a stand leg 16 to provide mobility, stability and safety to a stand 22 and therefore to a PGS. A stand is not limited to self-level by means of a caster and may utilize feet, pistons, levers, hinges and lasers. In addition, the ability of a stand 22 to self-level can create a level connection to a plurality of stands via a plurality of crossbeams 12 utilizing stand securing hardware 14 ensuring potential connections between respective vessels are also level ultimately preventing water leaks from unlevel plumbing.

A preferable minimum dimension of a stand is approximately one cubic foot or 0.03 cubic meter; wherein utilizing the volume under a stand 22 and a maintenance access aperture 18, a stand can provide an ideal space to facilitate hydroponic maintenance functions under a vessel not limited to nutrient solution filling and drainage, connecting threaded tubing 85 and installing automatic fertigation device 72 sensors and dosing tubing while providing an ergonomic height for the user to access and maintain plant growth above a vessel.

Vessel

A vessel is the second of two essential devices required in order to form a PGS; wherein a preferable embodiment of a vessel is comprised of a vessel body 46 and a vessel lid 48. The size and dimensions of a vessel directly affect the dimensions and the structural integrity of the stand, trellis, luminaire and enclosure. The preferable dimensions of the vessel are dictated by the maximum transpiration rate of the desired plant 125 or seedling 93 to be grown when a PGS is utilized outdoors in direct sunlight without a vessel fill valve 80 in a desired geographical location; wherein a mature *Solanumlycopersicumcan* transpire between five to ten gallons of water per day in the warmest months of the year in direct sunlight with low humidity. It is also preferable to maintain a minimum volume under a stand similar to the volume of the liquid contained in the vessel supported above to enable successful manual drainage from gravity alone. It is possible to construct a vessel and a stand as one unit; however it is preferable to separate the two devices due to the differences in preferable materials of each device and the increased simplicity of operating and maintaining a separate vessel device.

A vessel body 46 and lid 48 are preferably opaque, reflect solar radiation, resist thermal conductivity and are comprised of any non-porous material suitable to hold liquid; wherein a vessel is preferably manufactured from a plastic, a plastic polymer, a resin or a reinforced resin which can include materials such as; polyvinyl chloride, polyethylene, polypropylene, carbon, glass, graphite, polyacrylonitrile, epoxy, polyester, nylon, urethane, rayon and petroleum pitch.

Figure 11:
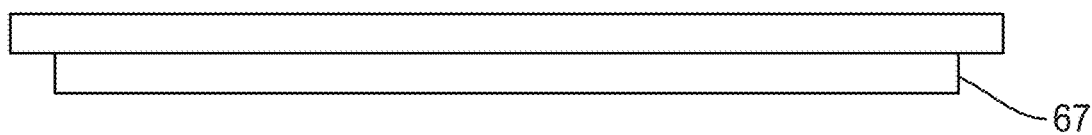
FIG. 11 is a side elevation view of the device of FIG. 10.

A vessel lid 48 can be secured within the superior horizontal aperture of a vessel body 65 in order to prevent evaporation and aid in pest management. A vessel lid as presented in FIG. 11 is preferably secured to a vessel body 46 utilizing an indentation 67 around the inferior perimeter of a vessel lid 48 which is set within and secured onto the superior vessel walls 63; wherein the preferred final installed lid fitment is presented in FIG. 19. It will be appreciated that any securing hardware or acceptable shape which permits the vessel lid to secure to the vessel body are sufficient.

Figure 12:
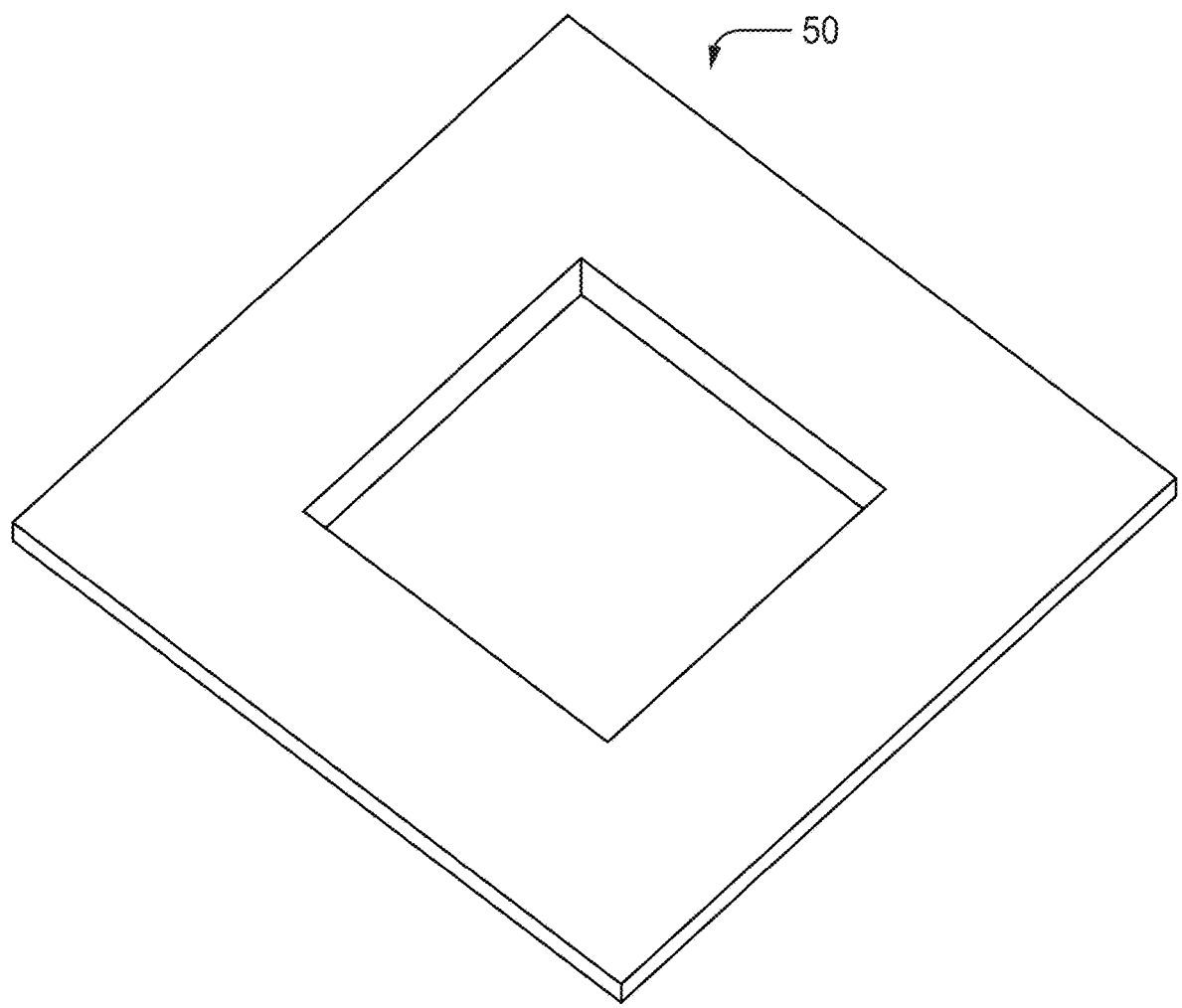
FIG. 12 is a perspective view of a growing lid device for growing plants and seedlings.
Figure 13:
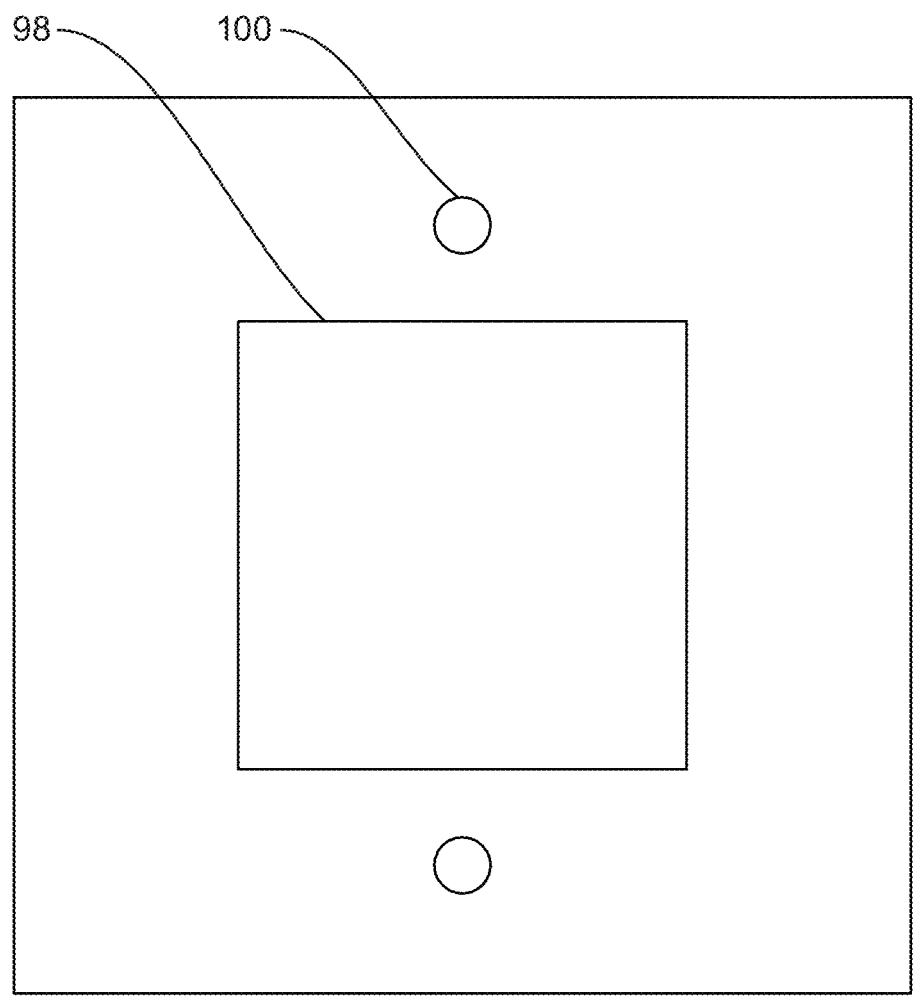
FIG. 13 is a top plan view of the device of FIG. 12 incorporating a plurality of two auxiliary apertures.
Figure 14:
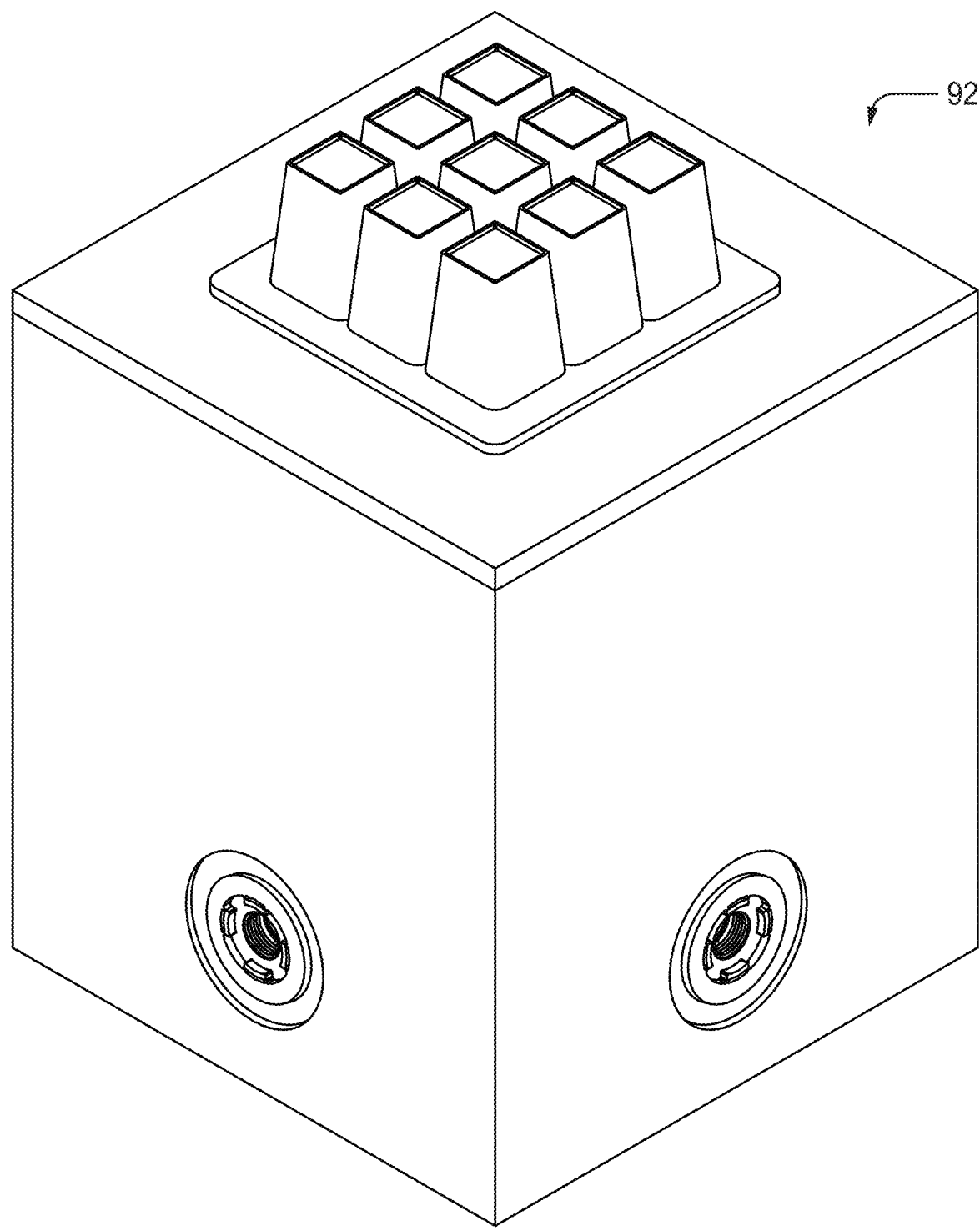
FIG. 14 is a perspective view of a propagation vessel device for germinating seeds to produce plants and plant seedlings.
Figure 15:
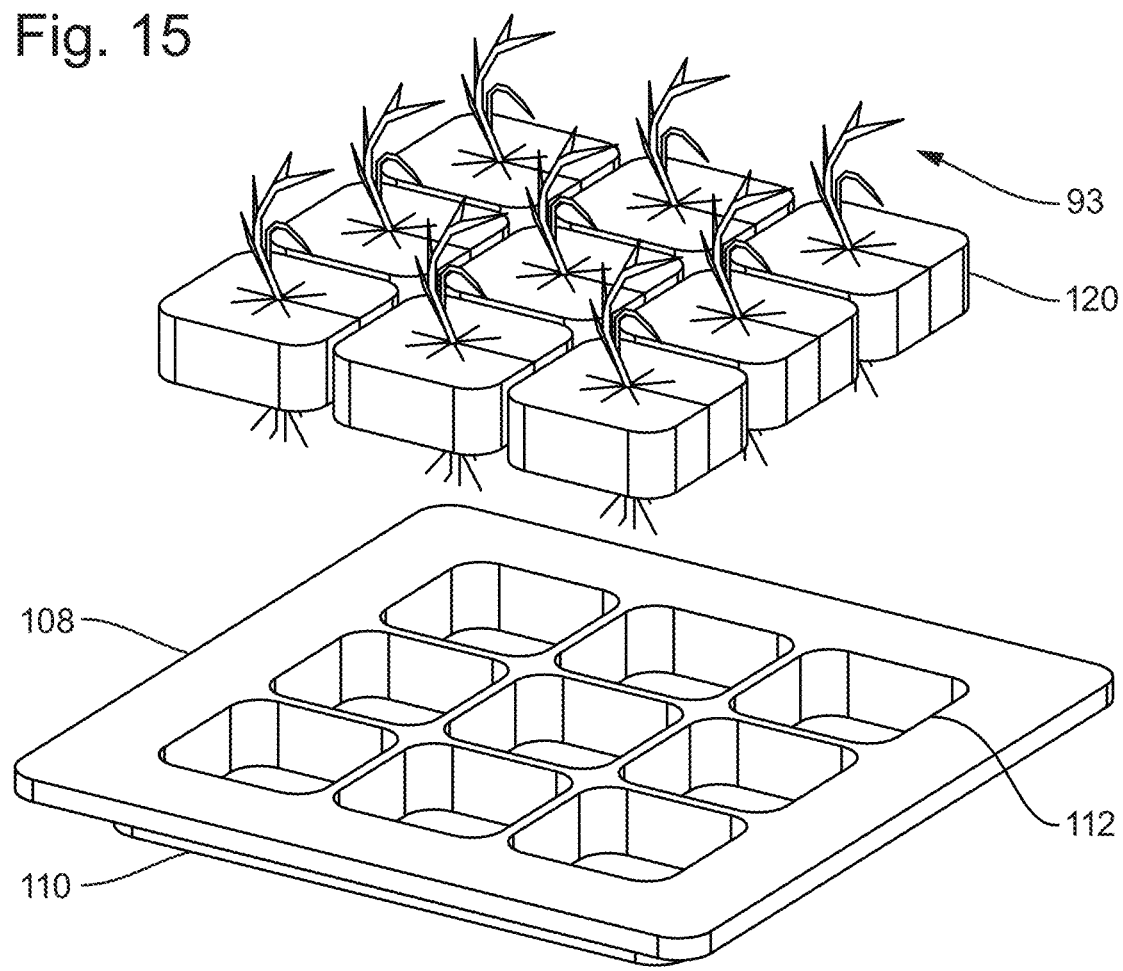
FIG. 15 is an exploded perspective view of seedlings within a propagation lid device and a plurality of propagation clamp devices from the device of FIG. 14.

A vessel lid 48 can contain one or a plurality of apertures 98 and 100 as presented in FIG. 13 which can be of any shape upon plan view; wherein a vessel lid 48 comprising one or a plurality of apertures is designated as a growing lid (GL) 50 as presented in FIGS. 12 and 13.

A vessel's walls 63, a vessel floor 57 and a vessel lid 48 can be solid or preferably contain a singular void 61 or plurality of voids within to provide an insulating layer of gasses, liquids or solids to maintain a nutrient solution at a buffered and more uniform temperature within a vessel interior.

A vessel preferably comprising at least one vertical aperture located on a vessel wall 63 which can function as a vessel connection aperture 52, an overflow control aperture 56 or an electrical cord passage aperture 54 and 56. A vessel connection aperture is designated to provide a connection to another vessel and with an option of being closed utilizing an end-cap 94 or open utilizing a connecting pipe 62. As preferably presented in FIG. 29, a connection between vessels can include a plurality of two connecting pipes 62 and a ball valve 64 which stops water flow between vessels so that a vessel can be added or removed while a PGS is in use. It will be appreciated that the connection between vessels can be accomplished with one connecting pipe or without a ball valve. Preferably a vessel connection aperture 52 is located in a uniform fixed inferior position along the vertical centerline of each vessel wall. Utilizing this modular design method, vessels supported by their respective stands within a PGS which utilize their respective connecting devices can be drafted in a top plan view space plan, in any pattern required, utilizing their basic length and width measurements to design a PGS that meets the space and yield requirements of the user in an infinite construction. Any non-vessel connection vertical aperture can be utilized to pass electrical cords 123 for powered accessories within the vessel not limited to an air pump 66, a water pump 68, a water heater 70, a water fogger 104, an automatic fertigation device 72 and a sensor circuit. A vessel overflow aperture 56 is indicated by its relative inferior vertical position in relationship to all other non-vessel connection vertical apertures. Due to its lower positioned height, an overflow aperture 56 functions as a safety measure to expel and prevent nutrient solution from coming into contact with an air pump 66 located on the air pump plateau 60. It will be appreciated that an overflow control aperture 56 can function as an electrical cord passage aperture 54, but the inverse is not always true based on the ability of a non-vessel connection vertical aperture with a superior relative vertical position to an overflow control aperture to contact a water-line 69.

Figure 21:
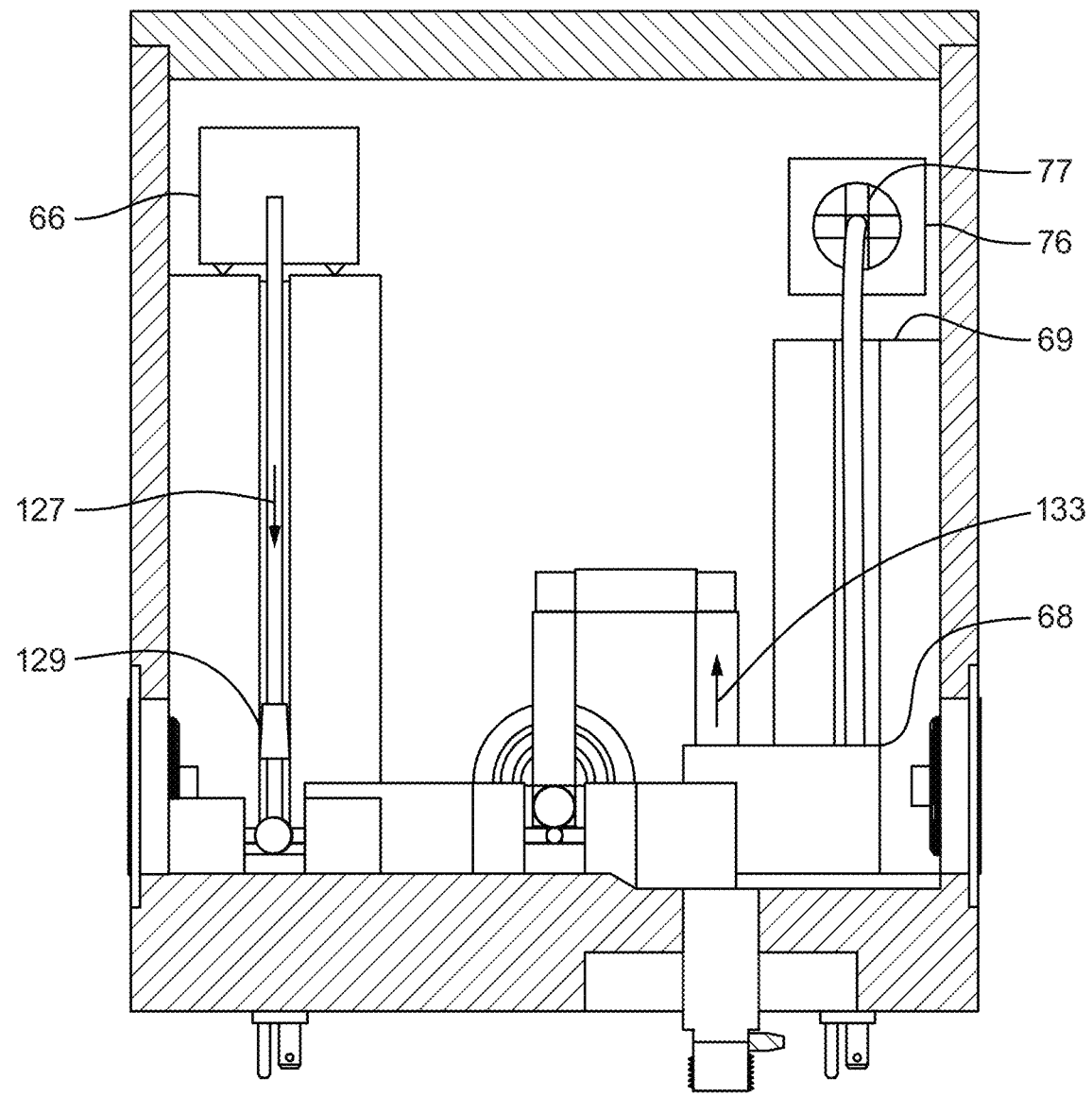
FIG. 21 is a cross-sectional view along line XXI-XXI of FIG. 20.

A grommet 76 inserted within a non-vessel connection vertical aperture is presented in FIG. 21, with the intention to center, protect and reduce strain from the electrical cords passing through an electrical cord passage aperture 54. A grommet 76 can contain a grommet recess 77 to accept a grommet plug 107 preferably comprised of closed-cell foam to prevent the loss of moisture from a vessel. Grommets can be manufactured out of any material suitable to protect and safely pass electrical cords while providing a snug fitment suitable for the application of the aperture required not limited to neoprene, ethylene propylene diene monomer rubber, natural rubber, nitrile, silicone, fluoropolymer elastomer, vinyl, styrene butadiene, butyl and chlorosulfonated polyethylene.

A water-line 69 (i.e., liquid fill/capacity line), embodied in any form, can be utilized to indicate an optimal nutrient solution level. Preferably as presented in FIG. 21, a water-line 69 is indicated by a plateau rising from a vessel floor 57 located below an overflow aperture 56 comprising a relief 78 to center and support electrical cords.

As presented in FIG. 21, a vessel preferably comprising an optimal area to contain an air pump 66 above a water-line 69 and a water pump 68 below a water-line in order to maintain a minimum pressure desired in the respective collective tubing within a PGS; wherein a PGS can be designed to an infinite size. An air pump plateau 60 supports an air pump 66 above a water-line 69 and preferably comprising a relief 88 for nutrient solution drainage and tubing support. It will be appreciated that any vessel form or accessory within a vessel which allows an air pump to be safely installed above a water-line 69 is acceptable. A water pump can be installed on a vessel floor 57 preferably in proximity to an electrical cord passage aperture 54.

An interior vessel floor 57 preferably comprising at least one inferior horizontal floor aperture 58 located on the most inferior vessel floor drainage plane 59 to provide an optimal location for drainage and filling of nutrient solution, and connections for hydroponic accessories not limited to threaded tubing 85, a ball valve 84, a fill valve 80 and a water chiller 82. It will be understood that drainage and filling can occur through the same horizontal floor aperture 58 with the use of one or a plurality of the before mentioned devices.

Figure 7:
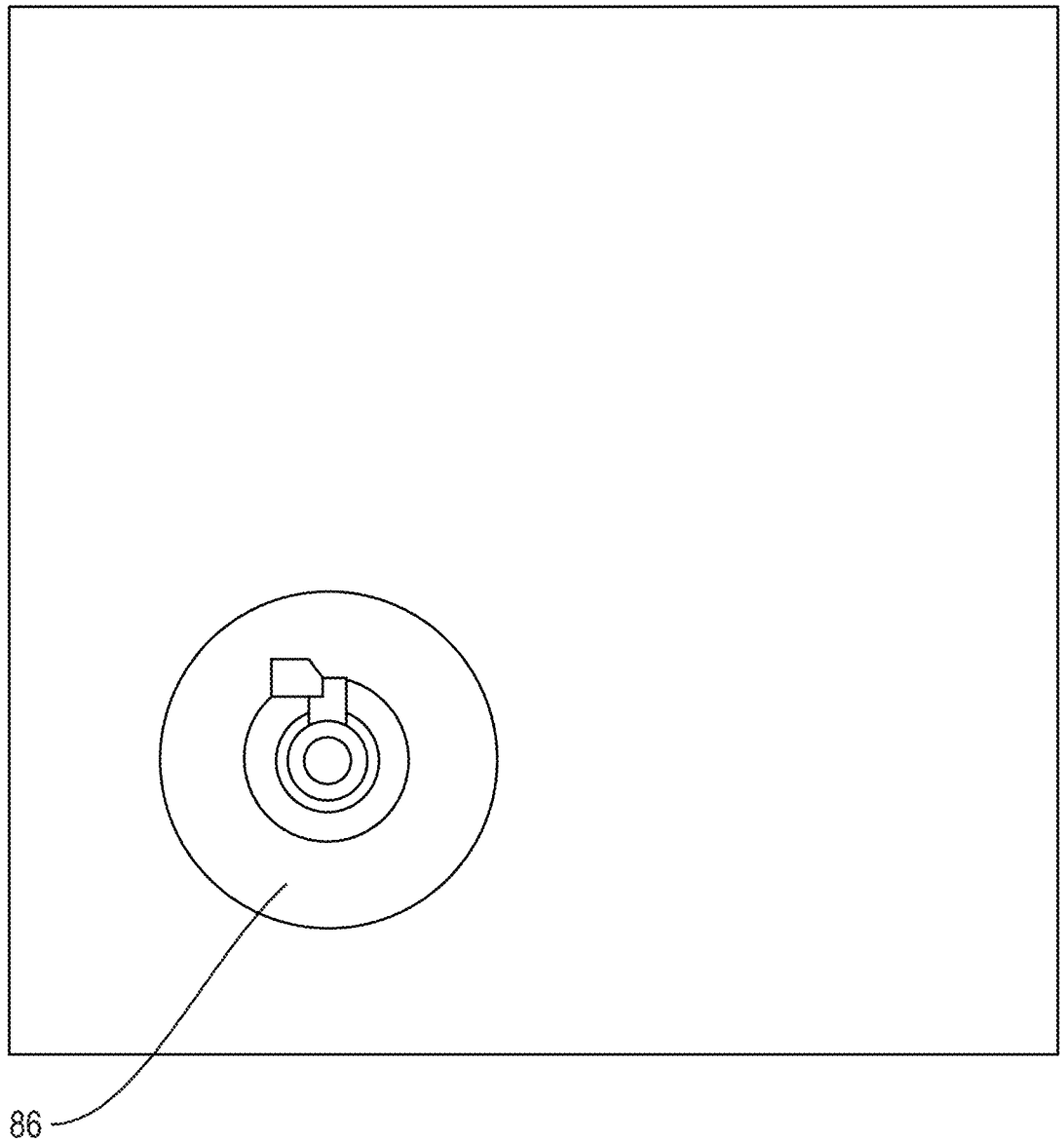
FIG. 7 is a bottom plan view of the device of FIG. 5.
Figure 8:
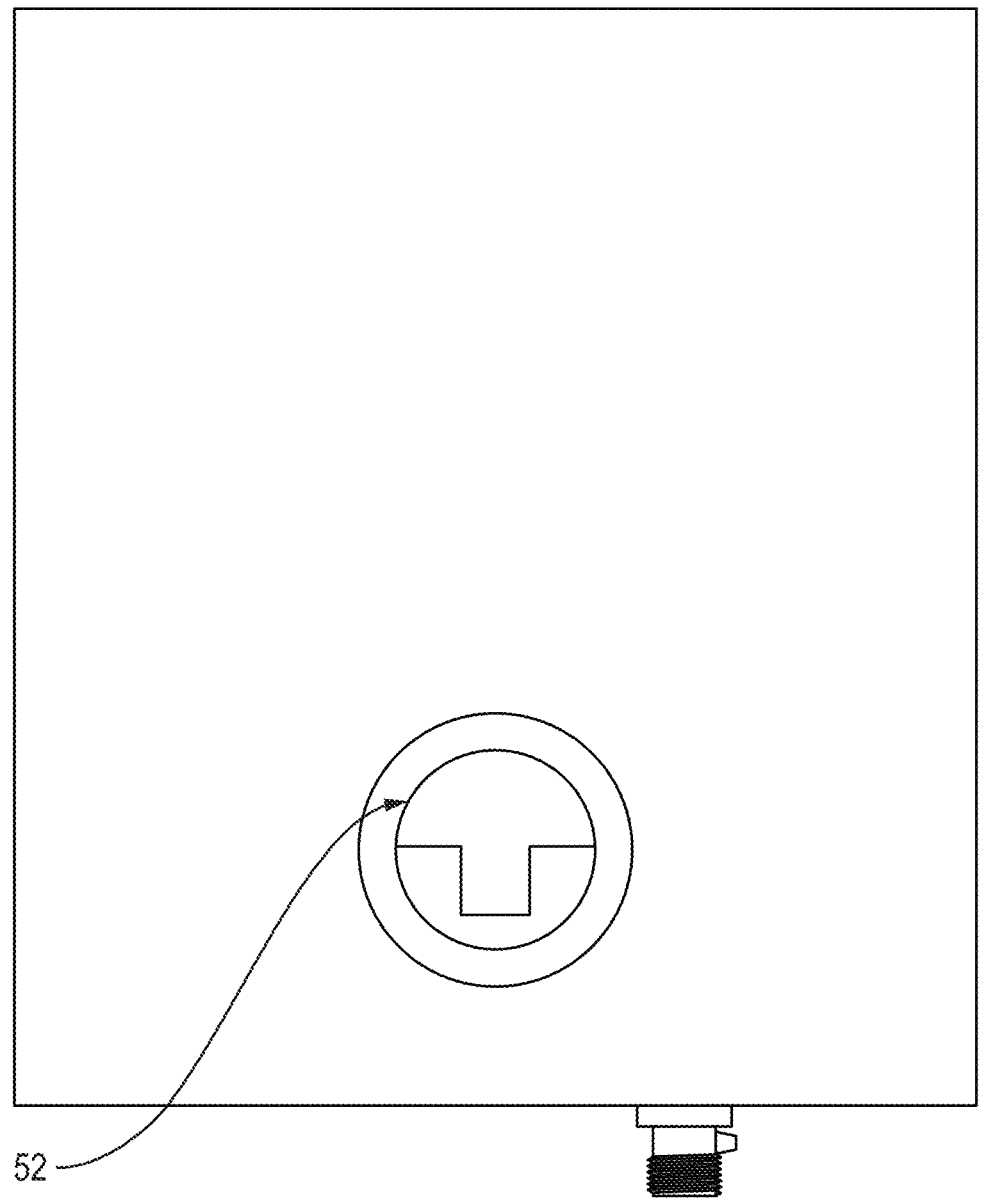
FIG. 8 is a side elevation view of the device of FIG. 5.
Figure 9:
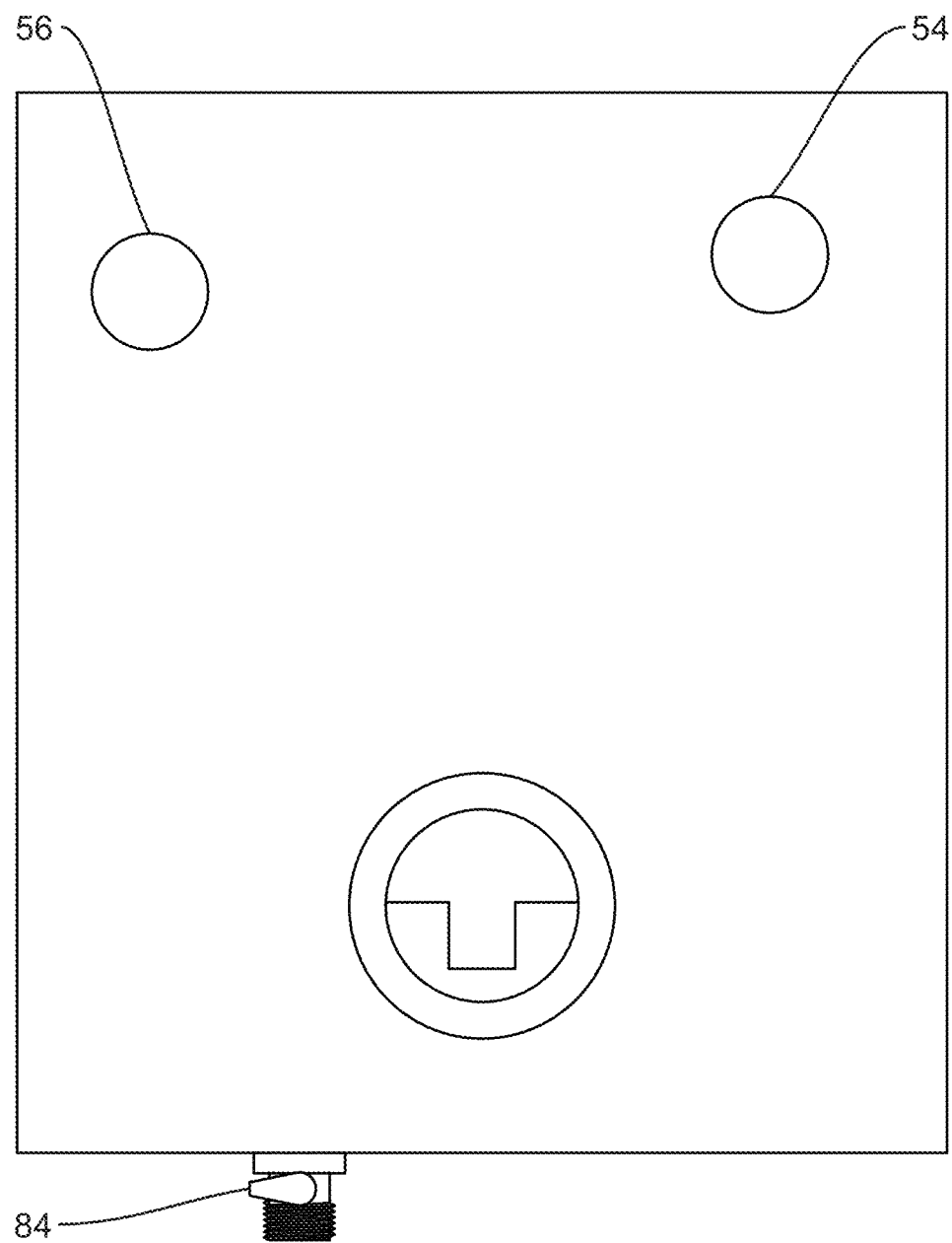
FIG. 9 is a rear elevation view of the device of FIG. 5.
Figure 10:
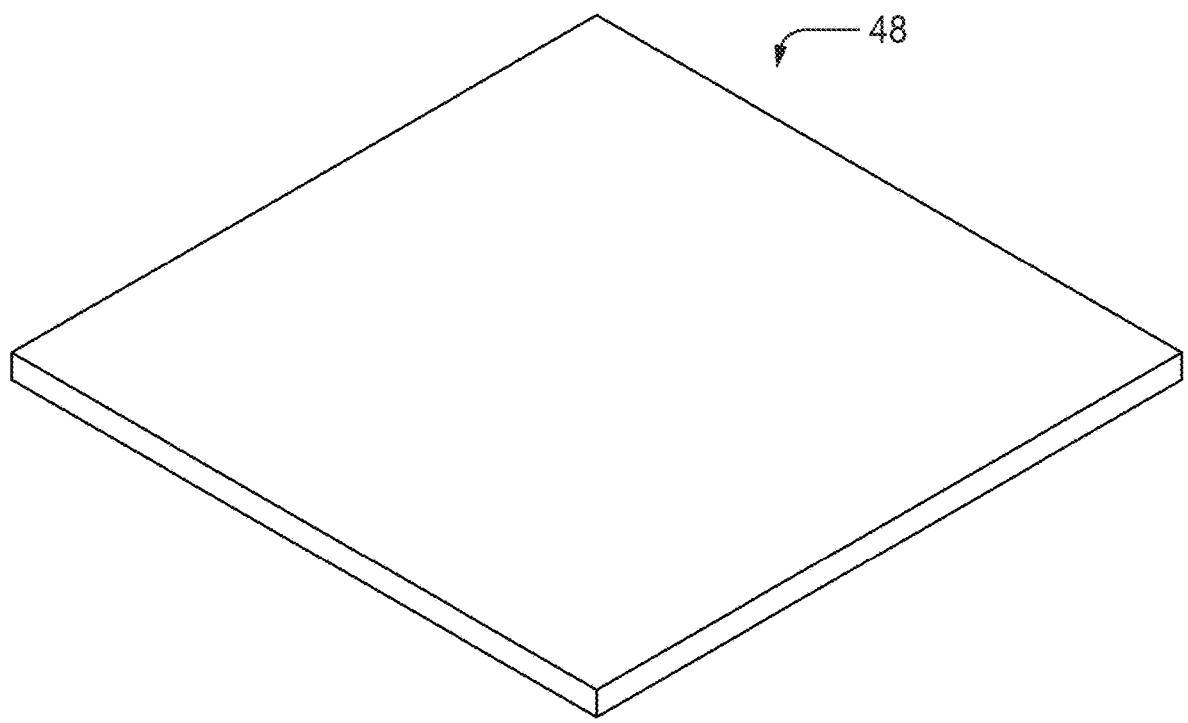
FIG. 10 is a perspective view of a vessel lid device for growing plants and seedlings.

Preferably, an exterior vessel floor 57 comprising a drainage ball valve relief 86 surrounding the exterior inferior horizontal floor aperture 58 allowing more access space for the operation of a lever of a ball valve 84 as presented in FIG. 7.

An interior vessel floor 57 preferably includes a plurality of supportive raised surfaces 90 or reliefs to organize and center air and water plumbing.

Air and water plumbing can consist of air tubing 128, water tubing 102, air fittings and water fittings. Air and water fittings can include tubing connections not limited to and commonly known as an elbow 137, a "t", a "y", a cross 101, a tubing extension 103, an end-cap 106 and 130, a check valve 129, a nutrient solution emitter 139 and an aerator 132. It will be appreciated that any combination of a plurality of air and water tubing, fittings, adapters and pumps can be used to provide sufficient air and water pressure for a PGS and can be produced as one device or a plurality of devices. It will be appreciated that while the drawings presented indicate connecting apertures, fittings and tubing employing threads and barbs, quick connect mechanisms or any other methods to achieve water tight connections are sufficient not limited to clamps or bulkhead fittings.

By combining a distinct combination of vessel lids, plumbing and hydroponic accessories, three specific vessels can be formed from a standard vessel body 46 and lid 48; a propagation vessel (PV) 92, a reservoir vessel (RV) 124 and a growing vessel (GV) 126.

Propagation Vessel

A propagation vessel (PV) 92 is designed with the intent to germinate a plant seed or root a plant cutting in order to produce a rooted seedling 93. A PV is the only vessel which can operate without being connected to another vessel. Therefore a PV, when utilized in conjunction with a stand, represents a PGS with the least incorporated devices. It should be appreciated that while a PV is preferably operated without being connected to another vessel, it is possible to connect a PV 92 to a reservoir vessel (RV) 124 or a growing vessel (GV) 126 or an additional PV 92.

A PV 92 is comprised of a vessel with at least one vertical aperture, at least one horizontal aperture, at least one device to create humidity and preferably at least one device to control the temperature of nutrient solution within which allows the PV to customize the dew point to offer an optimal environment for a specific plant to be propagated within. It will be appreciated that dew point can be understood as the relation to temperature and humidity and as it relates to vapor pressure and density as part of Tetens formula.

Figure 18:
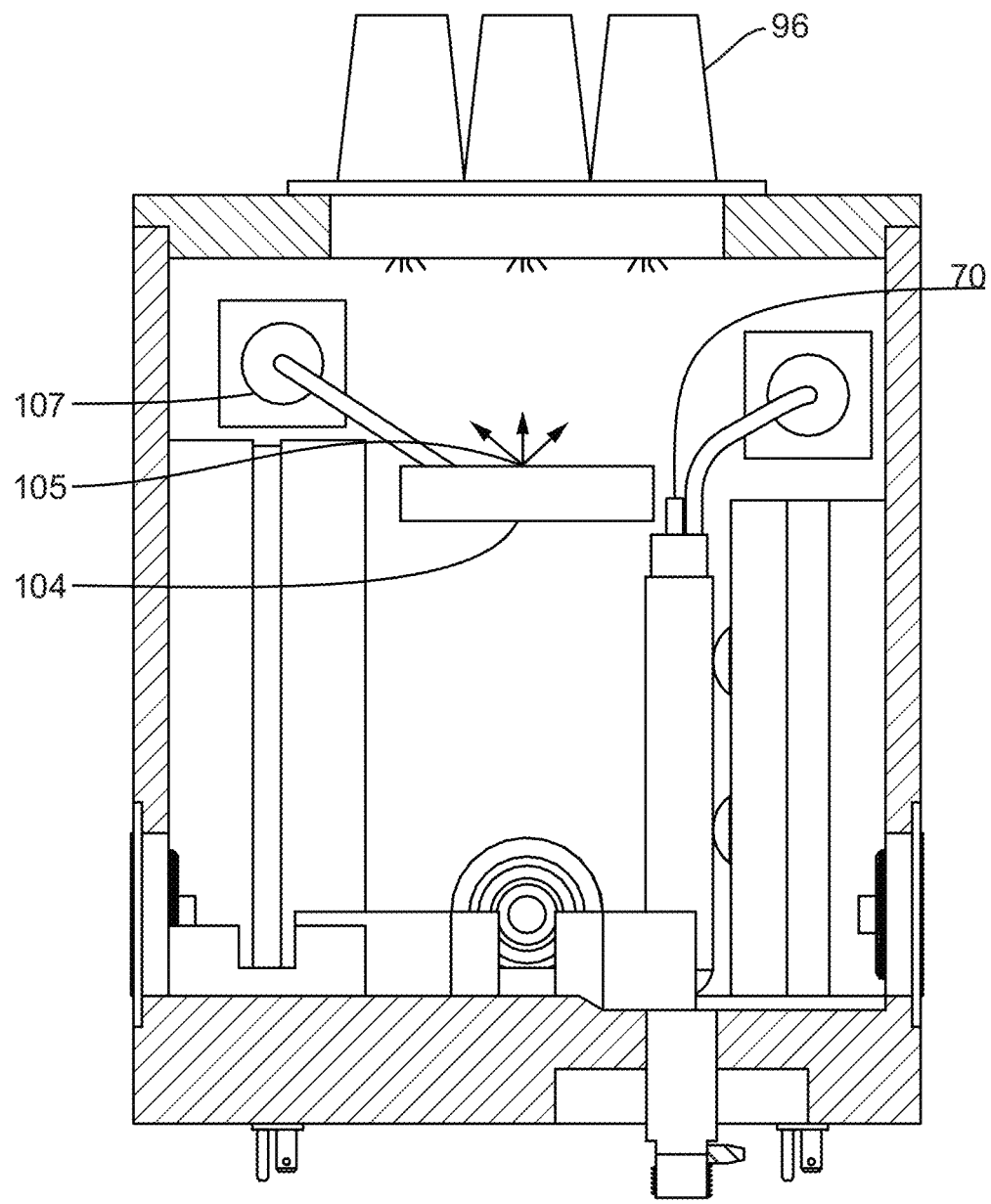
FIG. 18 is a cross-sectional view along line XVIII-XVIII of FIG. 17.
Figure 19:
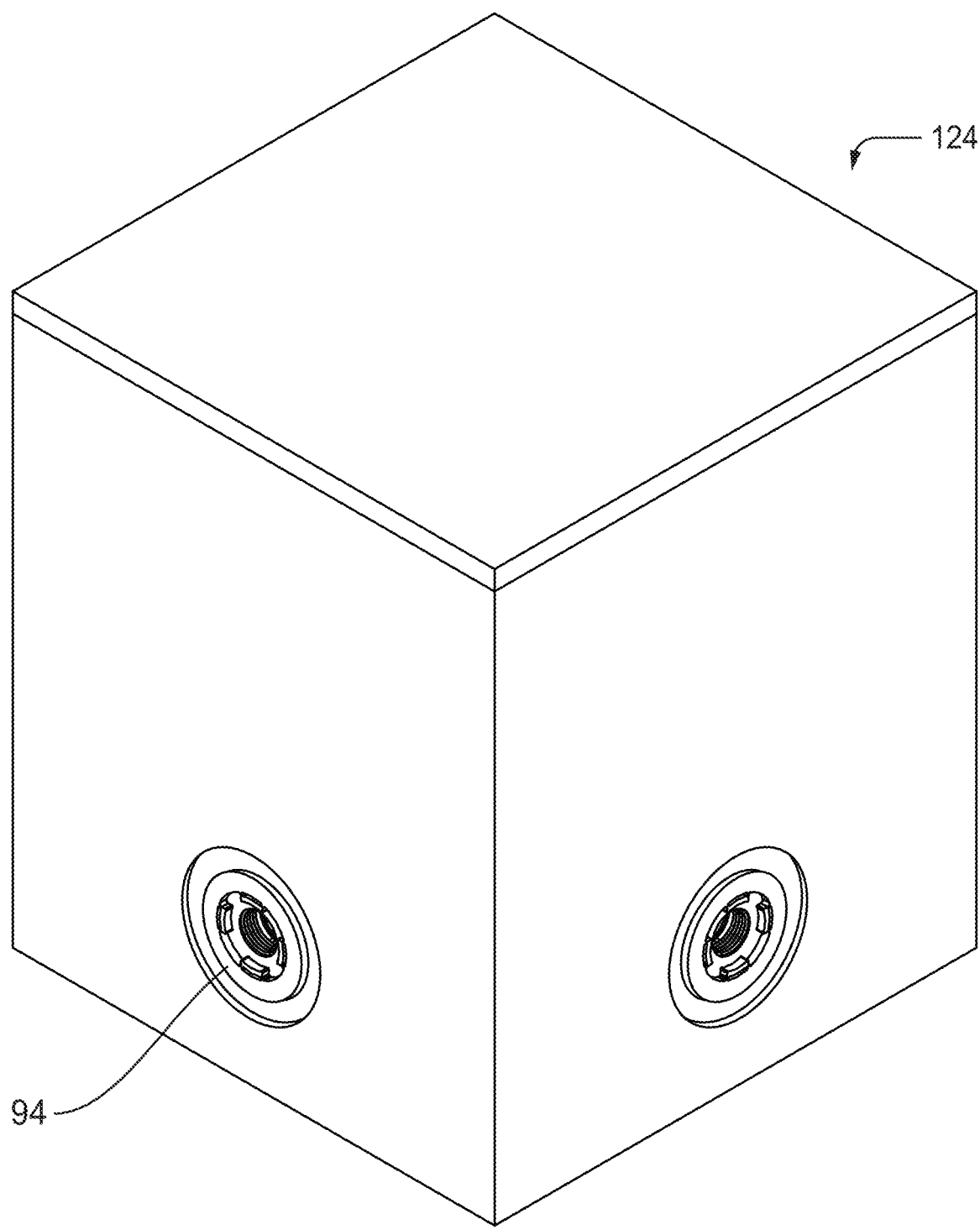
FIG. 19 is a perspective view of a reservoir vessel device for growing plants and seedlings.
Figure 20:
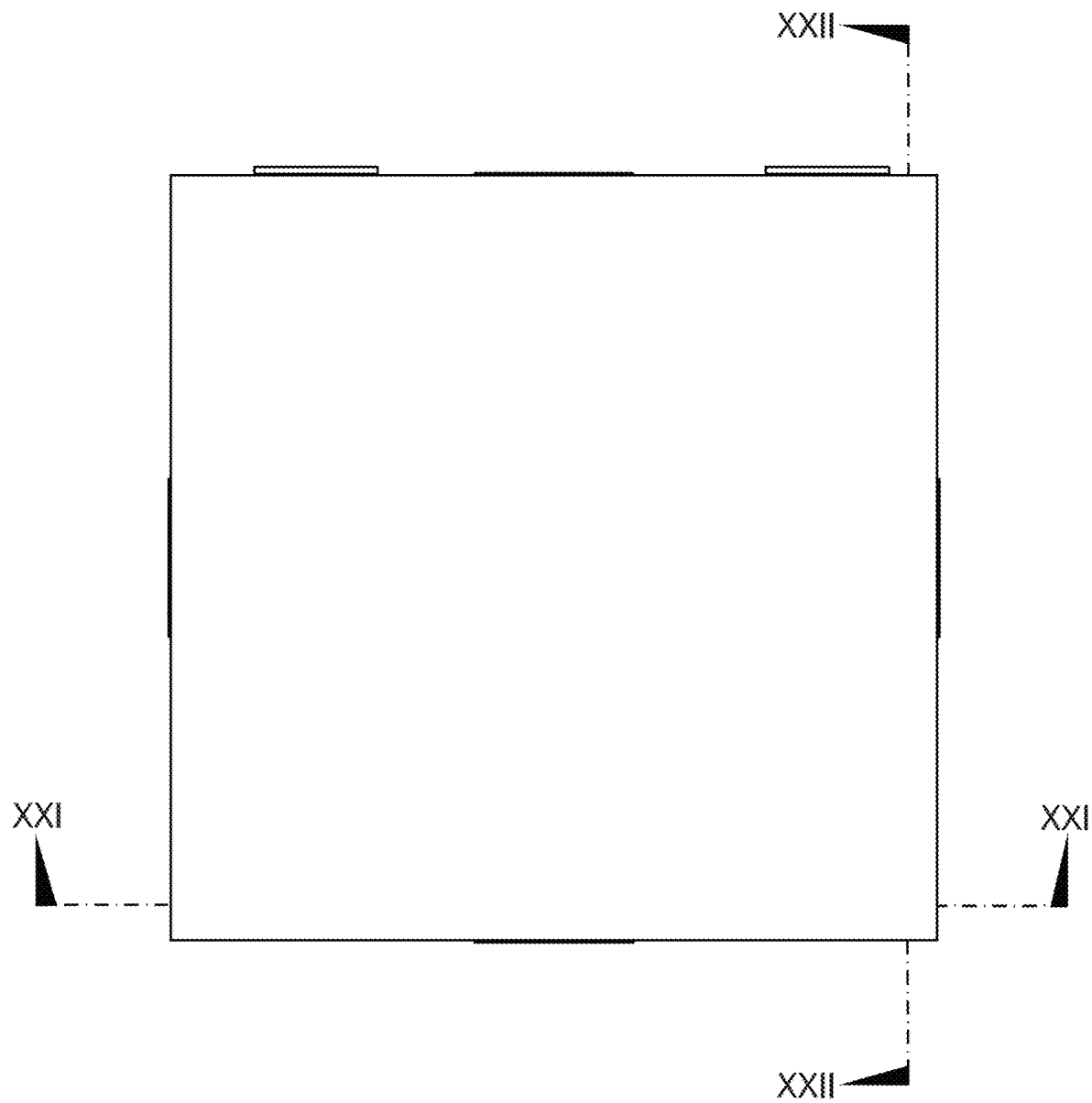
FIG. 20 is a top plan view of the device of FIG. 19.

A preferred embodiment of a PV 92 is presented in FIG. 18 as a vessel body 46 with end-caps 94 installed within a plurality of all four vessel connection apertures 52, a growing lid (GL) 50, a propagation lid (PL) 108, a plurality of nine propagation clamps (PC) 120, a floating water fogger 104, a water heater 70, a plurality of two vertical apertures for electrical cord passage 54 and 56, a plurality of two respective inserted grommets 76, two respective grommet plugs 107, a plurality of nine plant propagation domes (PD) 96 and a ball valve 84 connected to an exterior inferior horizontal floor aperture 58. It will be appreciated that a PV can be designed without vessel connection apertures 52, however due to the modularity of the preferred embodiment of a vessel described herein the vessel connection apertures have been retained. It will be understood that a water chiller may be used with an embodiment of a PV to lower the temperature of the nutrient solution.

A PV utilizes a vessel lid 48 with at least one horizontal aperture 98 which can be of any shape upon plan view designated as a growing lid (GL) 50. A preferred embodiment of a GL 50 utilized within a PV as presented in FIG. 12 comprising one square shaped primary aperture 98.

Preferably, a PV utilizes one central horizontal aperture within a GL to provide a location for a propagation lid (PL) 108 to be inserted. It will be appreciated that while a GL and a PL are listed as separate devices, they can be designed as one unit or replaced by each other. A PL 108 is secured within a horizontal aperture of a GL 98 by utilizing an indentation 110 around the inferior perimeter to retain humidity within a PV.

A PL 108 comprising at least one aperture 112 that can be of any shape upon plan view; wherein a PL aperture 112 comprising at least one propagation clamp (PC) 120. As presented in FIG. 15, a preferred embodiment of a PL comprising nine apertures 112 and nine PCs 120. A PL and PC are preferably manufactured of closed cell foam or any other material that is suitable for exposure with nutrient solution, offers flexibility and elasticity, provides a water tight seal, resists penetration from plant roots and ensures the proper pressure to hold plant cuttings and seeds without causing damage at a cellular level not limited to neoprene, ethylene propylene diene monomer rubber, natural rubber, nitrile, silicone, fluoropolymer elastomer, vinyl, styrene butadiene, butyl and chlorosulfonated polyethylene.

Figure 16:
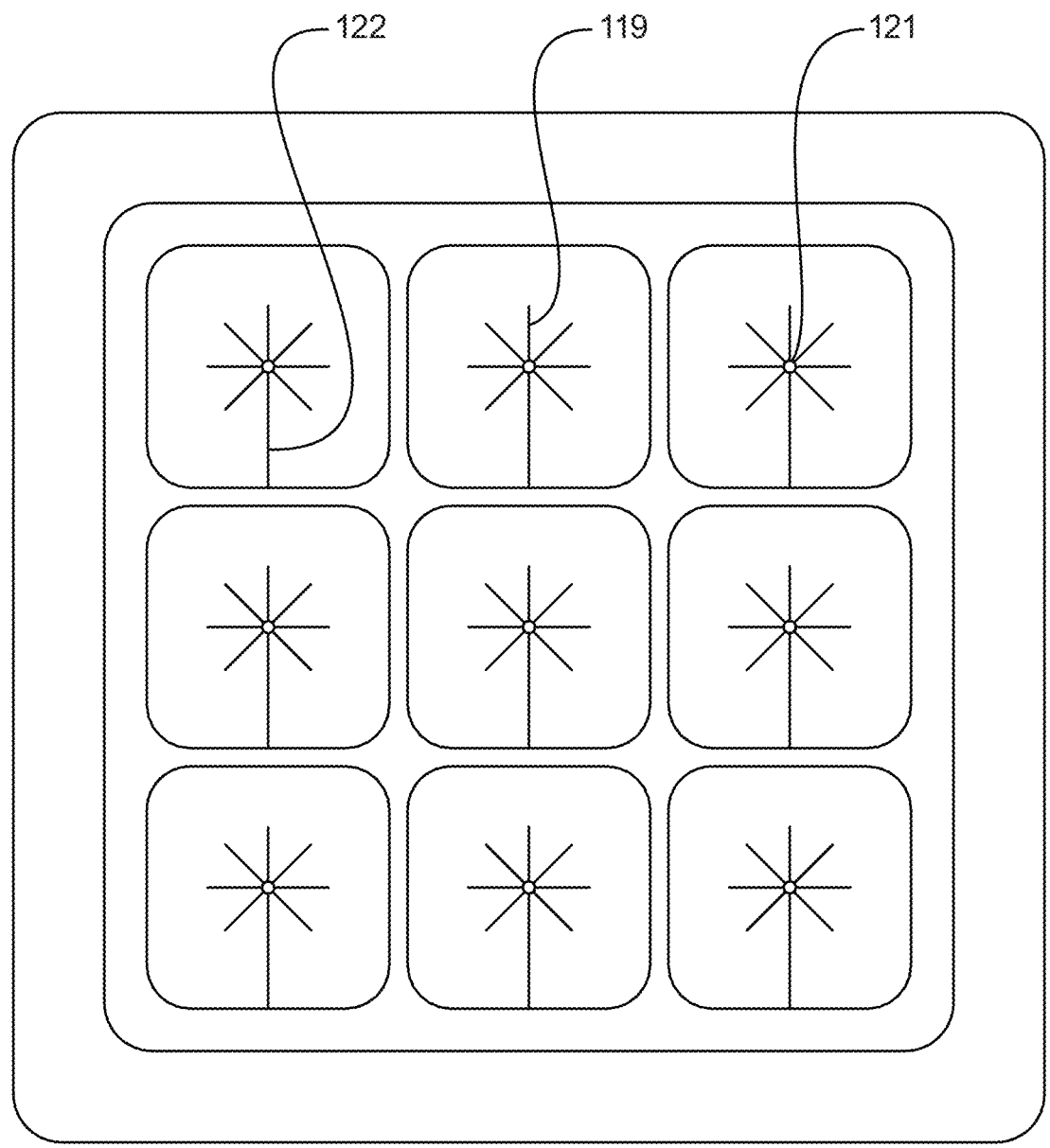
FIG. 16 is a bottom plan view of a propagation lid device and propagation clamp devices from the device of FIG. 14.
Figure 17:
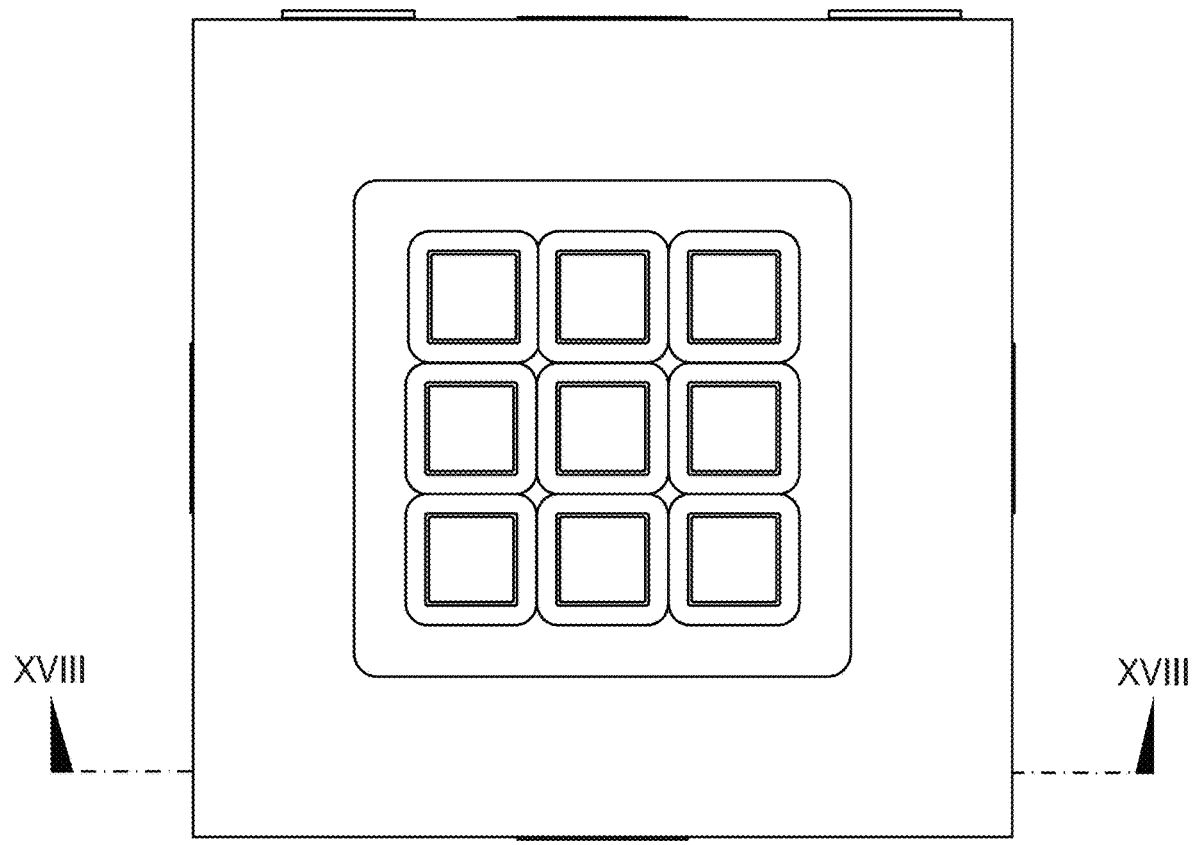
FIG. 17 is a top plan view of the device of FIG. 14.

A preferred embodiment of a PC 120 as presented in FIG. 16 can be any shape upon plan view, comprising at least one center aperture 121 with a horizontal diameter and a vertical length designed to maintain the surface tension of water, comprising one main incision 122 that begins at the center aperture and finishes on a lateral edge upon plan view in order to properly secure a desired seed or cutting and utilizes a plurality of auxiliary incisions 119 that begin at the center aperture and finish before the lateral edge to provide added flexibility during seed, plant cutting and seedling 93 insertion and removal.

Preferably, humidity above each PC 120 is contained by utilizing a propagation dome (PD) 96 which retains a seedling's transpiration and the humidity released through a PC's central aperture 121. Preferably, a PD 96 is transparent in order to facilitate photosynthesis, view plant development and monitor visible moisture content. A PD 96 can be in any shape upon plan view and any height able to accommodate the seedling or cutting desired. A PD 96 can exist as a singular device to provide coverage for a plurality of all PCs 120 or preferably a plurality of PDs serves each PC 120 individually as presented in FIG. 14.

Depending on the current development of a desired seed, cutting or seedling 93, a PV can be filled with distilled water, plain tap water or nutrient solution to a desired water-line 69.

A PV preferably utilizes a floating ultrasonic fogger 104 on a nutrient solution surface to inject humidity into the interior vessel volume which can be regulated via a humidity sensor circuit. A floating ultrasonic fogger 104 is comprised of a standard water ultrasonic fogger which comprises a piezoelectric transducer able to resonate a ceramic disc at a frequency of approximately 1.6 MHz releasing water droplets of approximately three to five microns upward 105 filling a PV interior towards a target of 100% humidity within a standard floating device or material.

Since an ultrasonic fogger does not provide sufficient heat, a PV 92 interior temperature can be increased and controlled to reach a desired level for a desired seed, plant cutting or seedling 93 via a standard water heater 70 and an optional air temperature sensor circuit. It will be appreciated that any device with the ability to control the temperature of the water will be sufficient.

A grommet plug 107, preferably made of closed cell foam, is utilized to surround an electrical cord and is inserted into a grommet recess 77, further preventing humidity from escaping a vessel interior from a PV 92 vertical aperture 54 and 56.

Reservoir Vessel

Once a seedling has exceeded the space constraints of a PV 92, it can be transferred to a PGS that comprising the ability to support the plant into maturity; wherein a PGS which can offer an ideal environment for a seedling to mature is comprised of at least one reservoir vessel (RV) 124 connected to at least one growing vessel (GV) 126 and at least one stand supporting each respective vessel.

A RV 124 comprising the ability to control the desired air pressure, dissolved oxygen level, nutrient solution pressure, pH, total dissolved solids (TDS), electrical conductivity (EC), temperature and water level within a PGS.

A RV 124 is comprised of a vessel with at least one vertical aperture, at least one horizontal aperture, at least one device to create air pressure within respective air plumbing and at least one device to create water pressure within respective water plumbing.

A preferred embodiment of a RV 124 as presented in FIG. 21 is comprised of a vessel body 46, a vessel lid 48, an air pump 66, a water pump 68, respective air and water plumbing, a plurality of two vertical apertures for electrical cord passage 54 and 56, a plurality of two respective inserted grommets 76 and a ball valve 84 connected to an exterior inferior horizontal floor aperture 58.

Within a preferred embodiment of a RV presented in FIG. 21, an air pump 66 installed on an air pump plateau 60 rising from the interior vessel floor 57 to a height above the overflow aperture 56 provides air pressure downward 127 into air tubing 128 and fittings throughout a PGS injecting oxygen into the nutrient solution via at least one aerator 132 located below the water-line 69 which can be controlled with a dissolved oxygen sensor circuit. It will be appreciated that a check valve 129 can be used within air plumbing to prevent water damage to an air pump 66.

Within a preferred embodiment of a RV presented in FIG. 21, a water pump 68 preferably located on a vessel floor 57 in proximity to an electrical cord passage aperture 54 provides water pressure within water tubing 102 and fittings which pressurize the respective water plumbing throughout a PGS and subsequently within a GV 126 to ultimately emit nutrient solution onto plant roots.

A standard automatic fertigation device 72 can be utilized to maintain the desired pH, TDS and EC of the nutrient solution within a RV 124 and a respective PGS by inserting the desired pH and TDS or EC sensor probes and injection tubing through one or a plurality of non-vessel connection vertical apertures 54 and 56 into the nutrient solution.

A standard water heater 70 can be placed within nutrient solution within a RV 124 to raise and maintain a desired temperature of the nutrient solution throughout a PGS.

Figure 27:
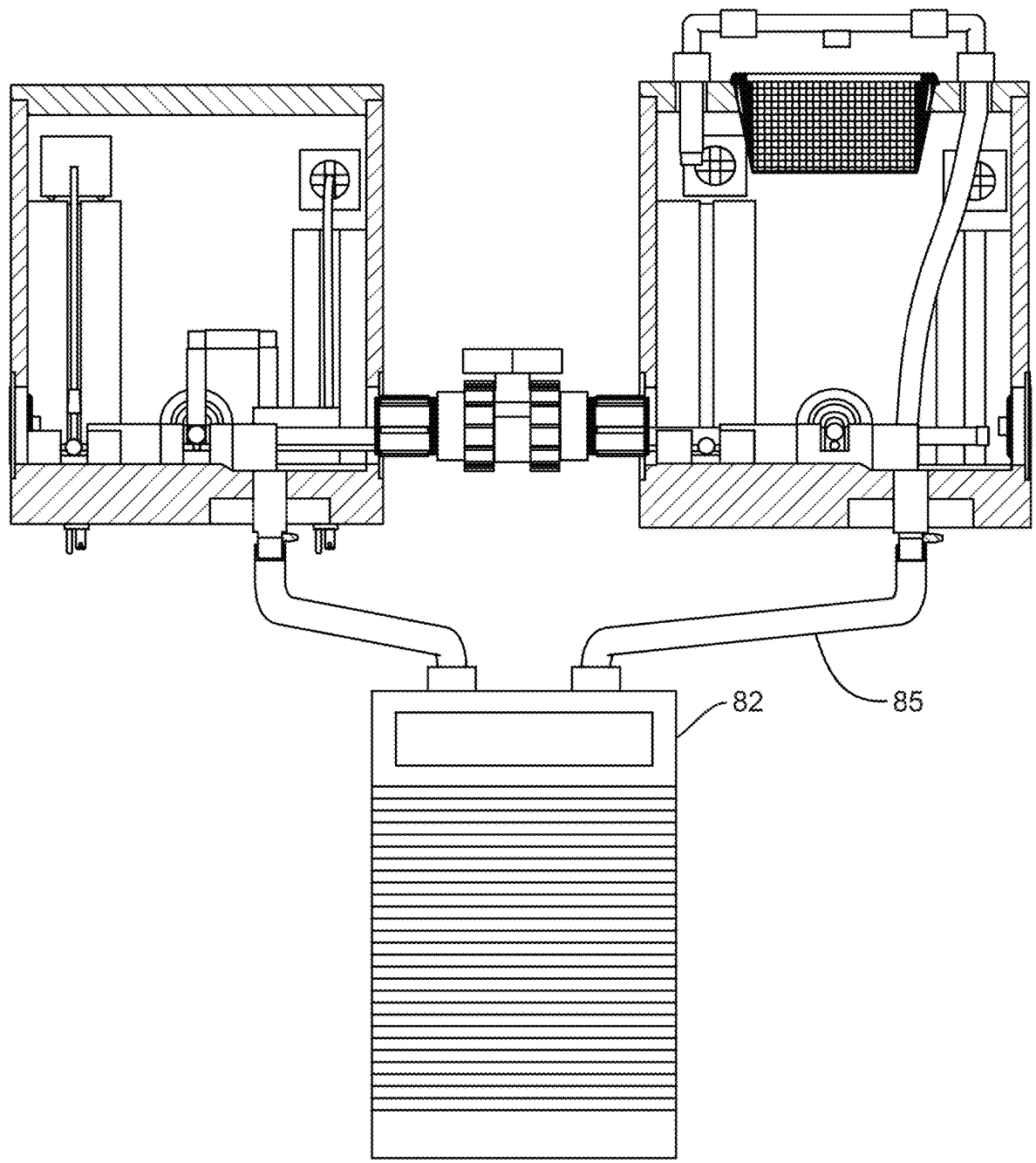
FIG. 27 is a view of FIG. 21 and FIG. 26 without a plant and incorporating a plurality of vessel connection pipes, a ball valve and a standard water chiller device.
Figure 28:
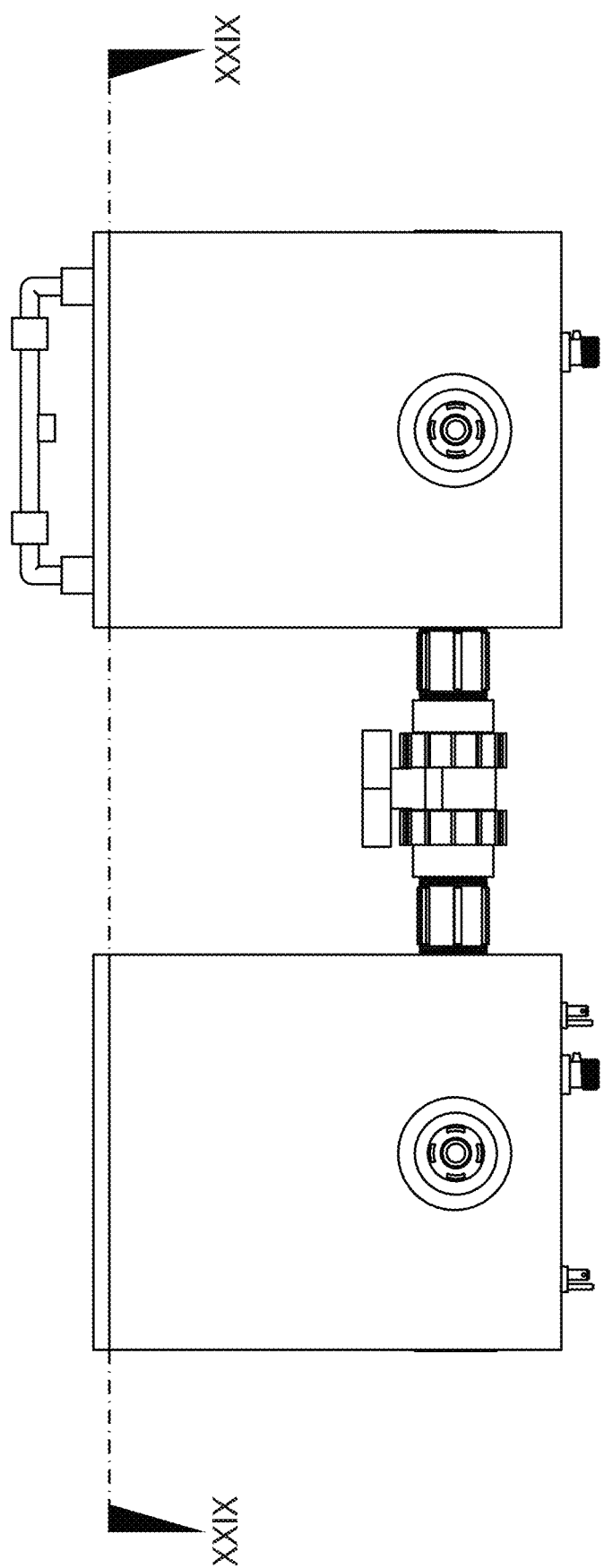
FIG. 28 is a side elevation view of the devices of FIG. 19 and FIG. 24 incorporating a plurality of vessel connection pipes and a ball valve.

A standard water chiller 82 as preferably presented in FIG. 27 can lower and maintain a desired temperature of nutrient solution within a RV 124. For optimal results a water chiller inlet and outlet preferably utilize water tubing with threaded ends 85 which can connect to the inferior horizontal vessel floor aperture 58 of the two vessels that are furthest in distance respectively within a PGS.

Figure 22:
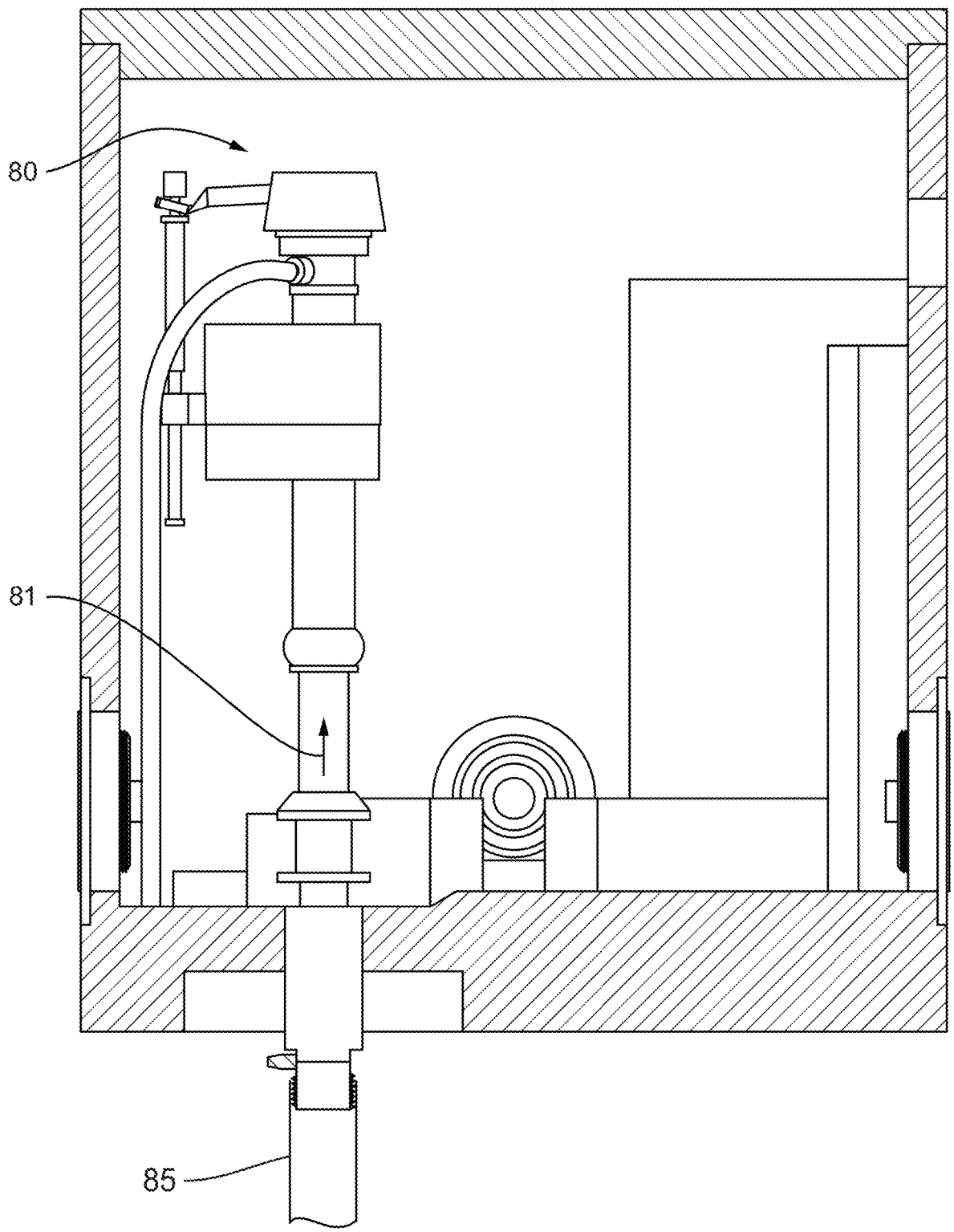
FIG. 22 is a cross-sectional view along line XXII-XXII of FIG. 20.
Figure 23:
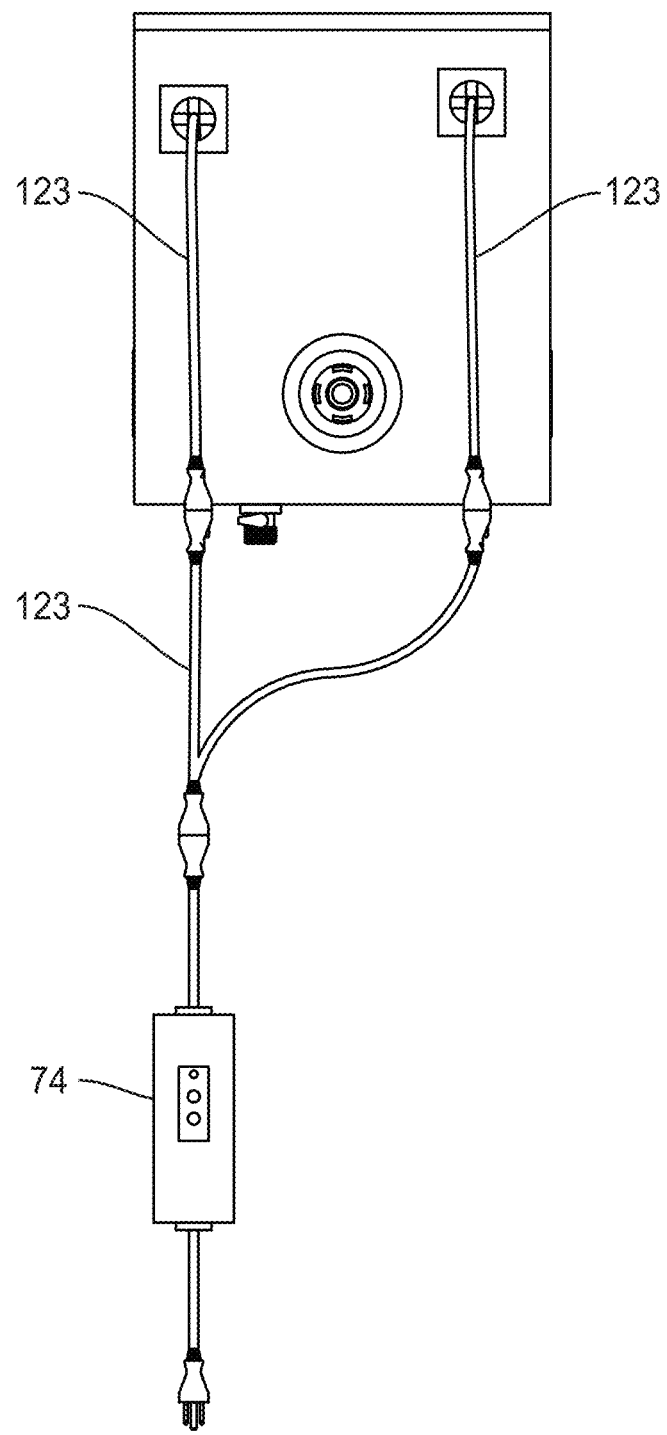
FIG. 23 is a rear elevation view of the device of FIG. 19 incorporating a standard ground-fault circuit interrupter device.
Figure 24:
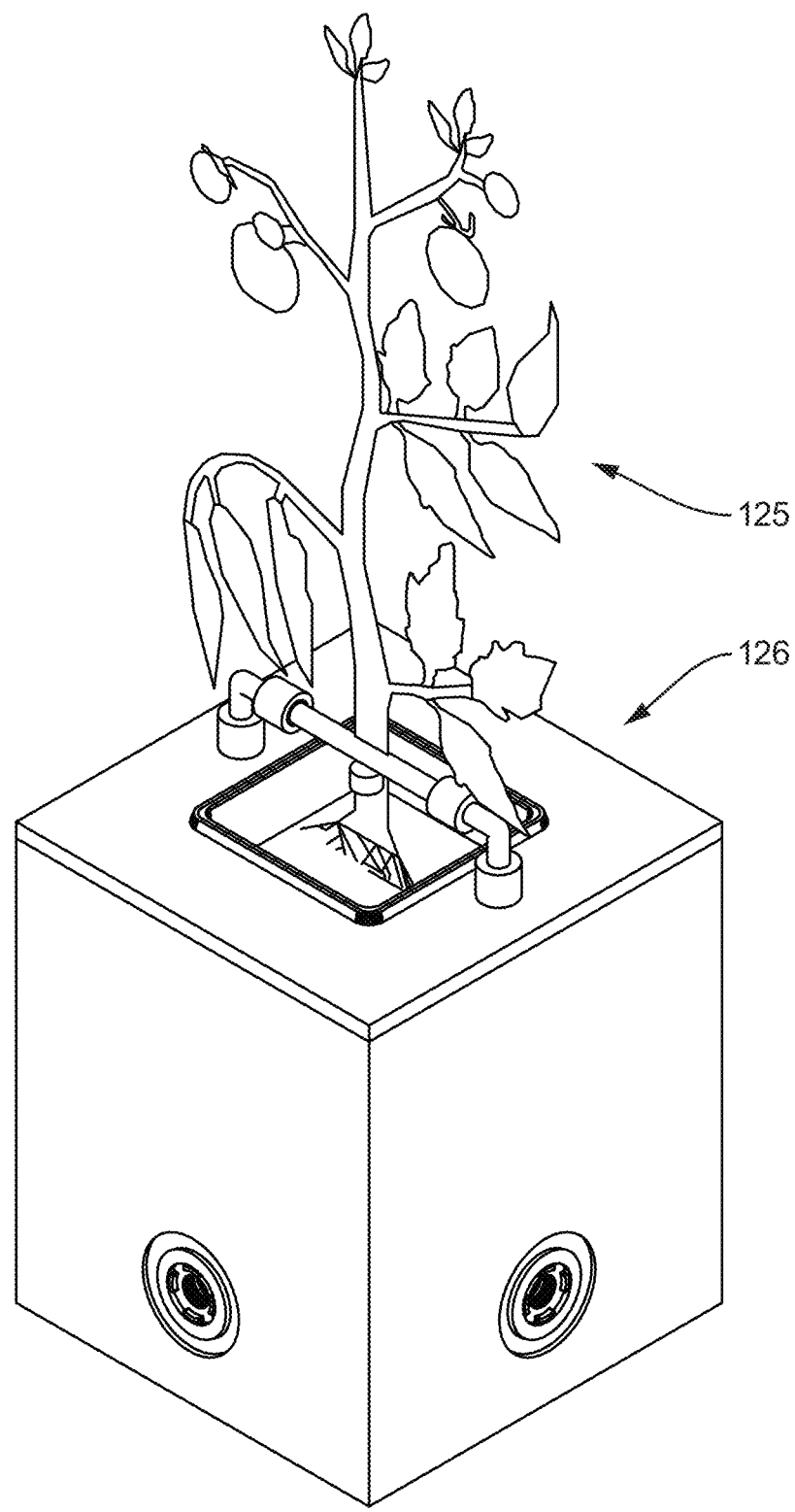
FIG. 24 is a perspective view of a growing vessel device for growing plants and seedlings.

It is possible to connect a pressurized threaded water tube 85 to the exterior of an inferior horizontal vessel floor aperture 58; wherein a RV is able to maintain a desired water level within by configuring a standard fill valve 80 connected to an interior inferior horizontal floor aperture 58 located on a vessel floor drainage plane 59 which can inject fresh water upward 81 and into an RV to a desired water-line 69 as preferably presented in FIG. 22.

Manual filling of a RV 124 is possible by removing a vessel lid 48 and pouring fresh water or nutrient solution into the vessel to the desired level.

Figure 29:
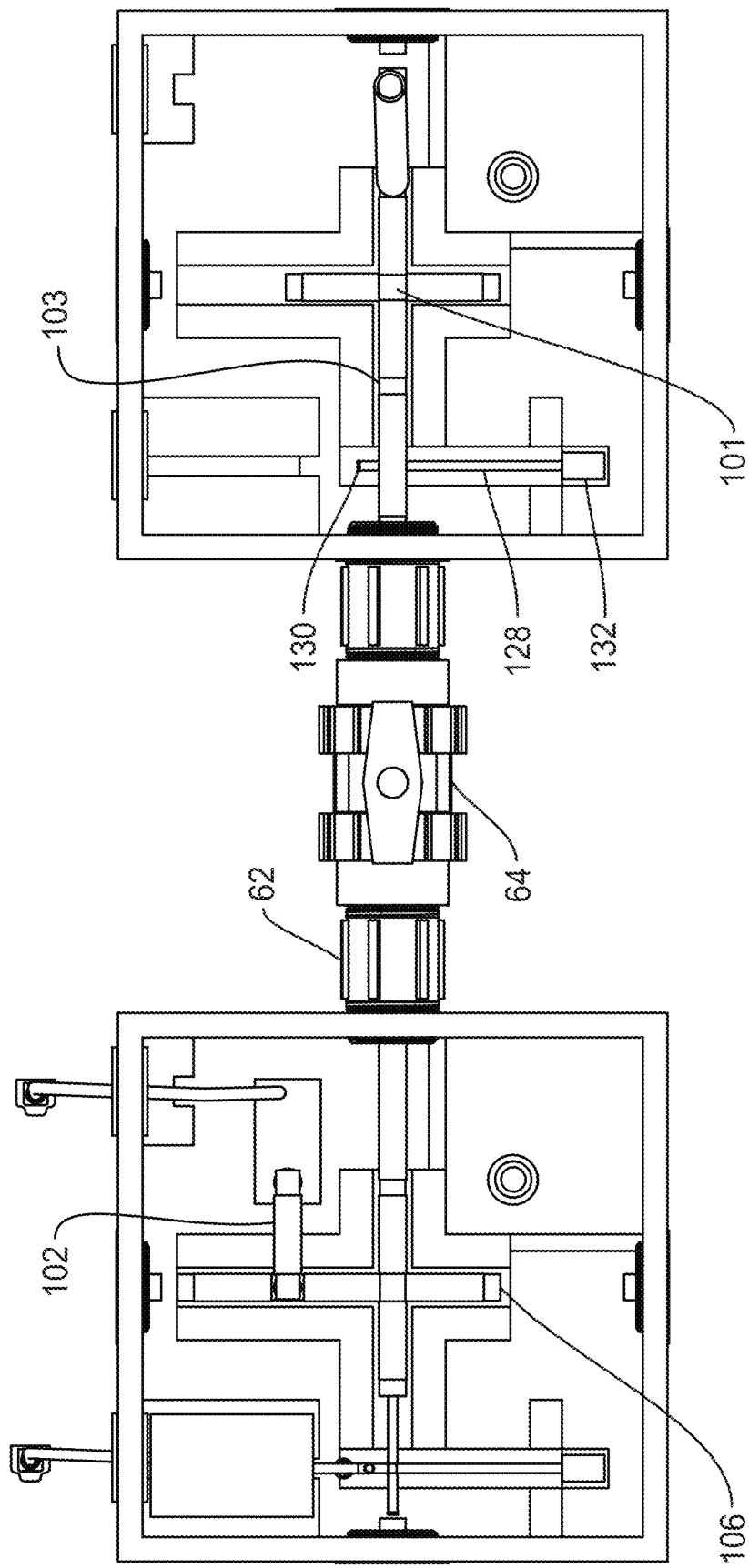
FIG. 29 is a cross-sectional view along line XXIX-XXIX of FIG. 28.

A preferable embodiment of an electrical and plumbing schematic of a RV (left) connected to a GV (right) is presented in FIG. 29 by respective vessel connection apertures 52, a connecting pipe 62 and a vessel connection ball valve 64; wherein water tubing 102 and a plurality of two water tubing extension fittings 103 can connect the internal water plumbing from the respective vessels which is vertically positioned above the respective air tubing; wherein air tubing 128 and a plurality of two air tubing extension fittings can connect the air plumbing from the respective vessels within a PGS.

It will be appreciated that any plumbing schematic within a RV 124, GV 126 and a respective PGS that can achieve the desired water and air pressure within the respective plumbing while providing vessel air and water connections on and through any vessel floors 57 and walls 63 to one or a plurality of RV, GV, PV and PGS devices is acceptable and possible; wherein a RV can connect to another RV, GV, PV or a plurality of either device on any vertical side utilizing the modular methods described herein; wherein the respective PGS can be constructed to an infinite size.

Growing Vessel

A growing vessel (GV) 126, when connected to a RV 124, comprising the ability to receive nutrient solution comprising a desired pH, total dissolved solids (TDS), electrical conductivity (EC), temperature and water-line 69 level, receive and distribute a desired air pressure, receive and produce additional dissolved oxygen levels and emit an oxygenated nutrient solution onto plant roots within a PGS; wherein a desired plant 125 or seedling 93 obtains the optimal resources to grow to maturity within a GV and a respective PGS.

Figure 26:
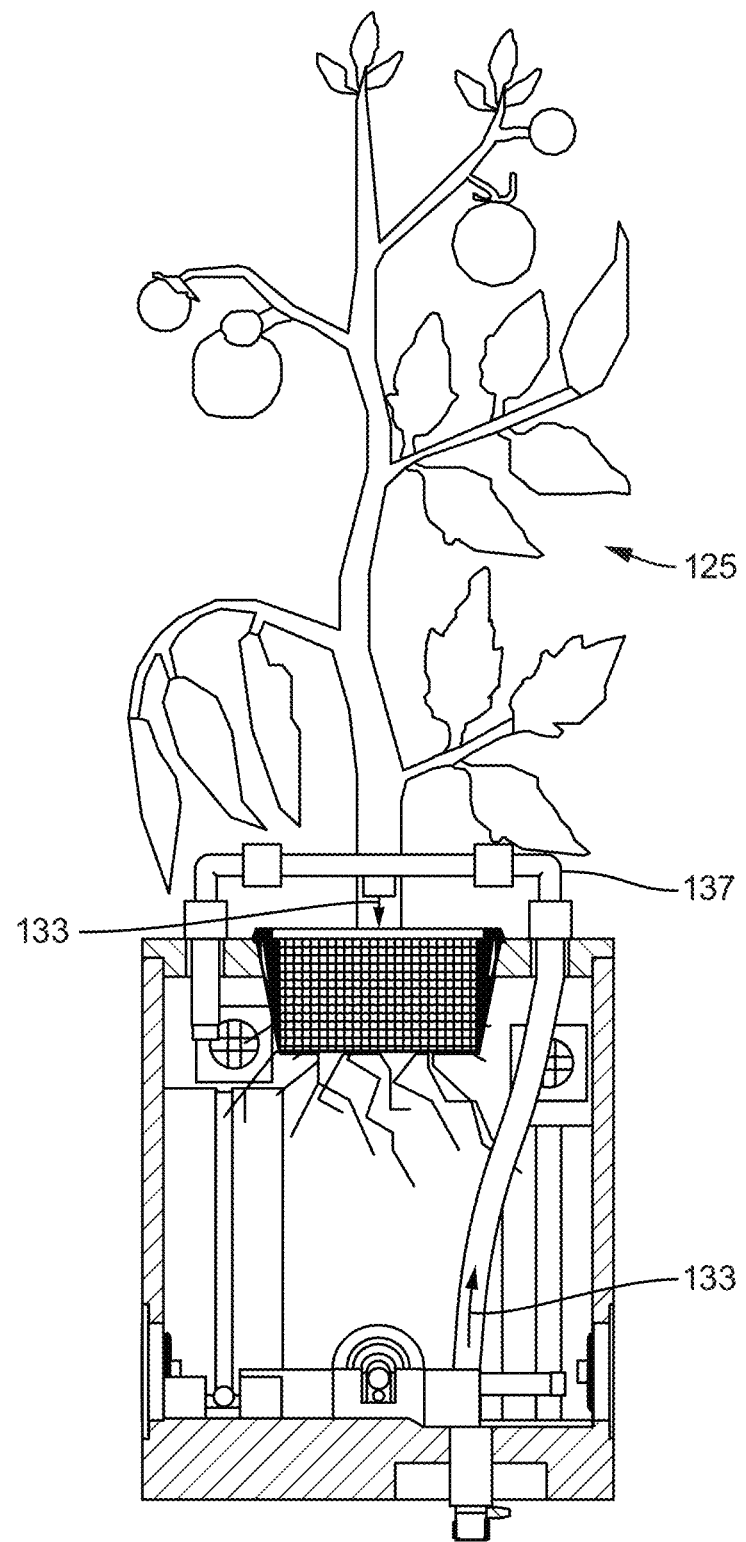
FIG. 26 is a cross-sectional view along line XXVI-XXVI of FIG. 25.

A preferred embodiment of a GV as presented in FIG. 26, is comprised of a vessel body 46, a growing lid 50 as presented in FIG. 13 comprising one square shaped primary aperture 98 and two circular auxiliary apertures 100, a net pot 134, growing media 136, air and water plumbing, an electrical cord passage aperture 54, an overflow aperture 56, a plurality of two respective inserted grommets 76 and a ball valve 84 connected to an exterior inferior horizontal floor aperture 58. It will be appreciated that a GV can be designed without vertical apertures for electrical cord passage or overflow and their respective grommets, however due to the modularity of the preferred embodiment of a vessel described herein the electrical cord passage aperture 54, the overflow aperture 56 and respective grommets 76 have been retained.

A GV can connect to another vessel via a connecting pipe 62, optional ball valve 64 and respective internal air and water plumbing; wherein a PGS comprising at least one RV connected through any of the plurality of four vessel connection apertures 52 via a connecting pipe 62, optional ball valve 64 and respective internal air and water plumbing.

Preferably as presented in FIG. 29, the air 128 and water 102 tubing is designed in such a way that there are a plurality of tubing ends that can be closed utilizing end-cap fittings 130 and 106 or open utilizing tubing extension fittings 103 to facilitate equal pressure throughout a PGS and the optional passage of the respective plumbing through any vertical vessel walls to a connection of one or a plurality of additional RV and or GV devices.

The air plumbing within a GV consists of air tubing 128 connected to at least one aerator 132 which provides additional optimal dissolved oxygen within the nutrient solution. Optimal dissolved oxygen levels depend on the plant species being grown, however a general range of 10-40 ppm will provide sufficient aeration for a mature *Solanumlycopersicum* and is achievable with a standard air stone utilized as an aerator 132.

A GV utilizes passive and active methods described herein to provide a circulation of a desired oxygenated nutrient solution in order to facilitate optimal plant development within a PGS.

The passive nutrient solution circulation method employs a system of communicating vessels; wherein the oxygenated unpressurized nutrient solution originating from a connected RV, a plurality of RVs, an additional GV or plurality of GVs flows into the understood GV via a connecting pipe 62 and optional ball valve 64 and can maintain optimal equal nutrient solution levels due to hydrostatic pressure.

The active nutrient solution circulation method employs a water pump 68 located within a RV to pressurize respective water plumbing within all connected GV devices within a respective PGS with oxygenated nutrient solution via water tubing 102 and a tubing extension fitting 103.

As presented in FIG. 26 a preferred embodiment of water plumbing within a GV transports pressurized oxygenated nutrient solution upward 133 within water tubing 102, through an auxiliary aperture 100 within a GL 50 toward the center of a GL's central aperture 98. In continuation, once the pressurized nutrient solution has reached its maximum vertical height within the water tubing 102, the nutrient solution flows through an elbow water fitting 137 followed by a superior horizontal nutrient solution tubing 138 utilizing at least one centered nutrient solution emitter 139 which provides an optimal rate of pressurized oxygenated nutrient solution 133 output onto the roots of a desired plant 125 or seedling 93 grown; wherein the excess nutrient solution emitted drips from the roots of a plant 125 into the oxygenated nutrient solution below completing the active nutrient solution circulation route.

Figure 25:
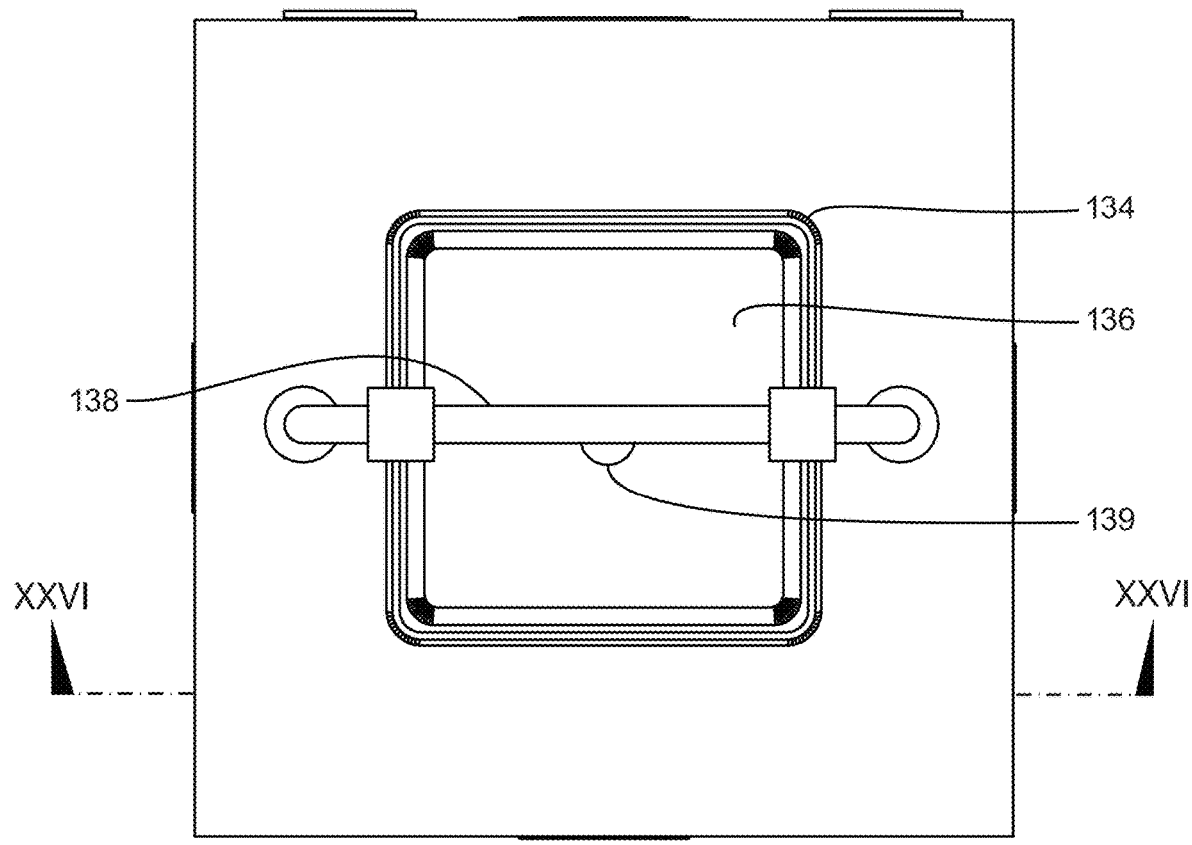
FIG. 25 is a top plan view of the device of FIG. 24.

Preferably as presented in FIG. 25, to level, center and support the weight of a superior horizontal nutrient solution tubing 138 and a nutrient solution emitter 139, a superior horizontal nutrient solution tubing 138 extends from one elbow water fitting 137 over the centerline of a GL's central aperture 98 to another elbow water fitting and downward into an additional and opposing auxiliary aperture 100; wherein the two elbow water fittings 137 maintain a diameter wider than the respective auxiliary apertures 100 so that the water plumbing above a GL 50 can rest securely and level upon the exterior of the GL. It will be appreciated that this previous embodiment is one of a plurality of embodiments to level, center and support a superior horizontal nutrient solution tubing 138, a nutrient solution emitter 139 and a plurality of two elbow water fittings 137.

Located above the center of the GL's central aperture 98, on the inferior plane of the superior horizontal nutrient solution tubing 138, a minimum of one nutrient solution emitter 139 ejects an optimal rate of pressurized oxygenated nutrient solution 133 downward onto a desired plant 125 or seedling's 93 roots held within the growing media 136 of a net pot 134. For example, 15-20 gph is an optimal range for the output of nutrient solution emitted onto the roots of a *Solanumlycopersicum*. The rate of flow for an emitter can be optimized for the desired plant 125 or seedling 93, stage of plant growth and the environment wherein the desired plant 125 or seedling 93 is grown.

It is standard for a nutrient solution emitter 139 to regularly become blocked or partially blocked from nutrient salt buildup within an emitter aperture reducing the optimal rate of flow. The GV 126 is able to overcome nutrient salt buildup within a nutrient solution emitter 139 without the removal of water plumbing, a nutrient solution emitter or a plant 125 by lifting the distal water plumbing elbow fitting 137 upwards and away from the GL 50 and quickly squeezing and releasing the most distal water plumbing tubing 102 in a pulsing action in between the distal water plumbing elbow fitting 137 and water plumbing end-cap 106.

The weight of a seedling 93 or a plant 125 is preferably supported within a net pot 134 secured within a GL 50. As preferably presented in FIG. 25, a preferred embodiment of the outer rim of a net pot 134 is larger in diameter upon plan view than a central aperture 98 within a GL 50, which allows a GL to support the circumference of a net pot and suspend the majority of a net pot volume inside the GV.

A net pot 134 is filled with growing media 136 of any kind that allows for optimal moisture retention and air circulation around the root zone of a desired plant 125 or seedling 93. Examples of growing media can include, but are not limited to a singular, a plurality of or a combination of expanded clay pellets, open cell foam, non-woven melted plastic, non-woven melted rock, non-woven melted glass, coco coir, peat moss, expanded volcanic glass, volcanic stone, melted glass and calcium carbonate combination stones, rice hulls, pumice stone, gravel, wood fiber, brick, polystyrene and vermiculite.

A seedling 93 can be inserted within growing media 136 and physically supported by the superior horizontal nutrient tubing 138 above the GL 50, until the seedling takes root to support itself.

A GV 126 provides a seedling 93 with an optimal rate of output through a nutrient solution emitter 139 until a seedling's roots become long enough to submerse within the oxygenated nutrient solution below providing a seamless transition into maturity.

It can be beneficial to utilize a floating water ultrasonic fogger 104 and vessel grommet plugs 107 within a GV in addition to the previously described nutrient solution delivery methods during a transitional period until a seedling 93 acclimates from a PV 92 to a GV 126.

Even after a desired seedling 93 or plant 125 matures to produce roots that are submersed within the nutrient solution, a nutrient solution emitter 139 provides a layer of oxygenated nutrient solution protection to prevent exposed roots above the water-line 69 from desiccating which typically takes place as the nutrient solution level decreases within a PGS due to transpiration, cellular development and evaporation from open apertures and gaps within a vessel.

Trellis

When connected to a stand 22, a trellis 45 completes an optional infrastructure of a PGS; wherein a trellis can provide support to a plant 125, a mounting point and range of motion for a luminaire 140 and a mounting point for a net enclosure 232 which serve as a method of an integrated pest management program.

A trellis is comprised of at least one tower 32 and at least one mounting leg 24 comprising at least one mounting point 31 to secure to a stand. It will be appreciated that a tower and mounting leg can be designed and considered as one device. It will be appreciated that a trellis, vessel and stand can be designed and considered as one device.

Figure 32:
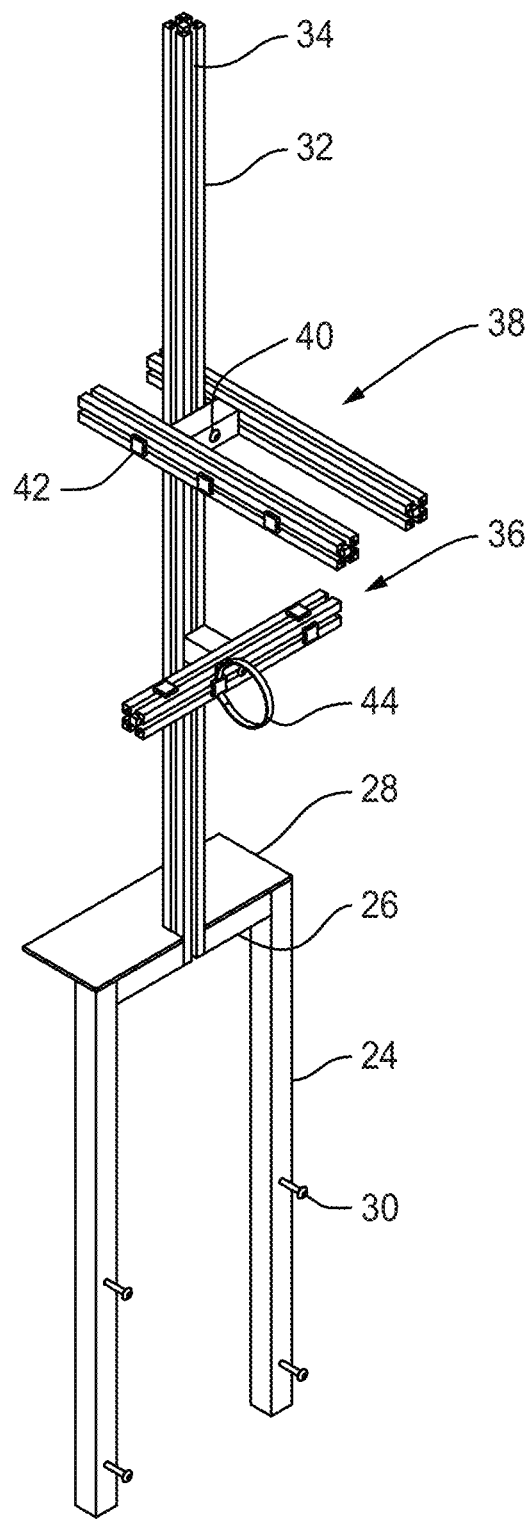
FIG. 32 is a perspective view of the device of FIG. 30 incorporating "T" and "H" shaped plant support arm devices.

A preferred embodiment of a trellis 45 is presented in FIG. 32 as two mounting legs 24, one tower 32, a plurality of securing hardware 30 and 40, a plurality of two crossbeams 26, one reflector 28, one "T" shaped support arm 36, one "H" shaped support arm 38, a plurality of respective plant support arm anchors 42 and hook and eye tape 44. It will be appreciated that there are multiple methods to secure the devices listed within the trellis description with or without securing hardware. It will be appreciated that a singular or plurality of mounting leg 24, crossbeam 26, tower 32, support arm 36 and 38 and reflector 28 devices or any combination present or absent thereof can be designed and considered one device and connected with or without securing hardware. It will be appreciated that hook and eye tape 44 and an anchor 42 can be considered one device. It will be appreciated that hook and eye tape illustrated in FIG. 33, 34, 35, 55, 59 is shown in a vertical orientation for visual purposes, wherein hook and eye tape 44 installed in a personal growing system may be orientated at any angle along any axis.

A trellis 45 is a structural extension of a stand 22 within a PGS utilizing any high flexural strength material that is resistant to oxidation and degradation; wherein preferably a trellis tower 32, crossbeam 26, reflector 28, support arm 36 and 38 and any securing hardware 30 and 40 are comprised of aluminum, zinc plated steel, stainless steel, carbon fiber or any other high flexural strength material that resists oxidation without limitation.

Figure 33:
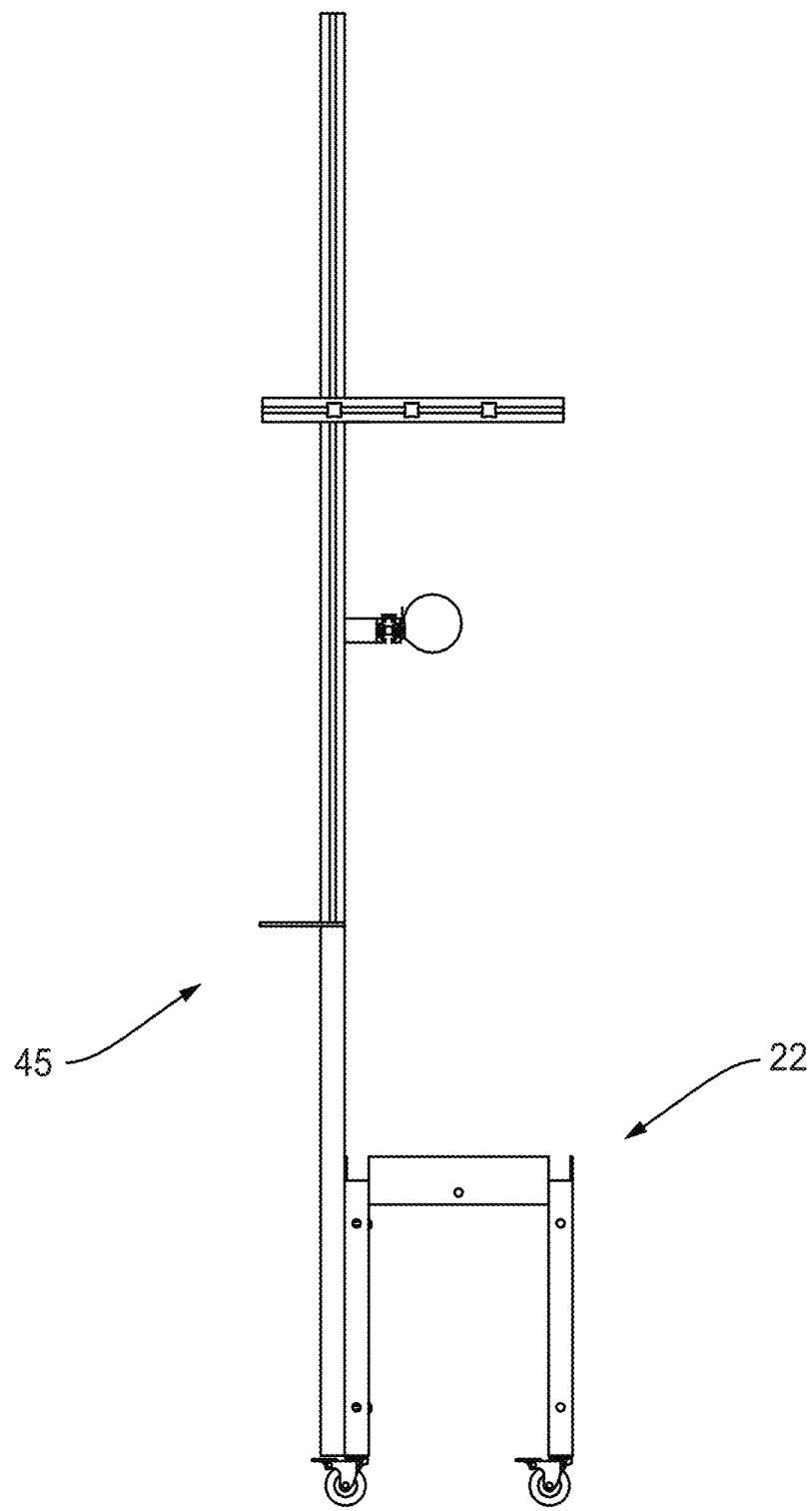
FIG. 33 is a side elevation view of the device of FIG. 30 incorporating "T" and "H" shaped plant support arm devices and the stand device of FIG. 1.
Figure 34:
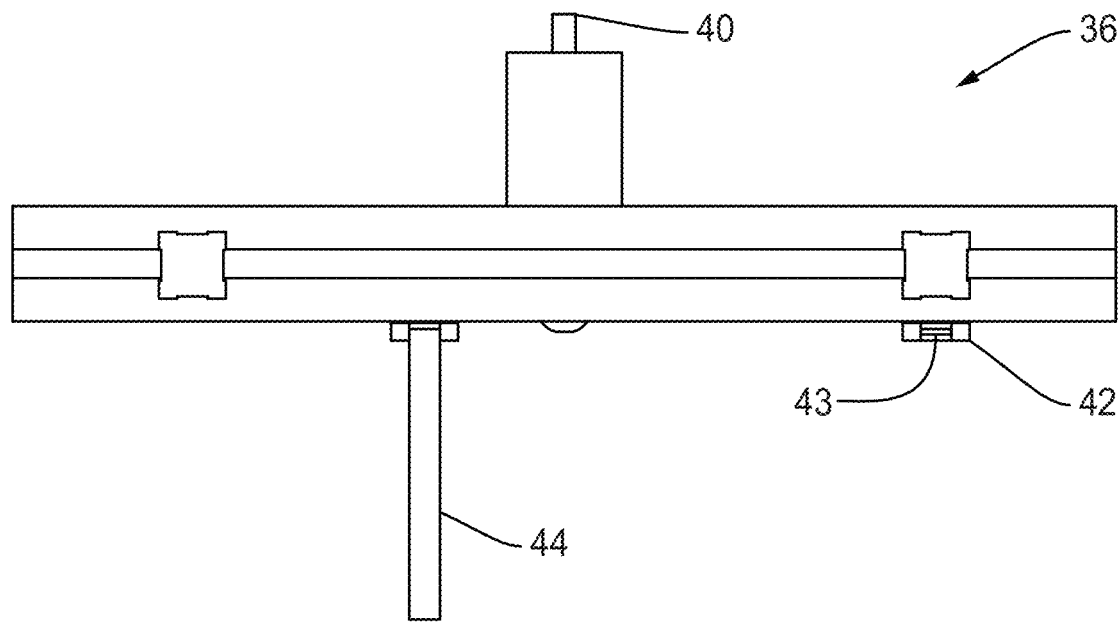
FIG. 34 is a plan view of the "T" shaped plant support arm device of FIG. 32 and FIG. 33.
Figure 35:
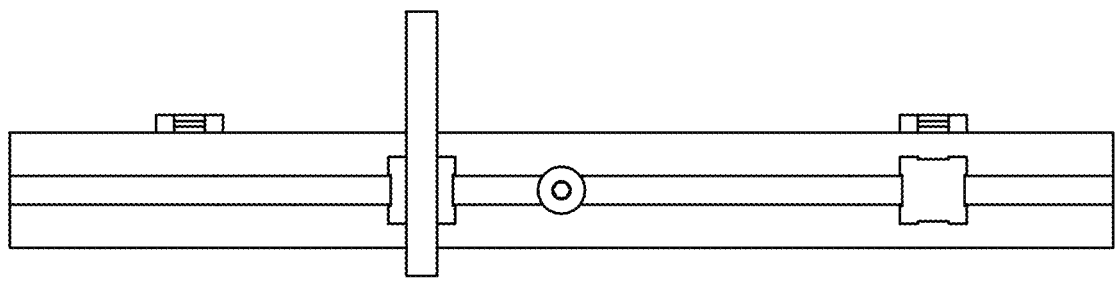
FIG. 35 is a front elevation view of the "T" shaped plant support arm device of FIG. 32 and FIG. 33.
Figure 36:
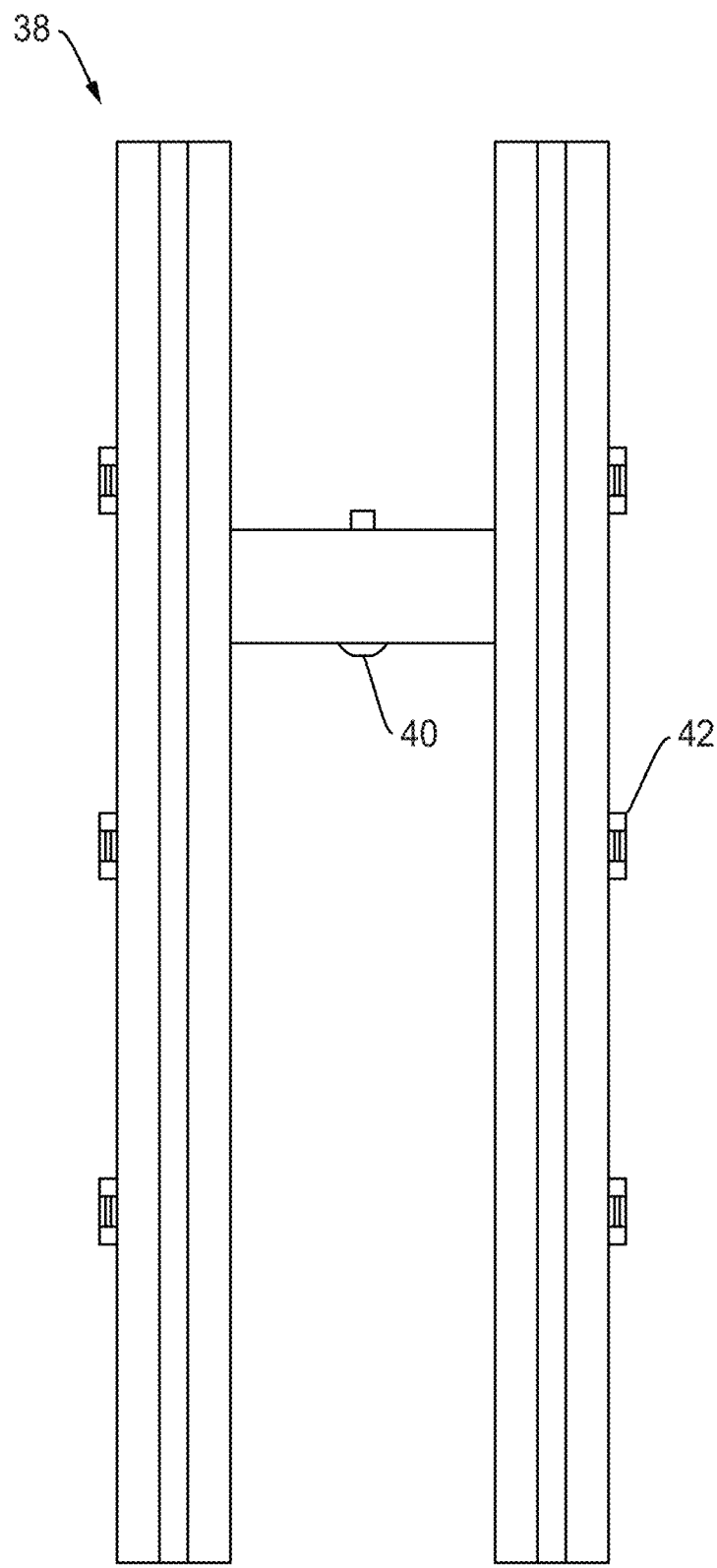
FIG. 36 is a plan view of the "H" shaped plant support arm device of FIG. 32 and FIG. 33.

A trellis mounting leg 24 comprising at least one mounting aperture 31 which preferably includes securing hardware 30 to facilitate the connection of a trellis 45 to a stand 22 via a stand mounting aperture 6 as presented in FIG. 33.

Figure 30:
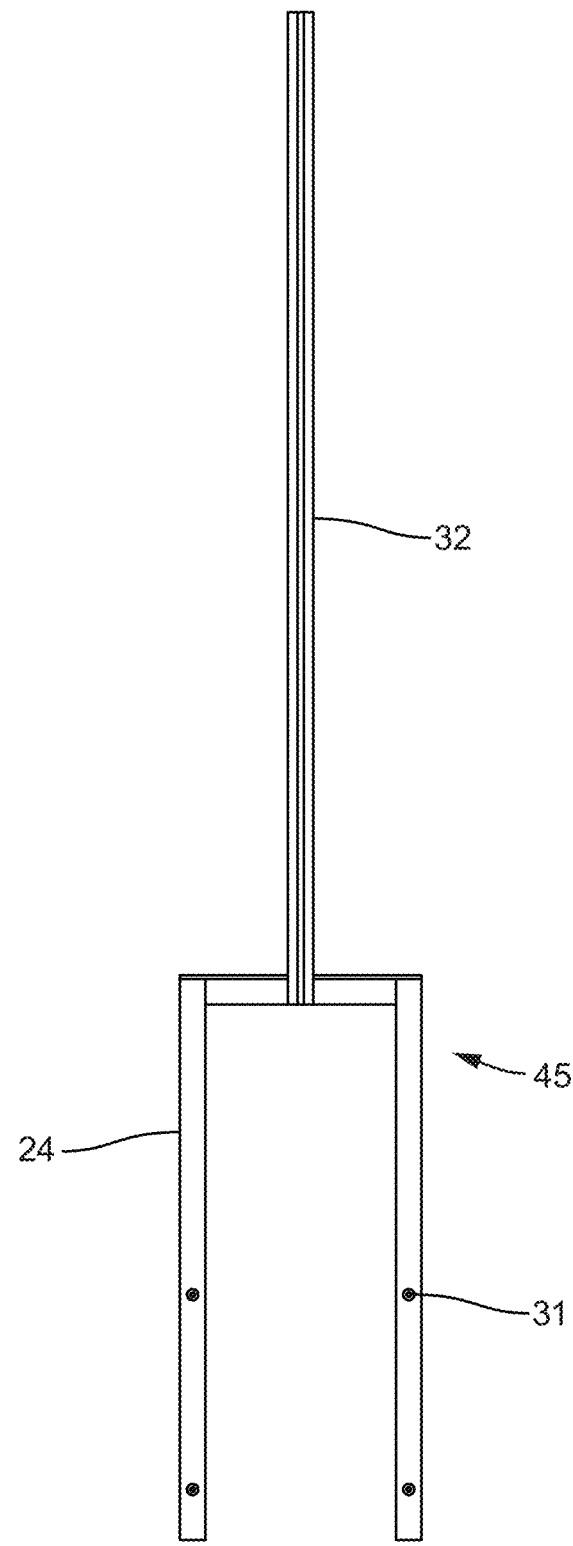
FIG. 30 is a front elevation view of a trellis device for growing plants and seedlings.

A trellis 45 as presented in FIG. 30 preferably incorporates two horizontal crossbeams 26 which connect two vertical mounting legs 24 to one vertical tower 32 without securing hardware. It will be appreciated that a trellis 45 can contain a singular crossbeam or be designed without a crossbeam.

Figure 55:
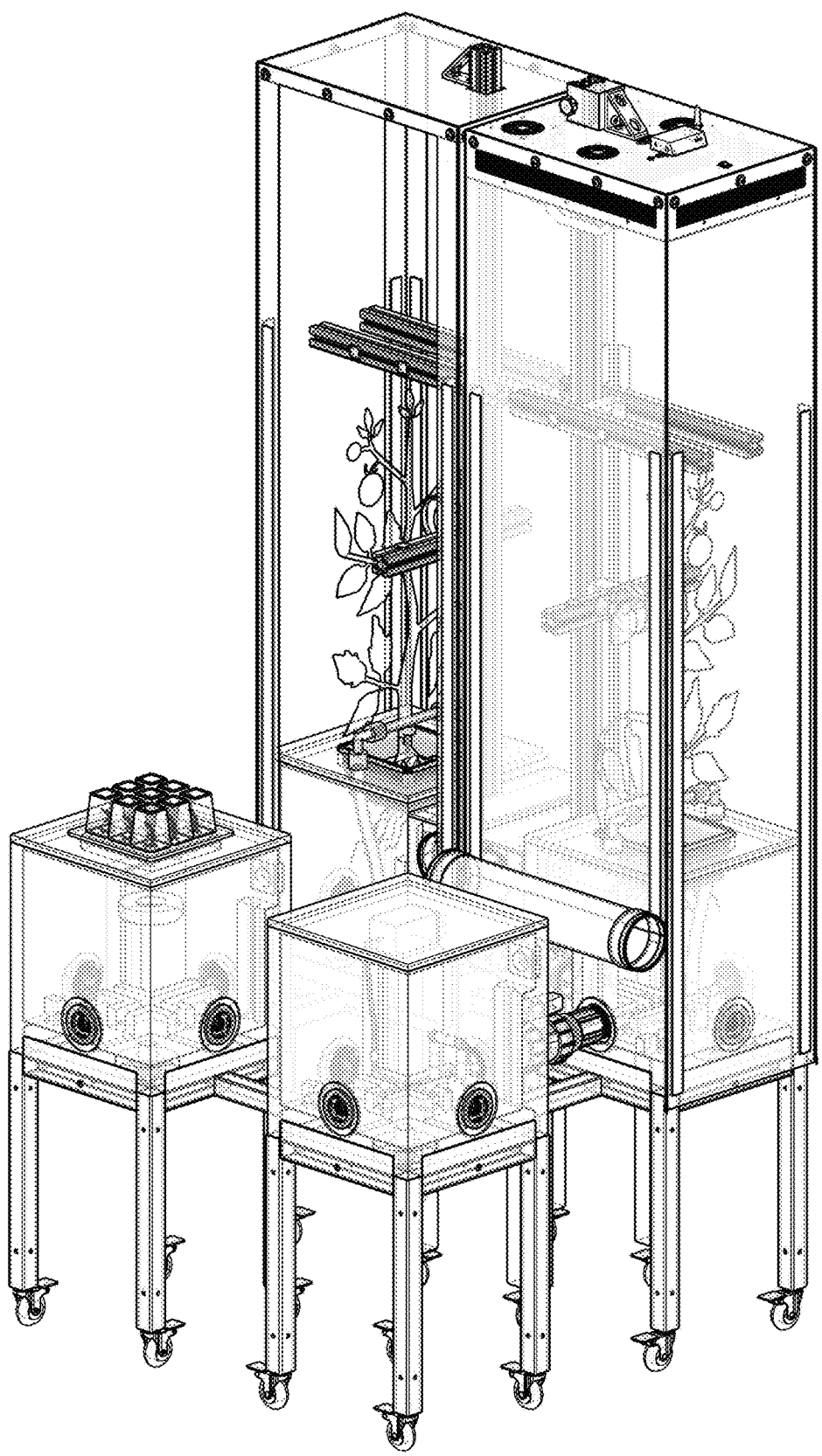
FIG. 55 is an x-ray perspective view of FIG. 54.

Surrounding a tower 32 and oriented parallel to a crossbeam 26, a reflector 28 is preferably bonded without securing hardware to the top facet of the superior end of mounting legs 24 as presented in FIG. 32, which provides additional structural support to a trellis 45, reflects light emitted from an optional luminaire 140 or the sun towards a desired plant 125 or seedling 93 and when utilized with an enclosure within a PGS as presented in FIG. 55, a reflector provides a physical barrier to prevent the passage of pests within a PGS as part of an integrated pest management solution. It will be appreciated that optional apertures within a reflector 28 can be utilized advantageously to install plant ventilation fans, carbon dioxide injection sites and environmental sensors.

Figure 31:
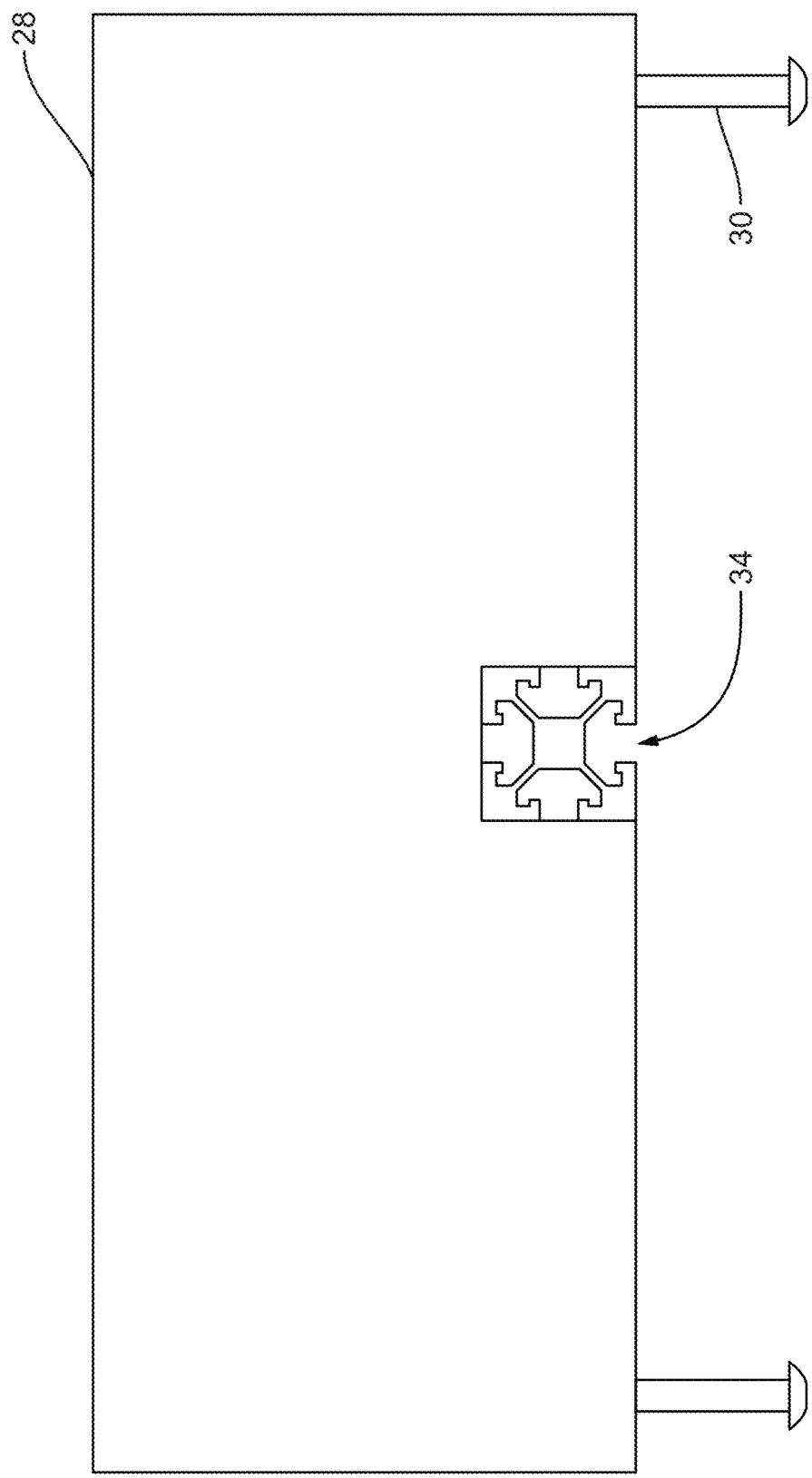
FIG. 31 is a top plan view of the device of FIG. 30.

Upon plan view, preferably as presented in FIG. 31, a trellis tower 32 and a support arm 36, 38 comprising a plurality of channels 34, which are utilized as conduits to protect electrical wires and to provide a plurality of mounting locations and range of motion for optional devices and accessories not limited to a luminaire 140, a net enclosure 232, an anchor 42 and a support arm 36,38.

A trellis 45 introduces a unique advanced form of espalier plant training via one or a plurality of adaptive and infinitely adjustable plant support arms 36 and 38 preferably secured to a tower 32 within a channel 34; wherein by adjusting the tension of securing hardware 40, a plant support arm 36 and 38 can be vertically adjusted infinitely within a tower 32 channel 34 as needed to accommodate the growth of a desired plant 125 or seedling 93. It will be appreciated that a plant support arm 36 and 38 can be secured and adjusted infinitely within a channel 34 of an additional plant support arm 36 and 38.

The purpose of a plant support arm 36 and 38 is to foster and guide plant growth in a desired horizontal and vertical direction. While a majority of plants naturally grow vertically toward a light source, classic espalier training achieves a higher yield in a smaller area by forcing a plant to grow horizontally upon a vertical plane while encouraging equal spacing between branches. A vertical plane within classic espalier training utilizes a two dimensional plane not limited to walls and fences comprised of a Z and a Y axis to maximize the yield in a growing area. A trellis 45 expands on the principles of classic espalier with the addition of a third dimension; axis X, to provide optimal support within a growing volume.

A plant support arm 36 and 38 can center a plant branch evenly within a growing volume; wherein the growth of a plant 125 utilizing a trellis can be maximized. Depending on a desired plant 125 or seedling 93 and its physiology, one or a plurality of uniquely shaped plant support arms can be utilized in any combination secured within a channel 34 of a trellis tower 32 or an additional plant support arm to achieve optimum yields. The shape of a support arm can be understood as a letter C, E, H, I, O, T, U, V, X or Y in the Latin alphabet upon any view or any inverse of the understood letter in capital or lowercase. Upon plan view as presented in FIG. 34, a preferred embodiment of a support arm 36 can be understood as the inverse of the letter "T". Preferably upon plan view as presented in FIG. 36, a preferred embodiment of a support arm 38 can be understood as the letter "H". A preferable combination of support arms 36 and 38 utilized within a trellis 45 as presented in FIG. 32 provides a desired plant 125 or seedling 93 with optimal locations for support to enhance growth dependent on a desired plant's physiology to increase yield utilizing one or a plurality of main branches which divide into a plurality of auxiliary branches. It will be appreciated that a singular or a plurality of plant support arms utilizing the shapes described herein in any combination may be utilized to optimize the yield and or performance of a desired plant 125 or seedling 93.

Preferably as presented in FIG. 32, an anchor 42 can be infinitely adjusted and secured within any channel 34 located within a support arm 36 and 38 and or a tower 32. As preferably presented in FIG. 34, hook and eye tape 44 can be inserted and secured through an anchor aperture 43 to surround a part of a desired plant 125 or seedling 93 and secure a part of a desired plant or seedling by adhering unto itself to create a supportive and unrestrictive loop which can be infinitely adjusted as a plant or seedling matures.

The described evolution of espalier herein offered by the unique features of a trellis 45 maximize the growth of a desired plant 125 or seedling 93 by giving the user the ability to provide optimal branch spacing in three dimensions based on the physiology of a desired plant 125 or seedling 93 which can allow an optimal intensity of natural or artificial light to more efficiently penetrate a plant canopy to facilitate enhanced plant growth.

Luminaire

Figure 37:
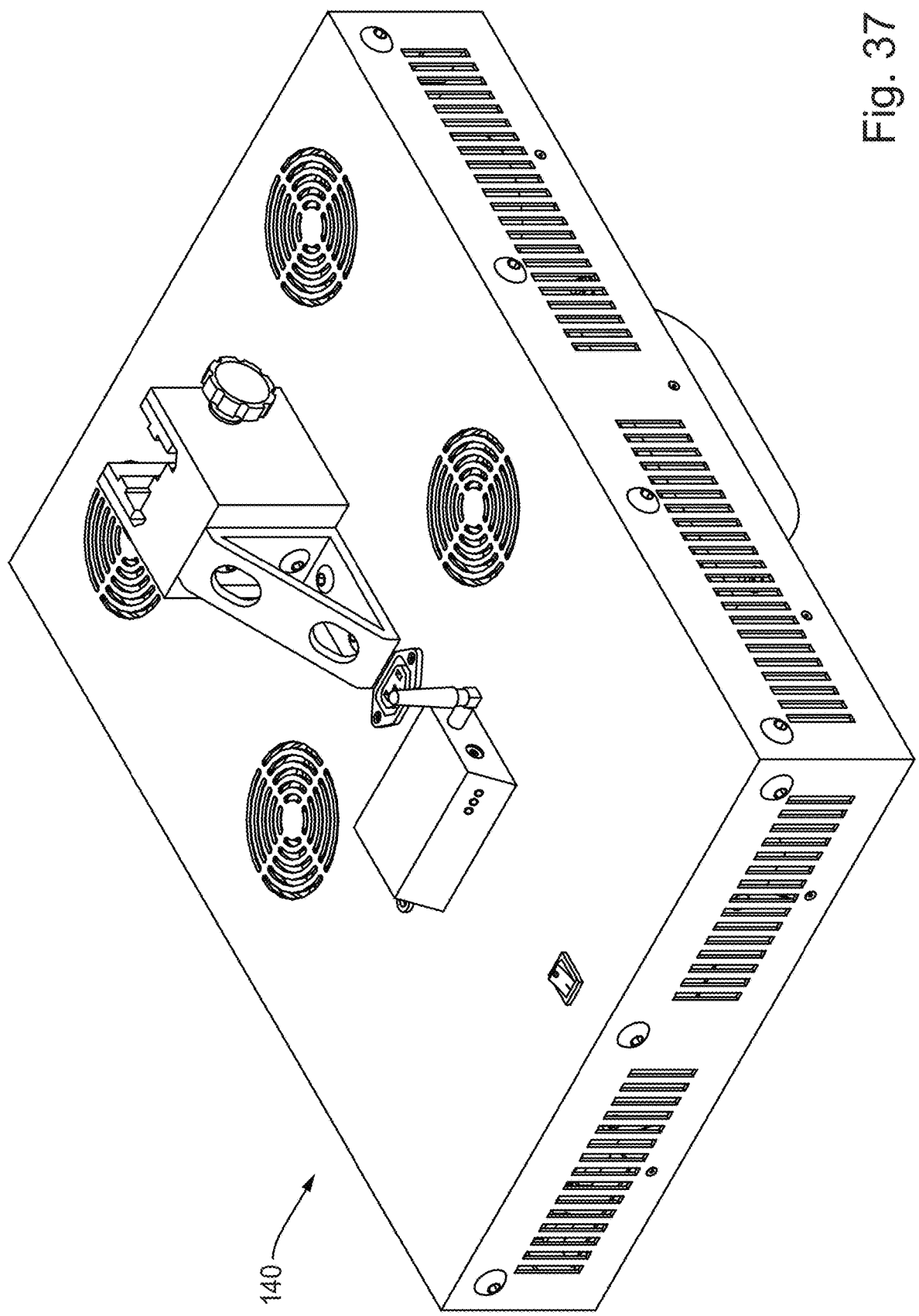
FIG. 37 is a perspective view of a luminaire device for growing plants and seedlings.

Artificial light is required for plant growth indoors when natural sunlight is not available in the desired intensity, duration or spectrum to achieve optimum photosynthetic activity. There is no replacement for natural sunlight; however a luminaire 140 as presented in FIG. 37, provides artificial light within a PGS which can drastically improve the health, performance and yield of a majority of plants that require photosynthesis to thrive.

It will be appreciated that a luminaire 140 can be utilized within a PGS to also improve the health of humans as a form of light and horticultural therapy to combat disorders including but not limited to seasonal affective disorder, depression, jet lag, sleep disorders, dementia, mood disorder, hypertension, memory disorders, addiction, post-traumatic stress disorder and disorders caused by abuse.

To provide optimal photosynthetic photon flux density, a luminaire 140 can be vertically adjusted to maintain a desired distance between a lamp or plurality of lamps within a luminaire and a plant canopy. It will be appreciated that while this description herein includes a manual vertical adjustment method for a luminaire, electronic vertical adjustment via wired or wireless methods are possible.

Figure 54:
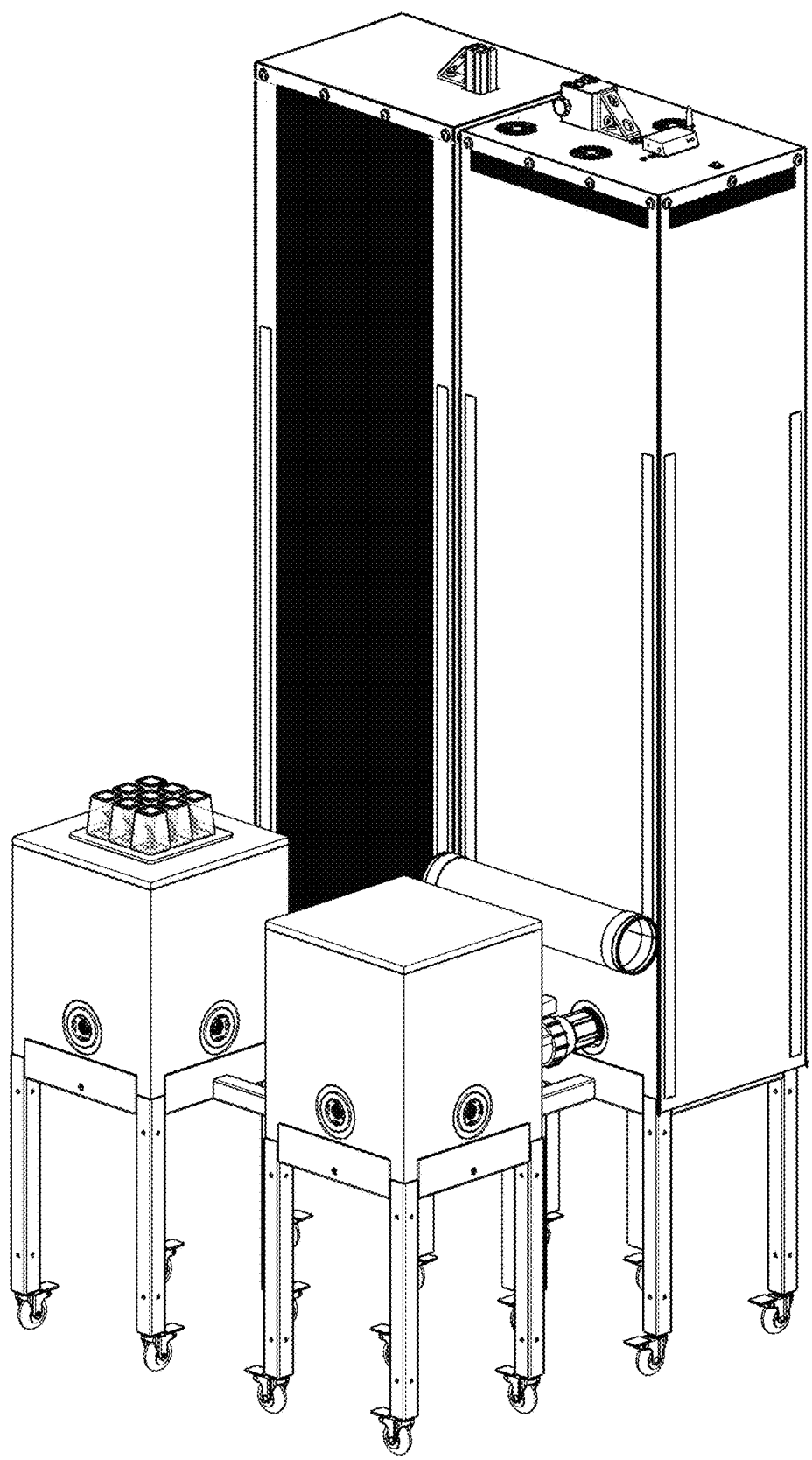
FIG. 54 is a perspective view of a personal growing system consisting of four stand devices of FIG. 1 incorporating a plurality of four stand connection beams, one propagation vessel device of FIG. 14, one reservoir vessel device of FIG. 19, a plurality of two growing vessel devices of FIG. 24 incorporating a plurality of four vessel connection pipes and a plurality of two ball valves, a plurality of two trellis devices of FIG. 30 incorporating a plurality of two "T" shaped and two "H" shaped support arm devices of FIGS. 32 and 33, one luminaire device of FIG. 37, one luminaire enclosure device of FIG. 47 and one net enclosure device of FIG. 51.

A luminaire 140 comprises a superior physical barrier to prevent the passage of pests while facilitating air circulation, filtration and exhaust within and around the PGS when a luminaire enclosure 224 is being utilized as presented in FIG. 54.

A luminaire 140 comprising at least one lamp 157, one power supply 162, one mounting point to connect to and provide vertical movement on a trellis described herein as a linear bearing assembly 210 and one luminaire enclosure mounting aperture 152. It will be appreciated that a lamp with the structural and functional integrity of a luminaire described herein can be utilized in lieu of a luminaire. Additionally, it will be appreciated that one or a plurality of standard growing lamps or luminaire can be used in lieu of a luminaire described herein with a PGS in a typical greenhouse or grow-room environment not limited to a high intensity discharge lamp utilizing sodium or metal halide, or light emitting diode.

Figure 38:
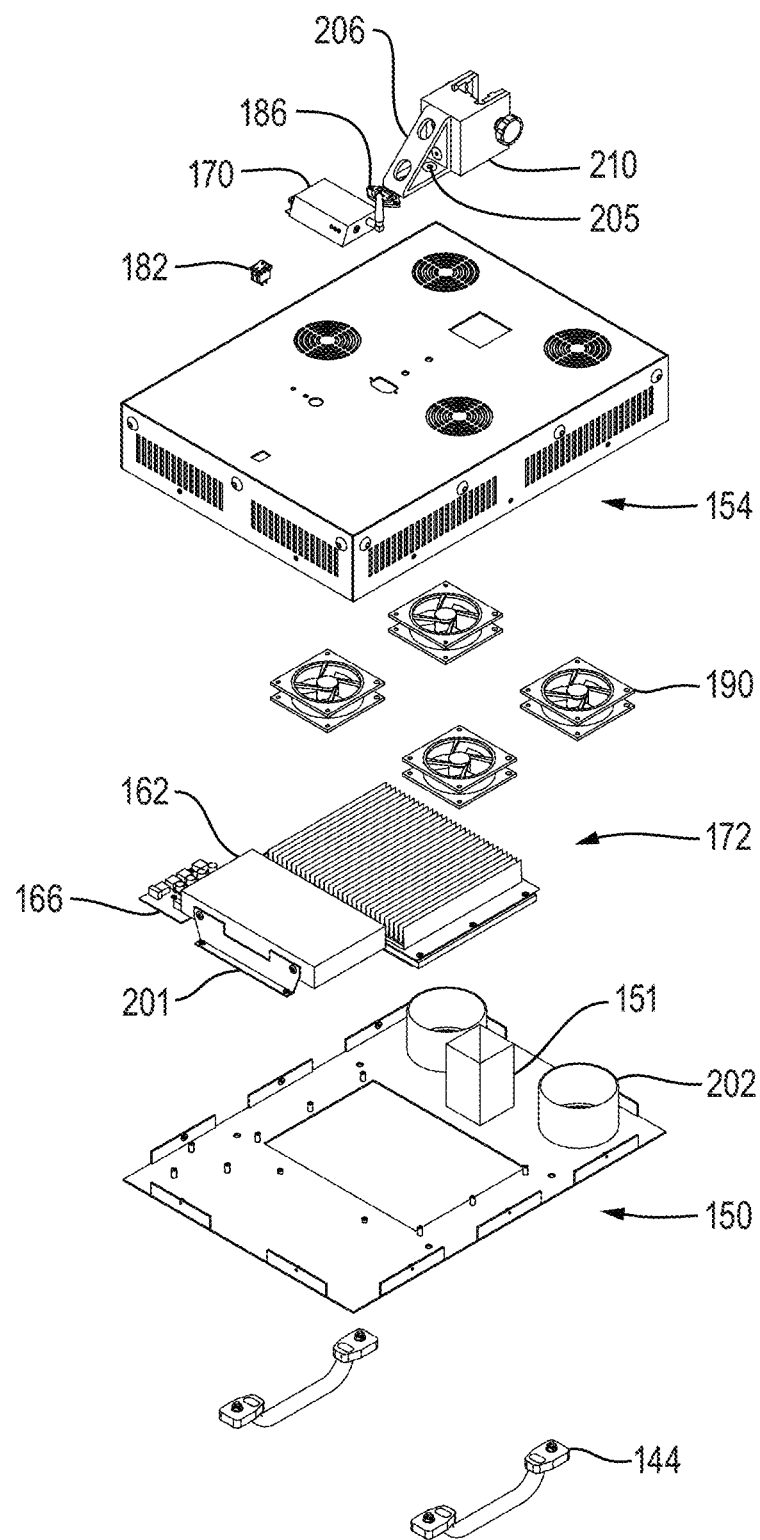
FIG. 38 is an exploded perspective view of the device of FIG. 37.

A preferable embodiment of a luminaire 140 as presented in FIG. 38 is the dimensional area upon a plan view of a incorporated stand and trellis within a PGS and is comprised of one housing assembly 150 and 154, one lamp assembly 172, one power supply 162 and a plurality of two respective brackets 201, one lamp control board 164, a plurality of two wired data communication ports 179, one wireless data communication device 170, a plurality of four fans 190, one linear bearing assembly 210 and respective bracket 206, one electrical switch 182, one electrical receptacle 186, all respective securing hardware 205,192, 200, 142, 193, 204, 212, 208, 181, 189 and 173 and all respective wiring.

A luminaire 140 is a structural extension of a trellis which must be able to support the weight of luminaire enclosure 224 suspended from at least one enclosure mounting aperture 152 by utilizing any high flexural strength material that is resistant to oxidation and degradation; wherein preferably a housing assembly, lamp assembly 172, power supply bracket 201, linear bearing assembly 210 and bracket 206 and any additional securing hardware 205, 192, 200, 142, 193, 204, 212, 208, 181, 189 and 173 are comprised of aluminum, zinc plated steel, stainless steel, carbon fiber or any other high flexural strength material that resists oxidation without limitation.

Preferably, a power supply 162 within a luminaire is comprised of and not limited to a standard light-emitting diode (LED) driver which converts and reduces an alternating current of electricity to an operationally safe direct current input from the electrical receptacle 186, controlled by the electrical switch 182 and output to a lamp control board 166, a wireless data communication device 170, a LED board 156 and a plurality of four fans 190.

Preferably, a housing assembly of a luminaire 140 is comprised of an upper housing 154 and a lower housing 150 as presented in FIG. 38 and is assembled utilizing securing hardware 192. It will be appreciated that is possible to construct a luminaire without an upper and lower housing provided the luminaire is designed in a manner to enable air circulation around a plant below, accommodate electrical connections, provide a trellis mounting point, aid in vertical movement of the luminaire and support the weight and dimensions of a luminaire enclosure. It will be appreciated that apertures within a reflector luminaire can be utilized advantageously to install carbon dioxide injection, filtration and environmental sensors.

Luminaire Upper Housing

A luminaire upper housing 154 preferably comprising a plurality of apertures that can be any shape upon any respective view to direct air flow, accommodate electrical connections, provide a mounting point to the trellis, aid in vertical movement of the luminaire, secure the upper housing to the lower housing and provide mounting points for a luminaire enclosure.

Figure 40:
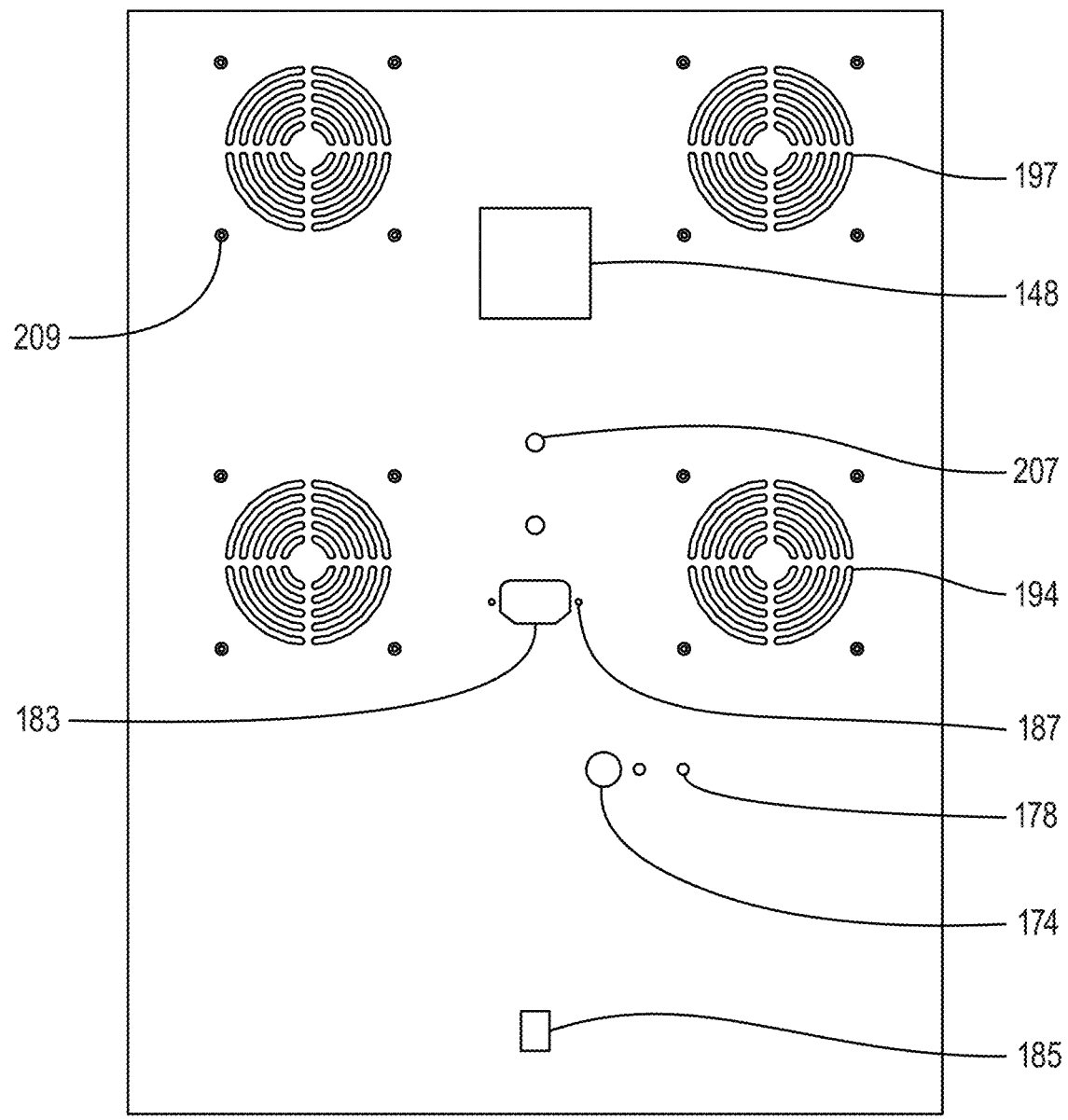
FIG. 40 is a bottom plan view of the luminaire upper housing of the device of FIG. 37.

A preferred embodiment of an upper housing as presented in FIG. 40 comprising four sets of a plurality of horizontal apertures 197 and 194 to direct air flow; wherein two sets of a plurality of apertures 197 located at a distal end of an upper housing opposing a power switch aperture 185 intake air from within the growing volume and exhaust the air outside of a PGS with the intent to ventilate and decrease the temperature and the humidity of the growing volume; wherein two sets of a plurality of apertures 194 located central within an upper housing intake ambient air from outside of a PGS and exhaust the air through eight sets of a plurality of vertical upper housing luminaire air exhaust apertures 198 to direct air flow out from within the interior of the luminaire with the intent to cool the lamp assembly 172.

Preferably a plurality of four fans 190 mount to a plurality of sixteen upper housing fan mounting locations 209 facing their respective flow directions dictated by and secured over four sets of a plurality of apertures 197 and 194 utilizing securing hardware 193 inserted through fan mounting apertures 191. It will be appreciated that each individual fan can be wired to a temperature or humidity sensor circuit to regulate operation. It will also be appreciated that a luminaire can provide sufficient air circulation not limited to fans. It will be further appreciated that without the presence of a luminaire housing 150, 154 comprising a luminaire, fans may not be necessary.

An upper housing as presented in FIG. 40, preferably comprising one central horizontal aperture 183 and two auxiliary horizontal apertures 187 to mount an electrical receptacle 186 utilizing securing hardware 181 in order to power a luminaire.

Preferably a power switch 182 mounts without securing hardware within a horizontal aperture 185 distal to the electrical receptacle aperture 183 and opposes the two sets of a plurality of apertures which output air 197.

An upper housing preferably comprising one central horizontal aperture 174 to mount a wireless data communication device 170 and a plurality of two wired data communication port apertures 178 to mount two wired data communication ports 179 without securing hardware.

Figure 59:
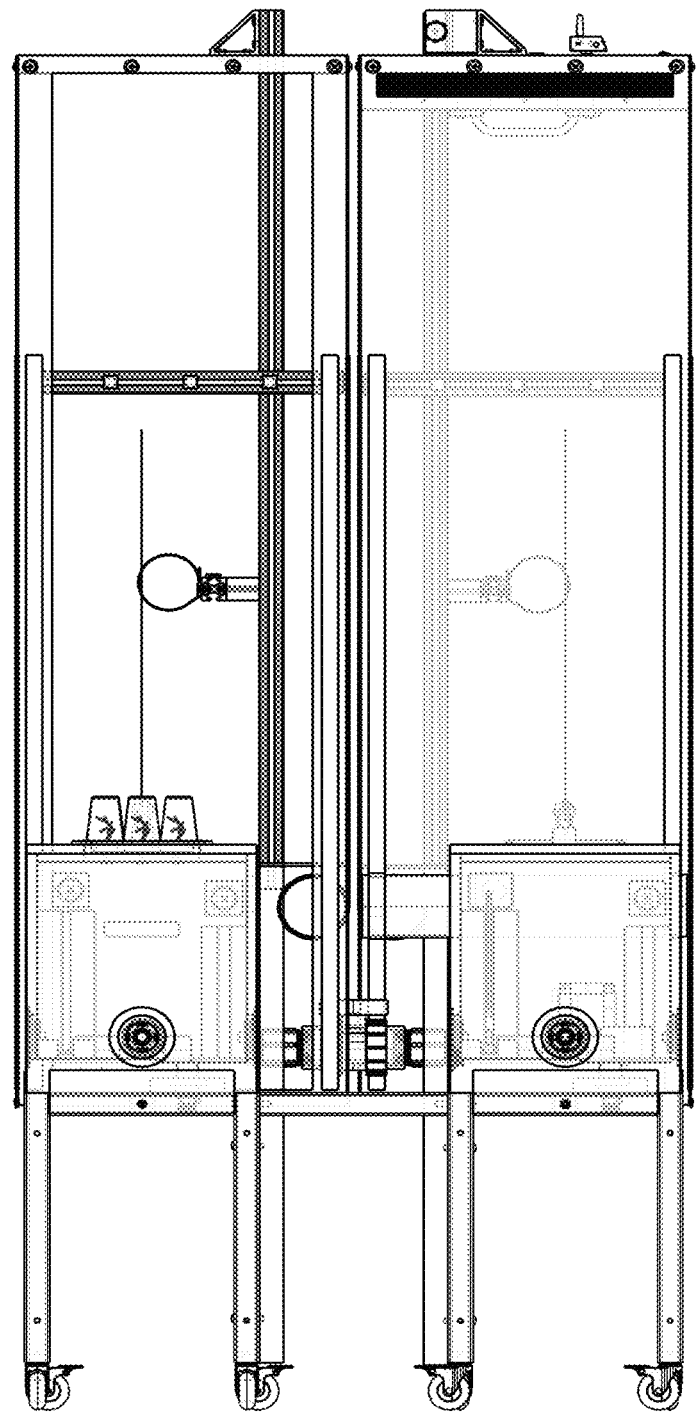
FIG. 59 is an x-ray view of FIG. 58.

An upper housing comprising at least one horizontal vertical movement aperture 148 preferably located distal to the electrical receptacle aperture 183 and opposing a power switch aperture 185; wherein an upper housing vertical movement aperture 148, 149 allows a trellis tower 32 to pass through a luminaire 140 as presented in FIG. 59. A vertical movement aperture 148, 149 is centrally located in the luminaire, which reduces deflection of a cantilevered mounted luminaire and respective enclosure when mounted to a trellis tower 32 and decreases the friction from deflection of a luminaire mounting not limited to a linear bearing bracket 206 while allowing for vertical movement of a luminaire.

An upper housing preferably comprising two central horizontal bracket mounting apertures 207 to bond a linear bearing bracket 206 with securing hardware 205. It will be appreciated that a linear bearing bracket 206 and a standard linear bearing assembly 210 can be designed and considered one device, a linear bearing bracket 206 can be designed into a luminaire 140 and considered one device and a linear bearing bracket 206, a linear bearing assembly 210 and a luminaire 140 can be designed and considered one device.

An upper housing vertical movement aperture 148 within a luminaire 140 and the respective position of a horizontal bracket mounting aperture 207 mount the luminaire closer to its center of mass which achieves a more precise angle of light output toward the center of the growing volume and presents a more balanced PGS to increase overall safety.

Figure 56:
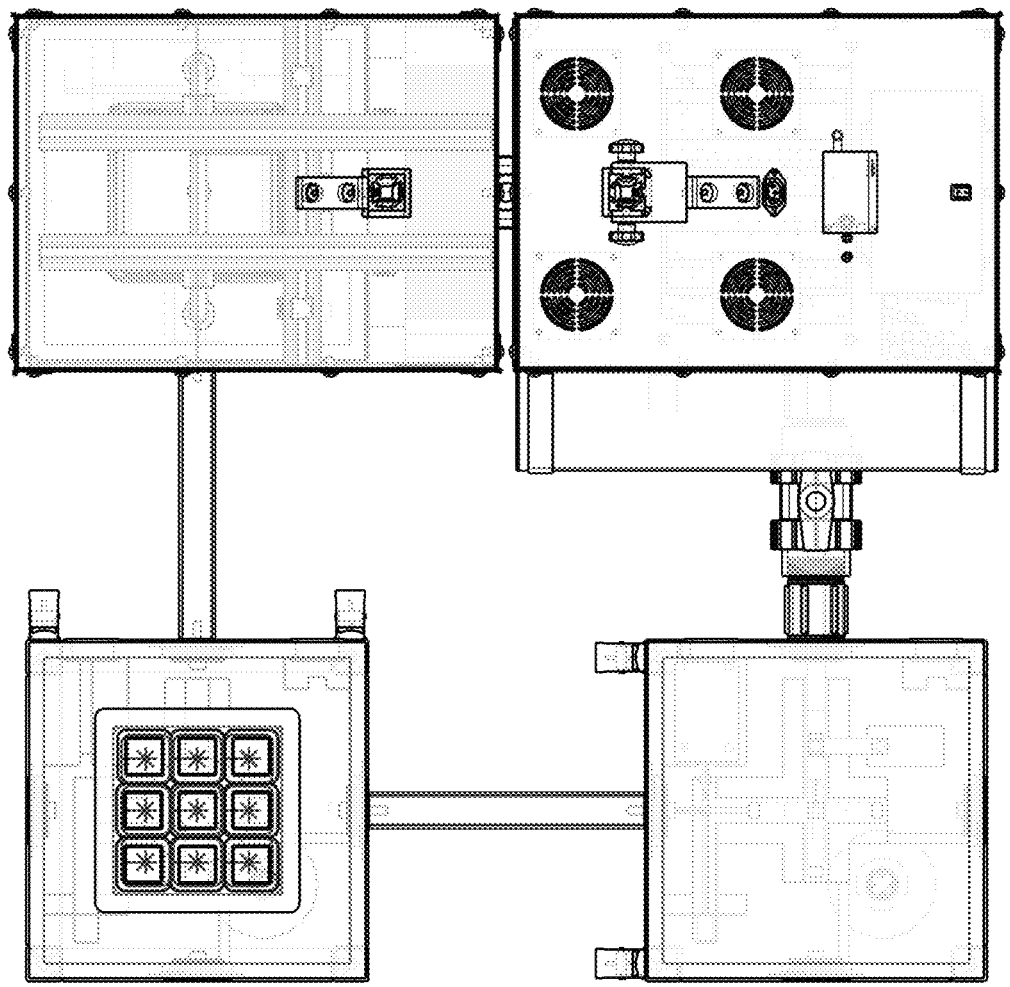
FIG. 56 is a top plan x-ray view of the device of FIG. 54.

A preferred embodiment of a standard linear bearing 210 (containing a plurality of two brake securing bolts 208 and adjustment nuts 212) and respective bracket 206 bonded with securing hardware 205 as presented in FIG. 56, can secure the weight of a luminaire cantilevered at any mounting point along the length of a trellis tower 32. By adjusting the tension of a linear bearing brake securing bolt 208 head preferably within the anterior trellis tower 32 channel 34 utilizing a linear bearing brake adjustment nut 212, the user is able to infinitely adjust and secure the vertical position of a luminaire 140.

An upper housing preferably comprising a plurality of fourteen luminaire enclosure mounting vertical apertures 152 which provide mounting points to join a luminaire enclosure 224 to a luminaire 140 utilizing securing hardware 142 as presented in FIG. 54.

Figure 41:
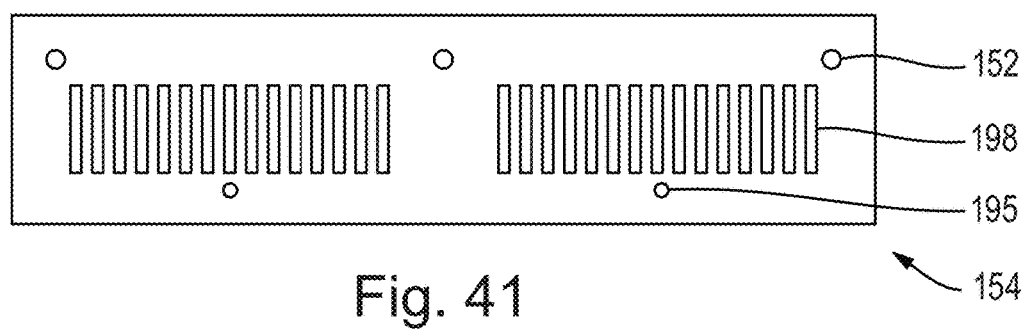
FIG. 41 is a front and rear elevation view of the luminaire upper housing of the device of FIG. 37.
Figure 42:
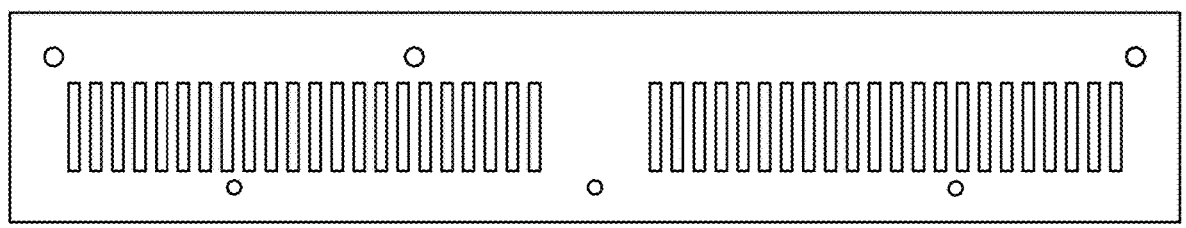
FIG. 42 is a side elevation view of the luminaire upper housing of the device of FIG. 37.

Presented in FIG. 41, an upper housing preferably comprising a plurality of ten vertical apertures 195 that provide mounting points to join the upper housing to vertical mounting apertures within a lower housing 199 utilizing securing hardware 192.

Luminaire Lower Housing

A luminaire lower housing 150 preferably comprising a plurality of apertures that can be any shape upon any view to direct air flow, allow the passage of light, aid in vertical movement of the luminaire, secure the lower housing to the upper housing and provide mounting points for a lamp assembly 172, a power supply 162 and a lamp control board 166.

Figure 43:
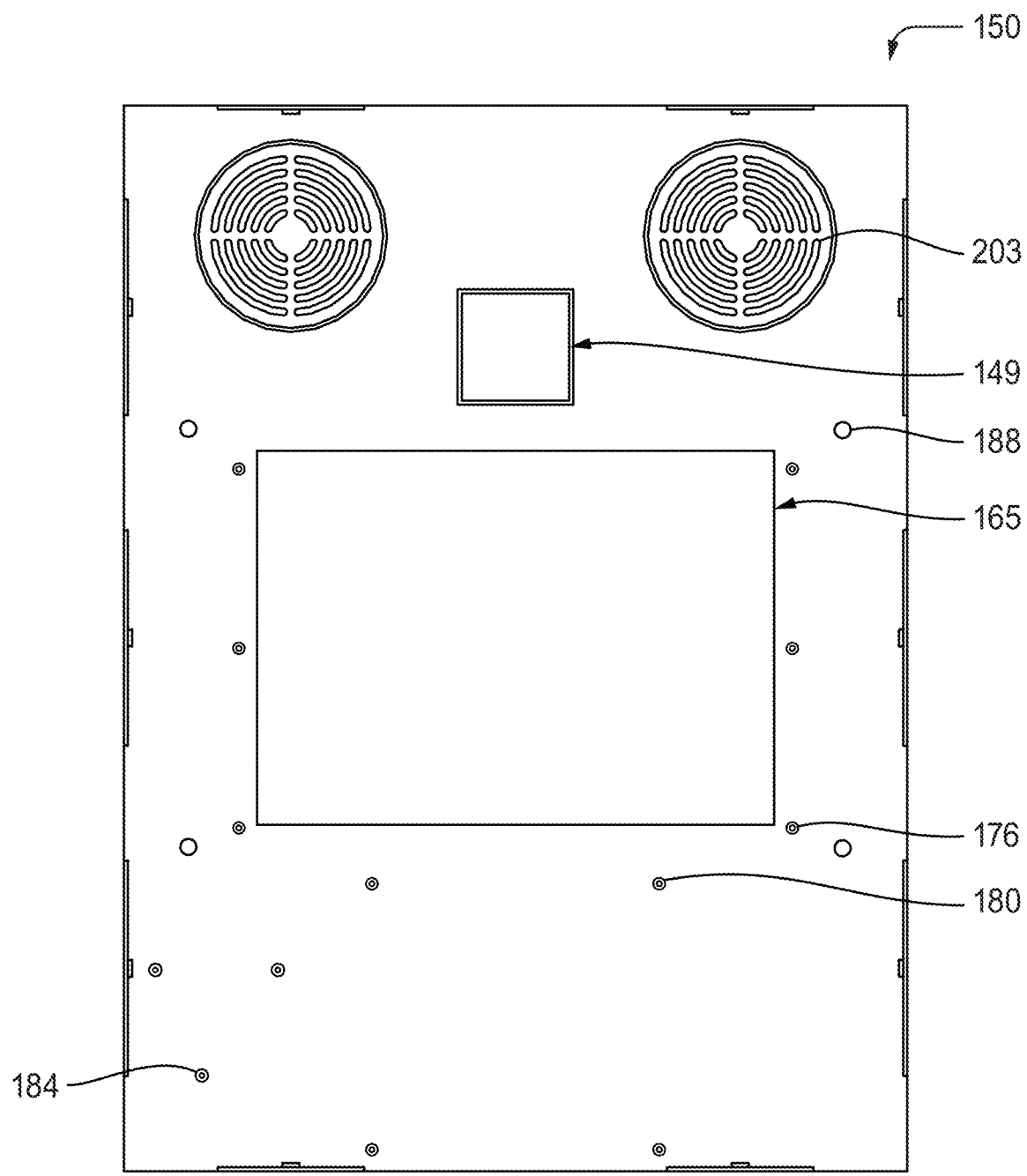
FIG. 43 is a top plan view of the luminaire lower housing of the device of FIG. 37.

A preferred embodiment of a lower housing as presented in FIG. 43 comprising two sets of a plurality of horizontal apertures 203 and respective air ducts 202 to allow the passage of warm air within the growing volume upward exhausted to the exterior of a luminaire 140, growing volume and a respective PGS directed through the two sets of a plurality of apertures 197 utilizing the mechanical assistance of a plurality of two respective fans 190; wherein the two sets of a plurality of horizontal apertures 203 and their respective air ducts 202 are located vertically inferior to the two sets of a plurality of apertures 197 as presented in FIG. 37. It will be appreciated that any filter compound or device not limited to activated charcoal filter media can be utilized within air ducts 202 to filter air that passes through a luminaire to or from the growing volume.

A lower housing comprising at least one central horizontal light aperture 165 to facilitate the passage of light toward a desired plant 125 or seedling 93 originating from a lamp assembly 172.

A lower housing comprising at least one horizontal vertical movement aperture 149 and a respective vertical movement duct 151 both preferably located distal within a lower housing and vertically inferior to a upper housing vertical movement aperture 148; wherein a lower housing vertical movement aperture 149 and a vertical movement duct 151 allow a trellis tower 32 to pass through a luminaire 140 as presented in FIG. 59.

A preferred embodiment of a lower housing 150 as presented in FIG. 43 comprising a plurality of two sets of two horizontal handle mounting apertures 188 to provide mounting locations for a plurality of two handles 144 to be installed utilizing securing hardware 189; wherein a handle 144 can provide a secure point from which the user can hold the weight of a luminaire while adjusting the vertical height of a luminaire 140 utilizing a linear bearing assembly 210.

Figure 44:
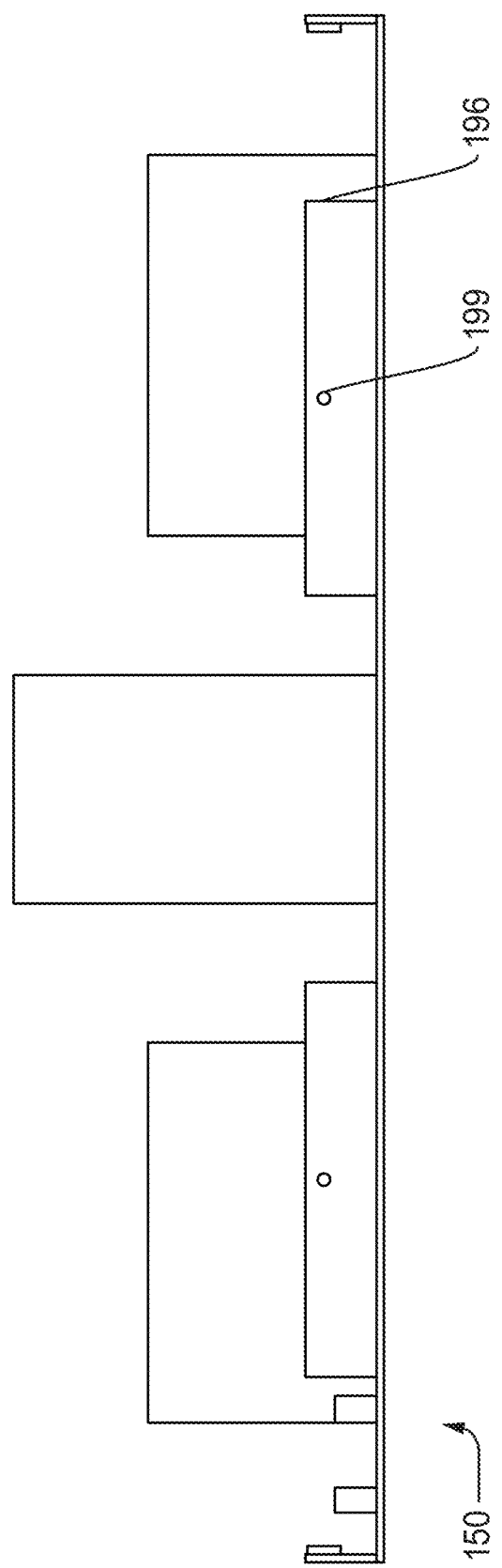
FIG. 44 is a front elevation view of the luminaire lower housing of the device of FIG. 37.
Figure 45:
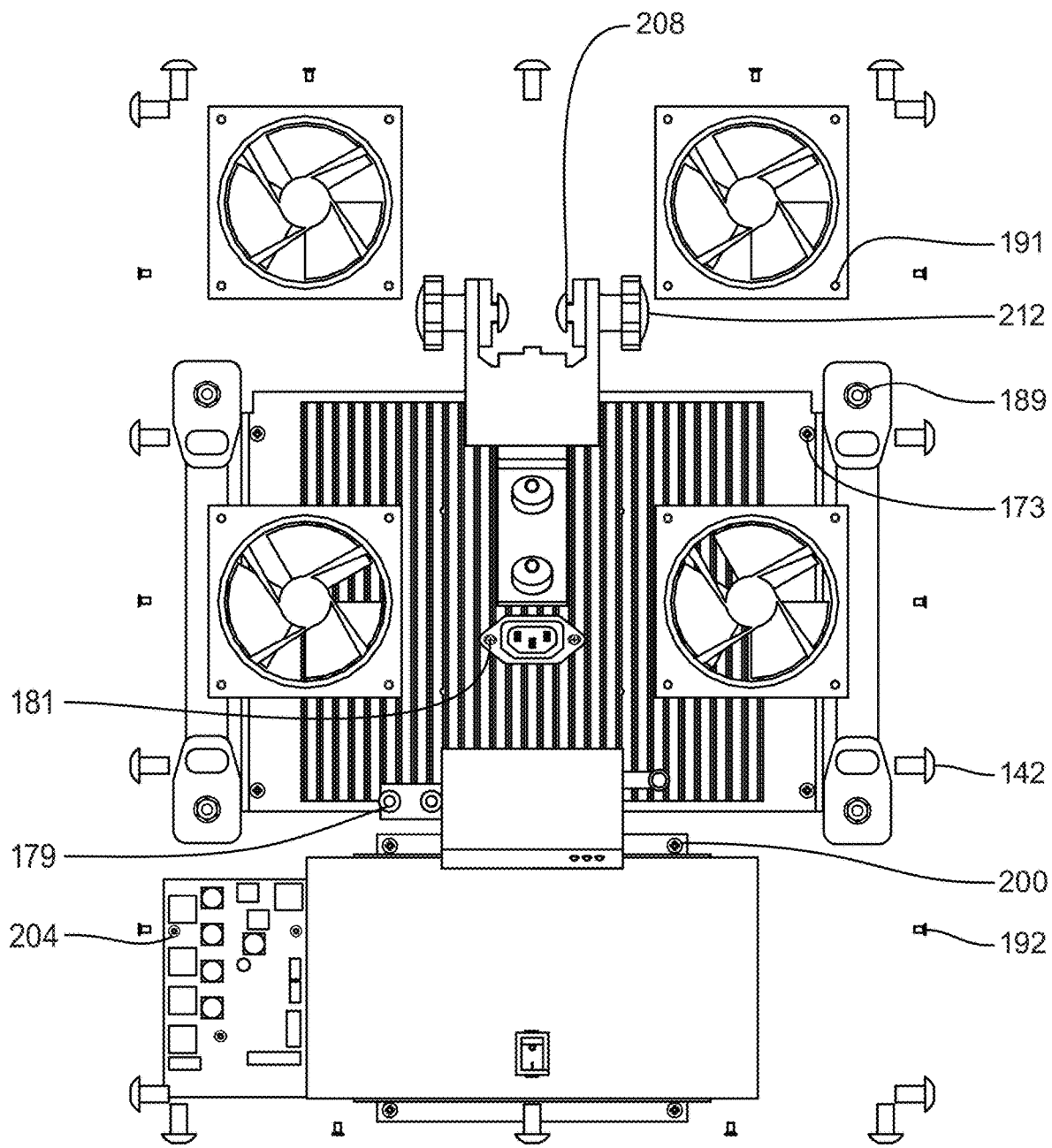
FIG. 45 is a top plan view of the device of FIG. 37 without the luminaire upper and lower housings incorporating securing hardware.
Figure 46:
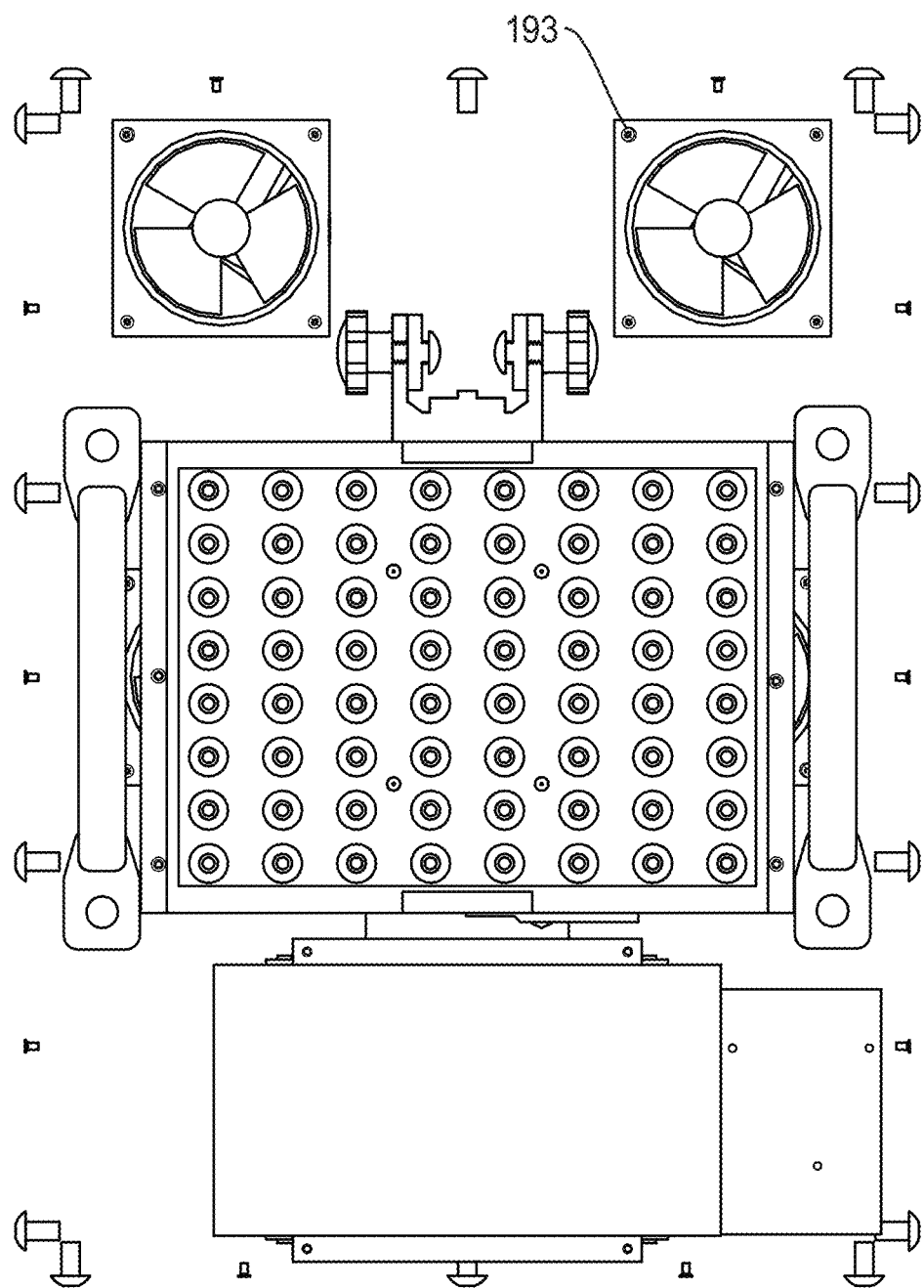
FIG. 46 is a bottom plan view of the device of FIG. 37 without the luminaire upper and lower housings incorporating securing hardware.

Preferably as presented in FIG. 44, an embodiment of a lower housing comprising vertical mounting apertures 199 located on vertical mounting panels 196 to provide mounting points for an upper housing 154 to join with a lower housing 150 utilizing securing hardware 192.

A preferred embodiment of a lower housing 150 as presented in FIG. 43, comprising a plurality of six lamp assembly mounting locations 176 to mount a lamp assembly 172 utilizing lamp assembly securing hardware 173, a plurality of four power supply mounting locations 180 to mount two power supply brackets 201 and a respective power supply 162 utilizing power supply securing hardware 200 and a plurality of three control board mounting locations 184 to mount a lamp control board 166 utilizing control board securing hardware 204.

Luminaire Lamp Assembly

A lamp assembly 172 comprising at least one lamp device 157; wherein the photon output of a lamp can be directed toward a desired plant 125 or seedling 93; wherein a single lamp or a plurality of lamps contained within a luminaire can consist of any light source or combination of a plurality of light sources suitable for plants within an electromagnetic spectrum in a range of 300 and 800 nanometer wavelengths not limited to incandescence, electrical discharge and electroluminescence.

A light-emitting diode (LED) lamp 157 produces a high electroluminescent and low thermal energy output ratio which allows a LED to be placed within one inch of a plant canopy without causing cellular damage which can minimize photon loss and maximize plant growth within a growing volume of a PGS.

Figure 39:
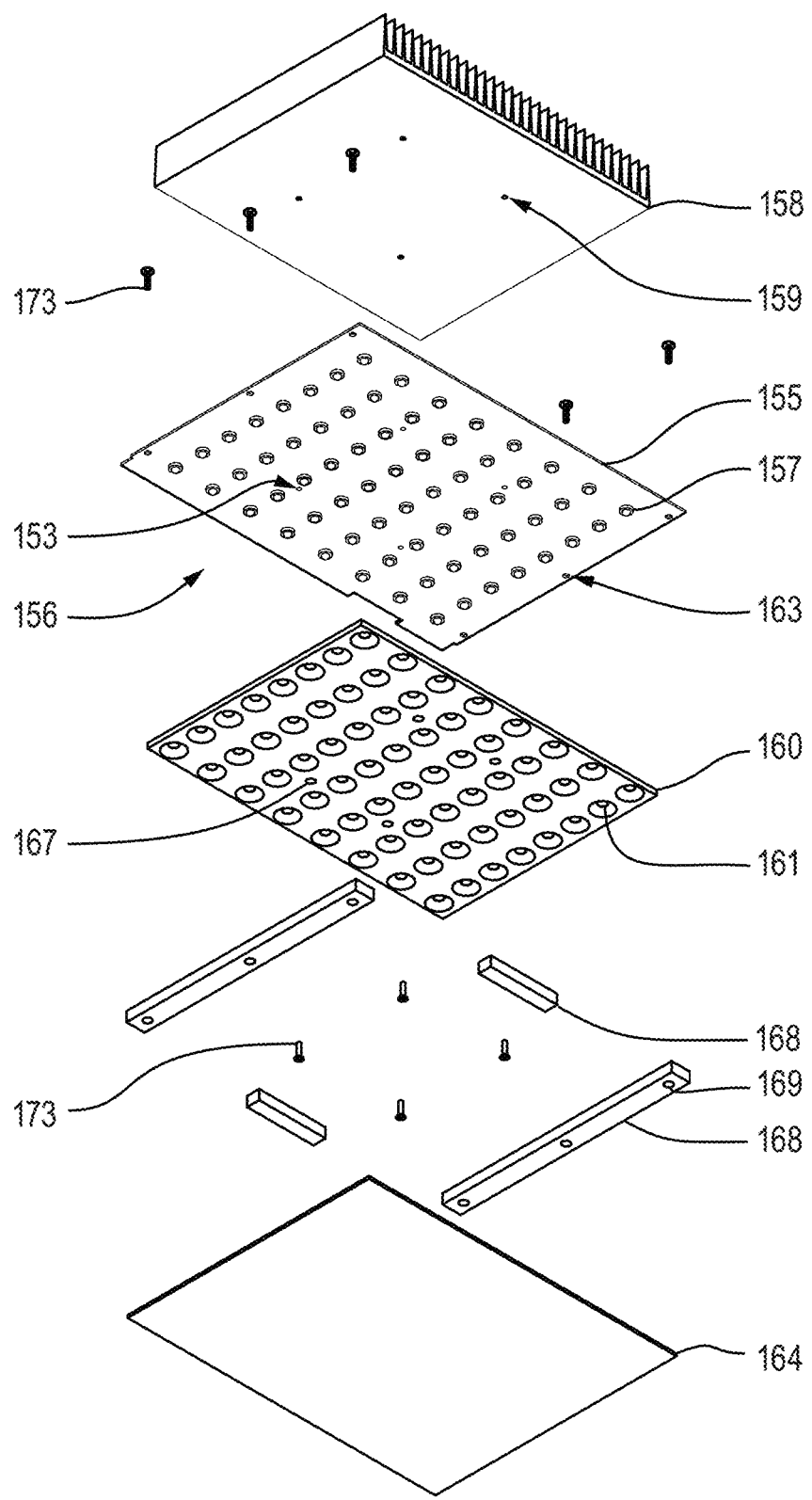
FIG. 39 is an exploded perspective view of the luminaire lamp assembly of the device of FIG. 37.

A preferable embodiment of a lamp assembly 172 as presented in FIG. 39 is comprised of one heatsink 158, one light-emitting diode (LED) board 156, one lamp reflector 160, a plurality of four lamp assembly mounting spacers 168, and one lamp lens 164; wherein a lamp assembly is bonded together and to a lower housing 150 utilizing securing hardware 173.

A standard lamp heatsink 158, preferably comprised of an aluminum base and a plurality of fins or pins and comprising a plurality of four horizontal mounting apertures 159; wherein a plurality of lamp assembly securing hardware 173 bonds a light-emitting diode (LED) board 156 and a lamp reflector 160 to a lamp heatsink 158.

A preferred embodiment of a lamp device is presented in FIG. 39 as a LED board 156 comprised of a plurality of sixty four LED lamps 157 fused to a printed computer board 155 containing a plurality of six mounting apertures 163 to secure the lamp assembly 172 to the lower luminaire housing 150 utilizing lamp assembly securing hardware 173 and a plurality of four mounting apertures 153 to secure the LED board within the lamp assembly utilizing lamp assembly securing hardware 173.

Preferably a lamp reflector 160 directs electroluminescent energy released as photons emitted from a plurality of sixty four LED lamps 157 toward a desired plant 125 or seedling 93 within a PGS through sixty four conical shaped reflector lamp apertures 161; wherein a lamp reflector comprising a plurality of four mounting apertures 167 through which lamp assembly securing hardware 173 bonds a lamp reflector 160, LED board 156 and lamp heatsink 158 together utilizing a plurality of four mounting apertures 167 in this respective order as presented in FIG. 39.

Once a lamp reflector, LED board and lamp heatsink are bonded, preferably securing hardware 173 is placed through a plurality of six LED board mounting apertures 163 followed by a plurality of six spacer mounting apertures 169 within a plurality of two off our opposing lamp assembly mounting spacers 168 and secured to a plurality of six lower housing lamp assembly mounting locations 176.

Lamp assembly mounting spacers 168 provide an optimal vertical clearance for a lamp lens 164 to transmit, refract and direct light between a lamp reflector 160 and a lower housing light aperture 165; wherein a lamp assembly mounting spacer is preferably comprised of any lightweight, high density material including but not limited to wood, aluminum or a high density closed cell foam.

A lamp lens 164 is larger in area than a lower housing light aperture 165 and is preferably comprised of a transparent material able to transmit and direct a high percentage of photons toward a plant including but not limited to glass, polycarbonate, acrylic, plastic polymer and thiourethane; wherein the lamp lens is held securely between a plurality of four lamp assembly mounting spacers 168 and the interior of a lower housing light aperture 165 utilizing the clamping force of lamp assembly securing hardware 173.

It will be appreciated that a luminaire 140 can consist of a singular or a plurality of lamp 157 devices with a respective singular or a plurality of lamp reflectors 160 and a respective singular or a plurality of lamp lenses 164.

Luminaire Control Board

Preferably the intensity, duration and the overall combination of emitted wavelengths of light output from a lamp 157 or a plurality of lamps within a luminaire 140 can be controlled in real time or scheduled utilizing an application located within a control board 204 allowing for precise light management and optimal plant growth.

A lamp 157 or plurality of lamps can be managed by one or a combination of a plurality of lamp controlling devices not limited to a lamp control board 166, a wireless data communication device 170, a wired data communication port 179 and a computer application.

Preferably sixty four LEDs 157 on a lamp assembly printed computer board 155 are divided into four groups of sixteen LEDs referred to and commonly understood herein as channels. It will be appreciated that the number of channels, LEDs and LEDs within a channel is arbitrary provided the optimal photosynthetic photon flux density and photon wavelength combination per the desired plant 125 or seedling 93 can be obtained.

A preferred embodiment of a lamp control board 166 as presented in FIG. 38 controls four channels of sixteen LEDs through a firmware application installed within the lamp control board; wherein the data stored utilized by the firmware within a lamp control board can be modified and distributed through wired or wireless data communication. It will be appreciated that the term firmware can be understood as any executable program stored within any component of a lamp control board 166 and can be synonymous with computer program, application, stored data, software, program, code, computer code and microcode.

Preferred wired communication is achieved through a wired connection between a lamp control board 166 and a singular wired data communication port or a plurality of two wired data communication ports 179; wherein a wired data communication port can send and receive data. It is possible to connect to a wired data communication port 179 to any device not limited to a computer, a mobile computing device or a controller not limited to a DMX512 (digital multiplex 512) controller which has the ability to alter data within a lamp control board 166 providing data in real time or programmed on a schedule. It is preferable with at least a plurality of two wired data communication ports 179 per luminaire 140 to send and receive data utilizing a standard MDB (multi-drop bus) method from a master control board in a luminaire 140 to an infinite plurality of slave control board luminaries in a daisy chain format utilizing a plurality of physically wired electrical data cords which are not limited to any generation, variant or combination of Category 2 through 6a, fiber optic, audio, video and serial cables not limited to RCA (Radio Corporation of America), USB (Universal Serial Bus), SATA (Serial Advanced Technology Attachment), eSATA (external Serial Advanced Technology Attachment), XLR (X-connector Latch Rubber) and Ethernet cables.

A preferred embodiment of wireless data transmission is achieved within a luminaire 140 through a wireless data communication device 170 wired to a lamp control board 166; wherein a wireless data communication device can send and receive wireless data from an external source not limited to a computer, a mobile computing device or a controller not limited to a DMX512 (digital multiplex 512) controller. Wireless modes of communication can include radio, electromagnetic induction, free-space optical, sonic and ultrasonic which can operate through wireless technology not limited to wireless local area network, shortwave ultra high frequency, infrared, low-rate personal area network and high-bandwidth wireless radio communication protocol. Preferably a wireless data communication device 170 presented in FIG. 38 utilizes a wireless local area network to send and receive data between a lamp control board 166 and a computer controlled device not limited to a personal computer, a mobile computing device or a DMX512 controller.

Regardless of the method of data transmission, an external computer device preferably comprising a singular application or plurality of applications that can alter data located in a lamp control board 166; wherein a control board can execute firmware to process desired data installed within to operate a single lamp 157 or plurality of lamps within a singular channel or plurality of channels in a desired intensity and duration independently of an external computer device after a desired wired or wireless data transfer has transpired.

Preferably utilizing a computer application which can transfer data and alter firmware within a lamp control board 166, a user can control the intensity and duration of each of a plurality of four lamp channels in order to artificially simulate the sun's intensity, duration and spectrum to optimize the growth of a desired plant 125 or seedling 93 grown at each stage of life; wherein a luminaire 140 has the ability to simulate a sunrise and sunset.

Enclosure

An enclosure provides an absolute growing volume within a PGS designed with optimal dimensions to define, optimize and control the environment surrounding a desired plant 125 or seedling 93 at all stages of life; wherein preferably the enclosure is the dimensional area upon a plan view of an incorporated stand 22 and trellis 45 within a PGS.

It can be advantageous to maintain a growing volume with a direct relationship to the developing size of a desired plant 125 or seedling 93 being grown; wherein an enclosure has the ability to increase a growing volume as a desired plant 125 or seedling 93 develops.

By providing a physical barrier around a plant, an enclosure isolates a plant to prevent the contraction and spread of unwanted diseases and pests as part of an integrated pest management program.

An enclosure can facilitate optimal ventilation by providing a pathway for air intake and exhaust in and around a plant as well as reflecting and diverting undesired heat away from a growing volume.

An enclosure is comprised of at least one panel which can surround a plant; wherein an enclosure can be made from one or a combination of materials including but not limited to cellulose, plastic, resin, reinforced resin, carbon, glass, steel and aluminum which can include specific materials such as; polyvinyl chloride, polyethylene, polyethylene terephthalate, polypropylene, polyacrylonitrile, acrylic, epoxy, carbon fiber, polyester, nylon, urethane, rayon, cotton, wool, stainless steel, zinc plated steel, aluminum alloys and petroleum pitch.

Figure 50:
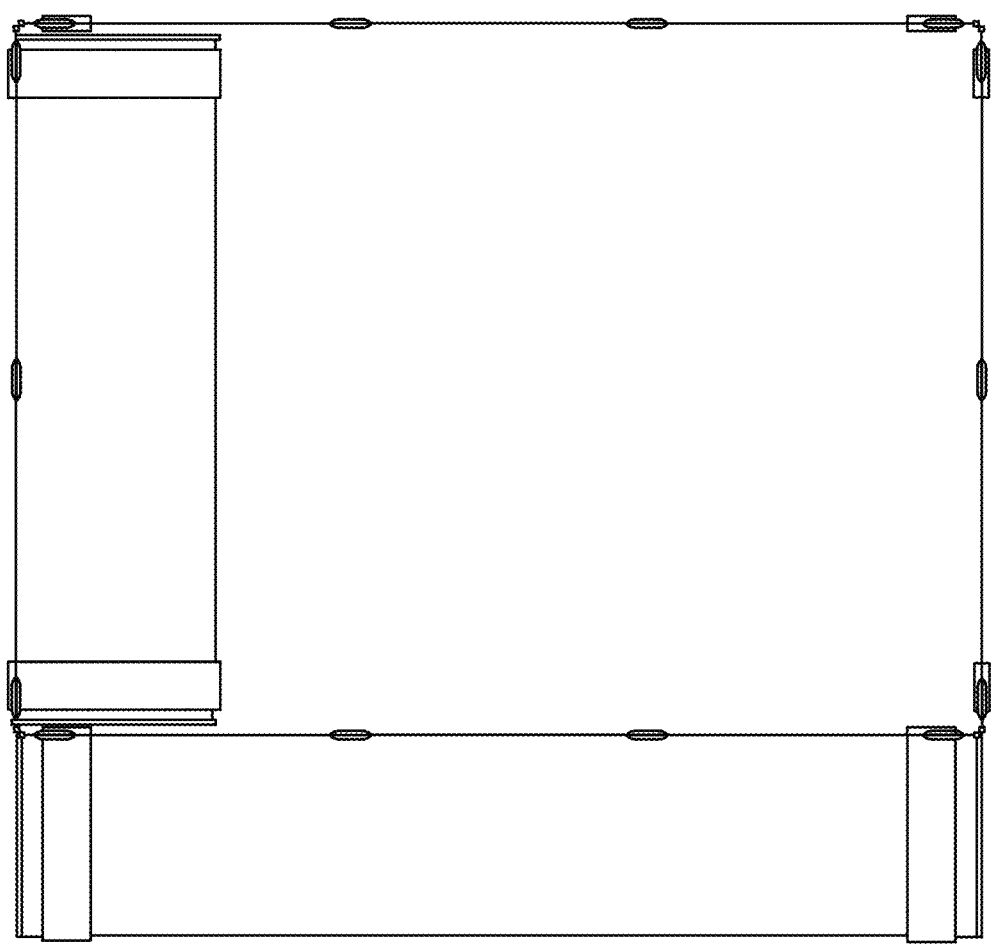
FIG. 50 is a bottom plan view of the device of FIG. 47.
Figure 57:
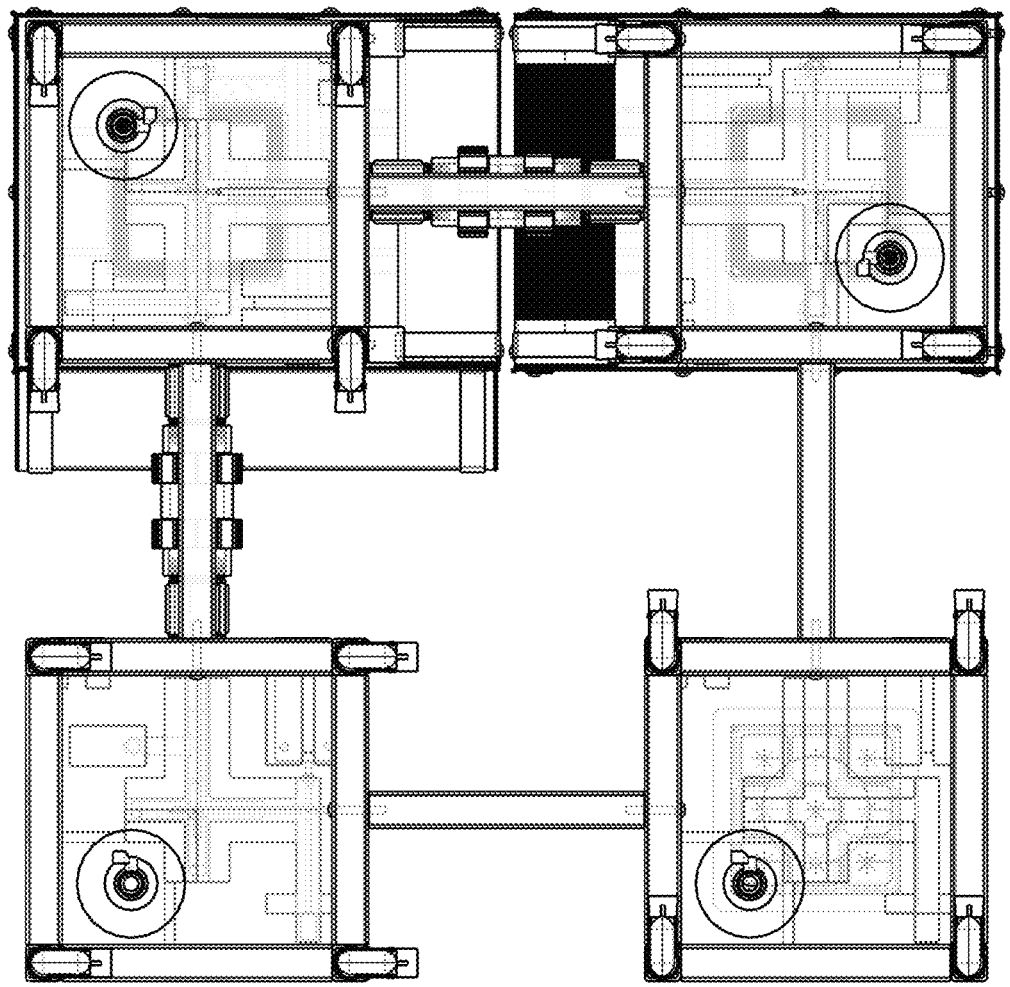
FIG. 57 is a bottom plan x-ray view of the device of FIG. 54.
Figure 58:
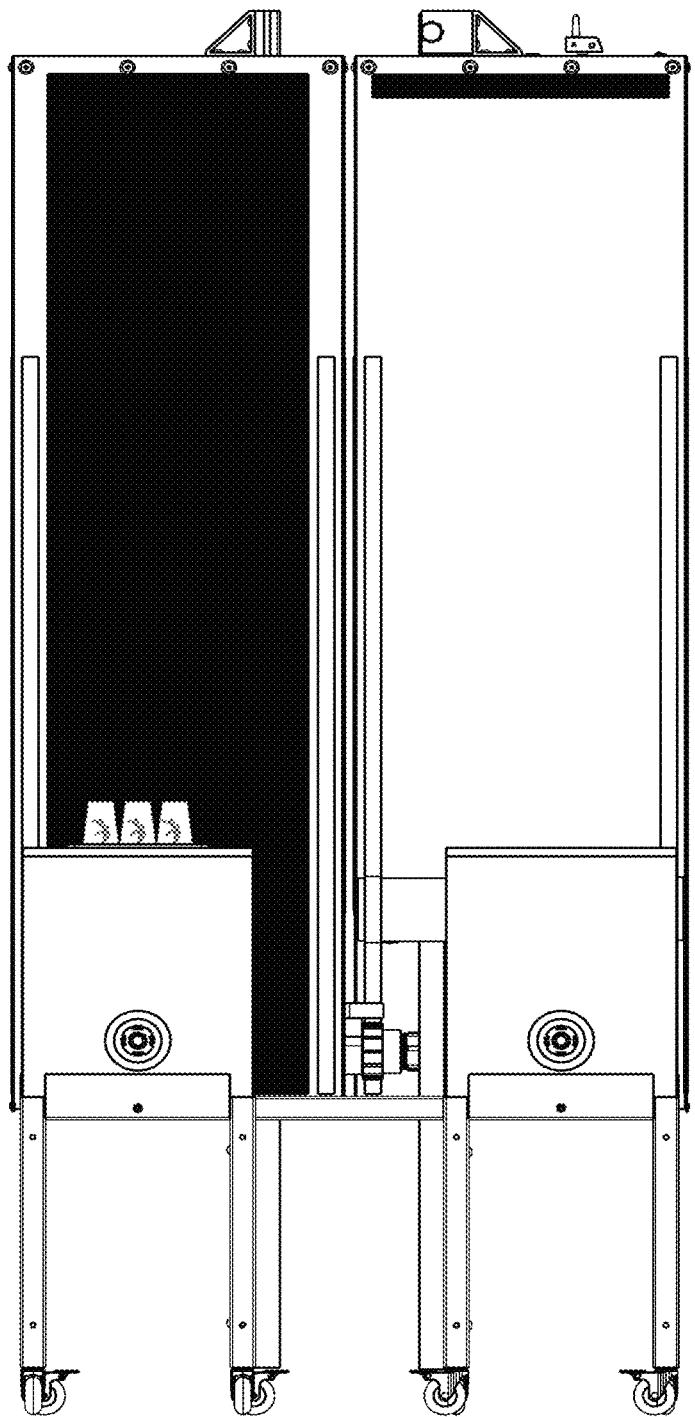
FIG. 58 is a side elevation view of the device of FIG. 54.

A preferred embodiment of an enclosure is comprised of at least a plurality of four vertical panels of flexible material, a plurality of four zippers 218 bonded along the vertical seams of each panel, a plurality of two lengths of hook 220 tape bonded vertically to one side on each of the plurality of four vertical panels and two lengths of eye 222 tape bonded vertically mirrored to the opposing side on each of the plurality of four vertical panels parallel and in proximity to the plurality of zippers; wherein the plurality of four zippers can be individually unzipped in an upward vertical direction allowing each panel to be rolled upon itself in either direction towards 214 or away 216 from the growing volume as presented in FIG. 50 and secured utilizing the hook and eye tape at a desired height in the previous order or in reverse which prevents interference with any device or object not limited to the ground, stand connection beam, vessel connection pipe 62 or vessel connection ball valve 64 as presented in FIG. 57 for PGS and plant maintenance. It will be appreciated that the method or presence of rolling an enclosure will not limit the scope of the invention to any method which allows an enclosure to modify its height. It will be appreciated that while the use of an enclosure within a PGS is optional, it can optimize the growth of the plant grown when utilized; wherein preferably two distinct enclosure devices are presented as a luminaire enclosure 224 in FIG. 47 for use in an indoor PGS and a net enclosure 232 in FIG. 51 for use in an outdoor PGS.

Luminaire Enclosure

Figure 47:
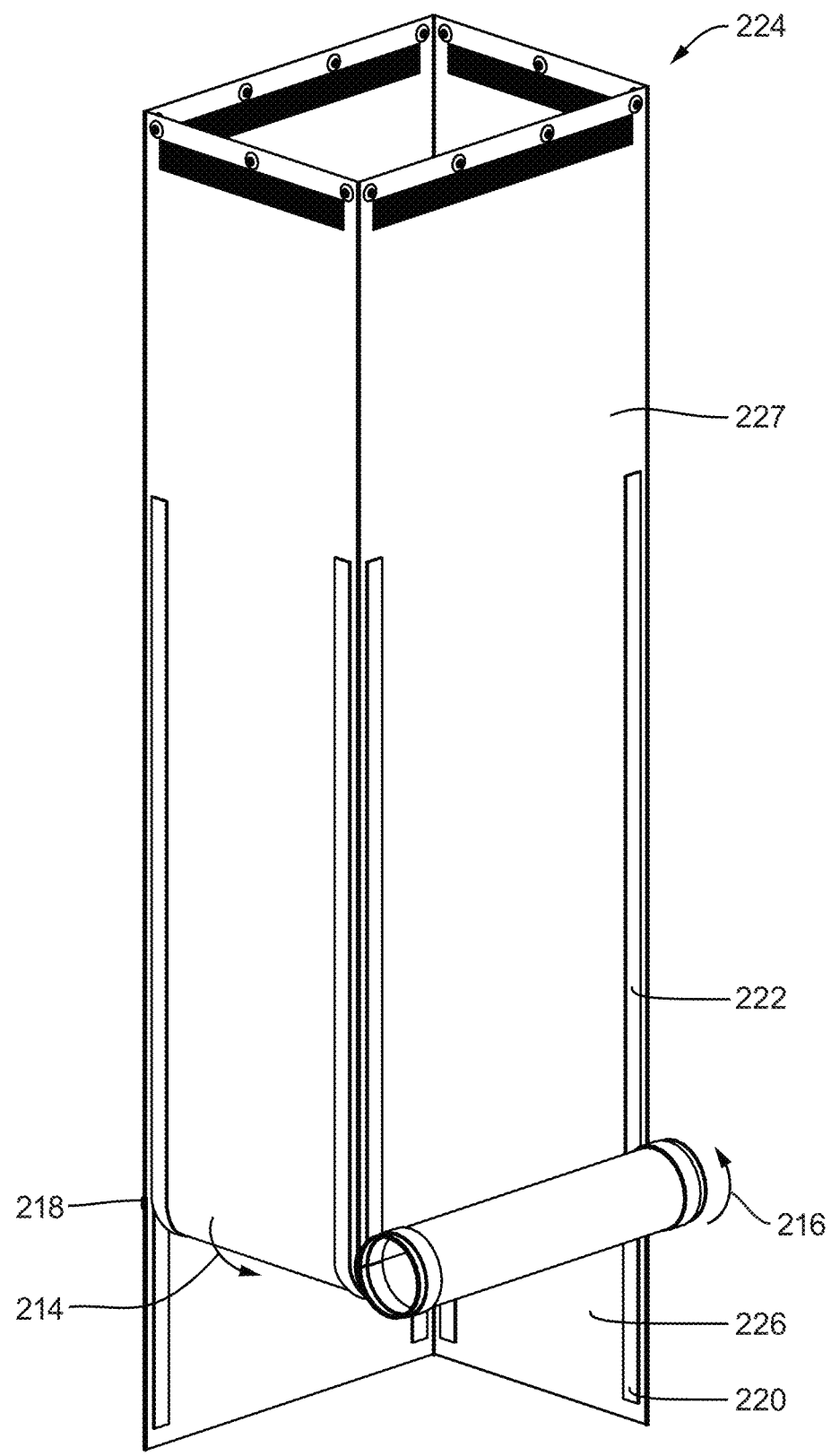
FIG. 47 is a perspective view of a luminaire enclosure device for growing plants and seedlings.

A luminaire enclosure 224, as presented in FIG. 47 is utilized within an indoor PGS to increase the efficiency of a luminaire 140 by reflecting light back toward the plant, to prevent unwanted light from penetrating into a growing volume, to shield the user from unwanted light exposure, to aid in the expulsion of warm exhaust generated from a luminaire away from the growing volume and to maintain ideal circulation, temperature and humidity levels within a growing volume.

Figure 48:
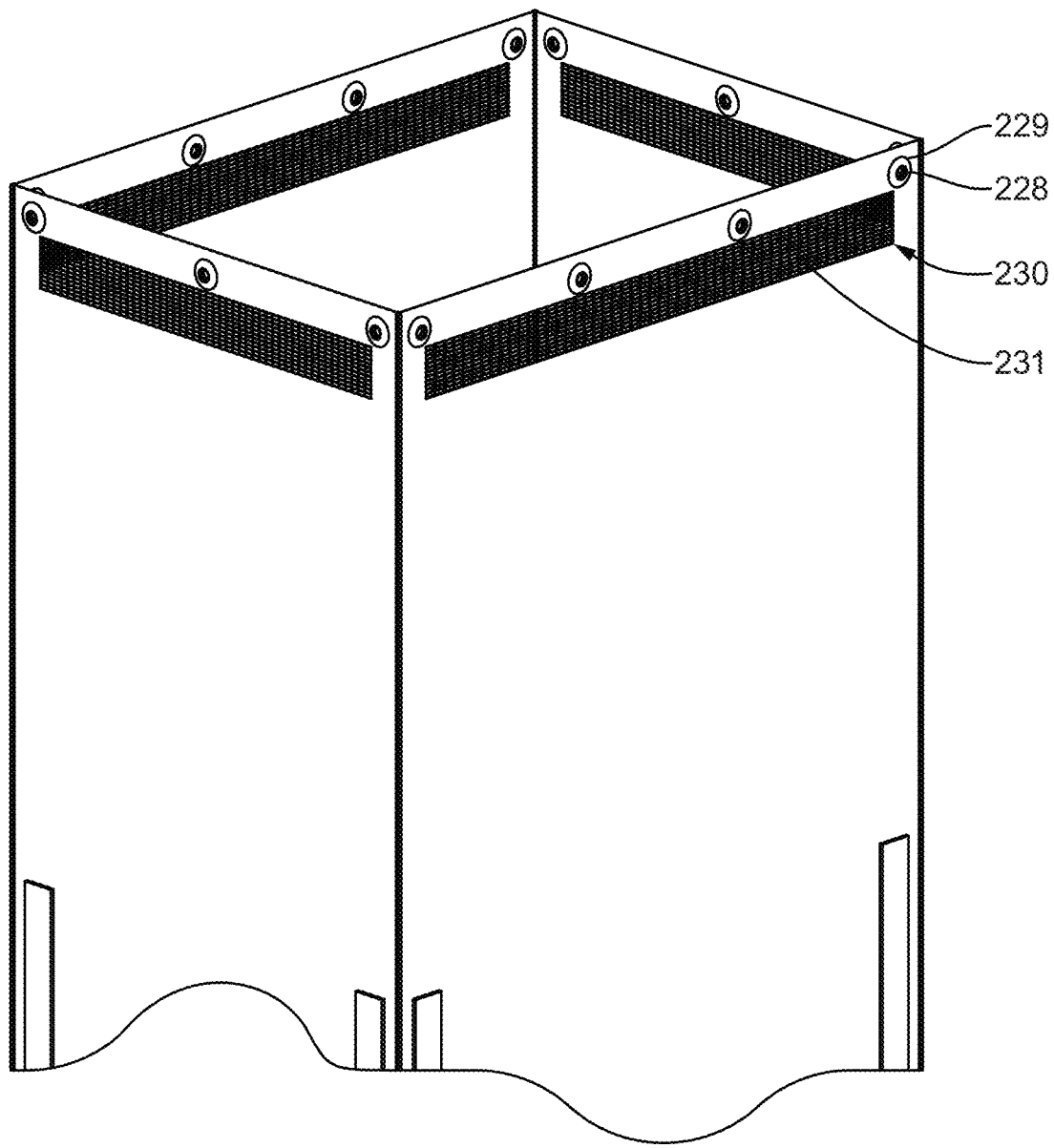
FIG. 48 is an enlarged partial superior perspective view of the device of FIG. 47.
Figure 49:
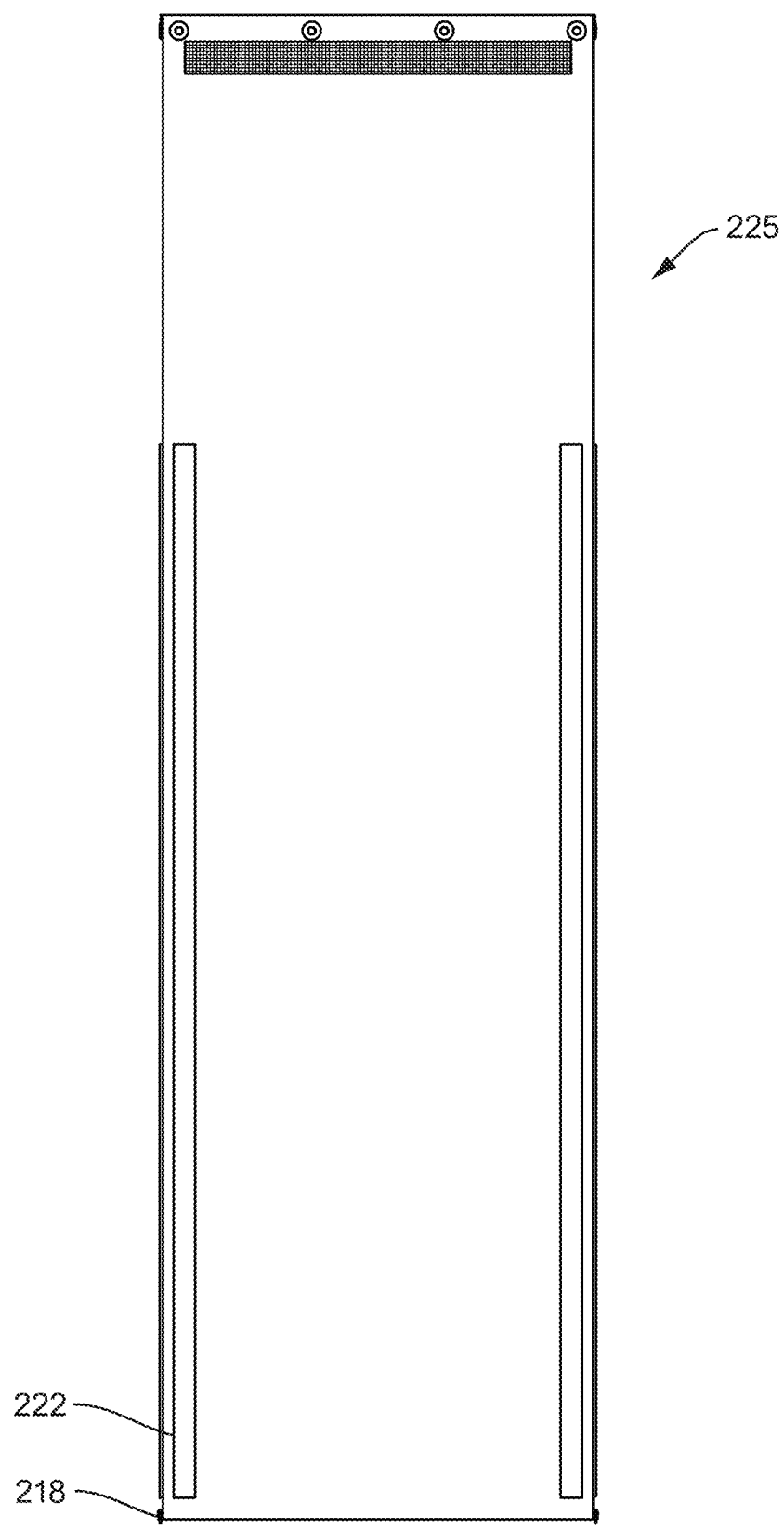
FIG. 49 is a side elevation view of the device of FIG. 47.

Preferably, a luminaire enclosure 224 is secured to a luminaire 140 via securing hardware 142 and a plurality of panel mounting grommets 229 as presented in FIG. 48 located parallel and in proximity to the superior seam on each luminaire enclosure panel 225 with an identical quantity, horizontal placement and spacing as the plurality of luminaire mounting apertures 152; wherein securing hardware 142 is inserted through a luminaire enclosure mounting panel mounting grommet aperture 228 and secured into a luminaire enclosure mounting aperture 152 as presented in FIG. 54.

Each luminaire enclosure panel 225 is preferably comprised of a combination bonded fabric; wherein a polyester or nylon fabric is bonded to a reflective material such as polyethylene terephthalate. A reflective side of a plurality of four panels 226 faces inward toward a growing volume; wherein a non-reflective side of a plurality of four panels 227 faces outward and away from a growing volume.

A luminaire enclosure 224 secured onto a luminaire 140 redirects light emitted from the luminaire toward a plant; wherein any wayward photons are reflected back towards a plant by the reflective face 226 of the plurality of four panels thus raising the efficacy of the luminaire and shielding the user from unwanted light pollution.

Within a growing volume, it can be advantageous for the performance of a desired plant 125 or seedling 93 or seed to maintain total darkness; wherein a luminaire enclosure 224 utilized within a PGS including a luminaire 140, a trellis 45, a vessel and a stand 22 can isolate a desired plant 125 or seedling 93 or seed from light.

Maintaining an optimal height of a luminaire 140 to coincide with a desired plant's 125 or seedling's 93 growth by positioning a lamp's 157 output as close to a plant canopy as possible without inflicting cellular damage increases the efficacy of a luminaire; wherein a luminaire enclosure 224 has the ability to shorten or lengthen the inferior hem length of each luminaire enclosure panel 225 as a luminaire changes its relative vertical height which prevents interference with any device or object not limited to the ground, stand connection beam, vessel connection pipe 62 or vessel connection ball valve 64 by unzipping a plurality of desired zippers 218 upward to a desired vertical height and rolling a desired luminaire enclosure panel 225 towards 214 or away 216 from the growing volume and utilizing the hook and eye tape 220, 222 to secure a luminaire enclosure panel 225 upon itself at a desired height.

As presented in FIG. 48, it is possible and preferable for the embodiment shown for each luminaire enclosure panel 225 to contain at least one aperture 230 located on the superior end of a luminaire enclosure 224 to aid in exhausting warm air produced from a lamp 157 or plurality of lamps within a luminaire 140. It will be appreciated that it is possible to construct a luminaire enclosure panel 225 without an air exhaust aperture 230; wherein a plurality of luminaire enclosure mounting apertures 152 can be located below a plurality of upper housing luminaire air exhaust aperture 198. Preferably a plurality of luminaire enclosure panel air exhaust apertures 230 is produced from a nylon or polyester net fabric 231 bonded on the superior end of a luminaire enclosure panel 225 over a singular luminaire enclosure panel air exhaust aperture 230 corresponding to the dimensions and the coordinates of a plurality of upper housing luminaire air exhaust apertures 198.

In conjunction with the use of a secured luminaire 140 within a PGS, preferably a plurality of secured luminaire enclosure panels 225 extend below a vessel and a reflector 28 providing an enclosed growing volume of air which can be controlled with the aid of fans 190 secured between four sets of a plurality of apertures 197 and 203 and respective air ducts 202 located within a luminaire 140; wherein additional growing volume air circulation fans can be located within a trellis reflector 28. It will be appreciated that fans 190 utilized within a PGS for air circulation can incorporate optional temperature and humidity sensor circuits within a growing volume to achieve a desired temperature, humidity and air circulation.

The temperature and humidity within a luminaire enclosure and indoor growing volume is dependent on the indoor temperature and humidity wherein a PGS is installed and can be controlled utilizing standard heating, ventilation and air conditioning components and systems.

Net Enclosure

Figure 51:
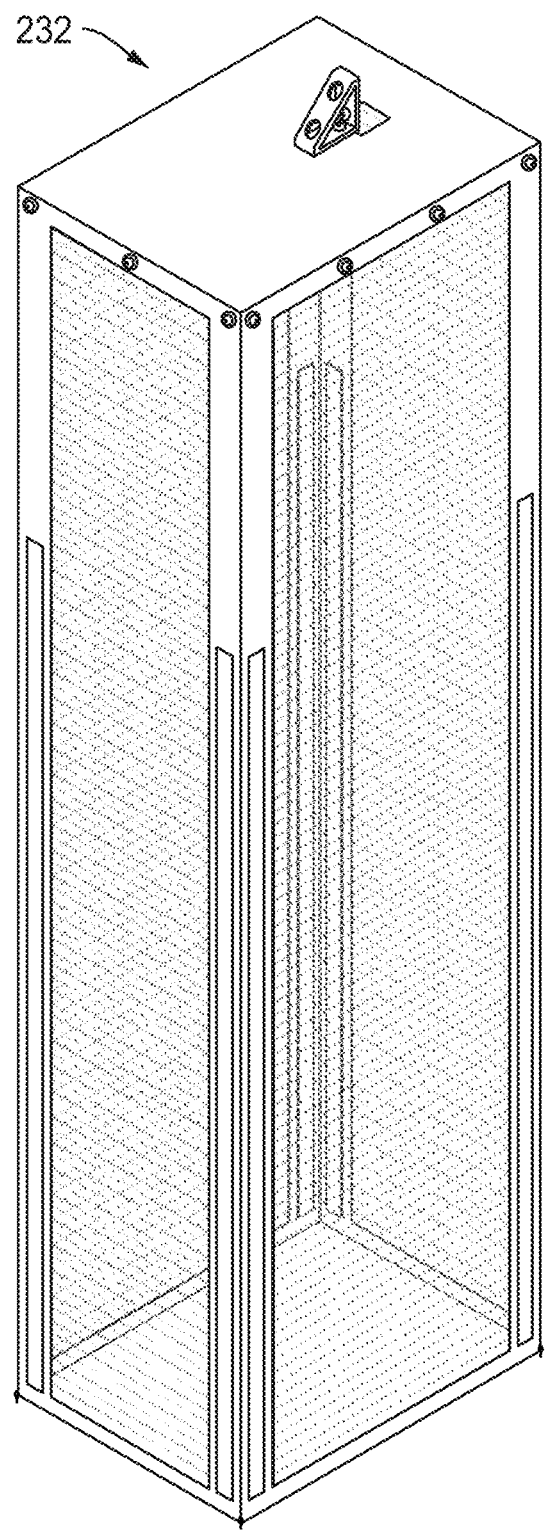
FIG. 51 is a perspective view of a net enclosure device for growing plants and seedlings.

A net enclosure 232, as presented in FIG. 51 is utilized outdoors within a PGS to optimize the growth of a desired plant 125 or seedling 93 by allowing optimal levels of sunlight and wind to penetrate a growing volume while preventing pests through a plurality of apertures.

A preferred embodiment of a net enclosure consists of a plurality of four net enclosure panels 233 secured to a net enclosure lid 234 utilizing securing hardware 240; wherein a net enclosure lid is secured to the anterior trellis tower 32 channel 34 via a net enclosure bracket 236 utilizing securing hardware 237. It will be appreciated that a plurality of net enclosure panels, a net enclosure lid and a net enclosure bracket can be designed as individual components utilizing securing hardware or designed and considered as one device or a plurality of devices.

Preferably, a net enclosure bracket 236 bonds a net enclosure lid and a plurality of four secured net enclosure panels 233 to a trellis tower 32 via securing hardware 237 within a trellis tower 32 anterior channel 34 and a plurality of two lid bracket mounting aperture 246 as presented in FIG. 59; wherein by adjusting the tension of the securing hardware 237 within a anterior trellis tower 32 channel 34 the user is able to infinitely adjust and secure a desired vertical position of a net enclosure.

Figure 52:
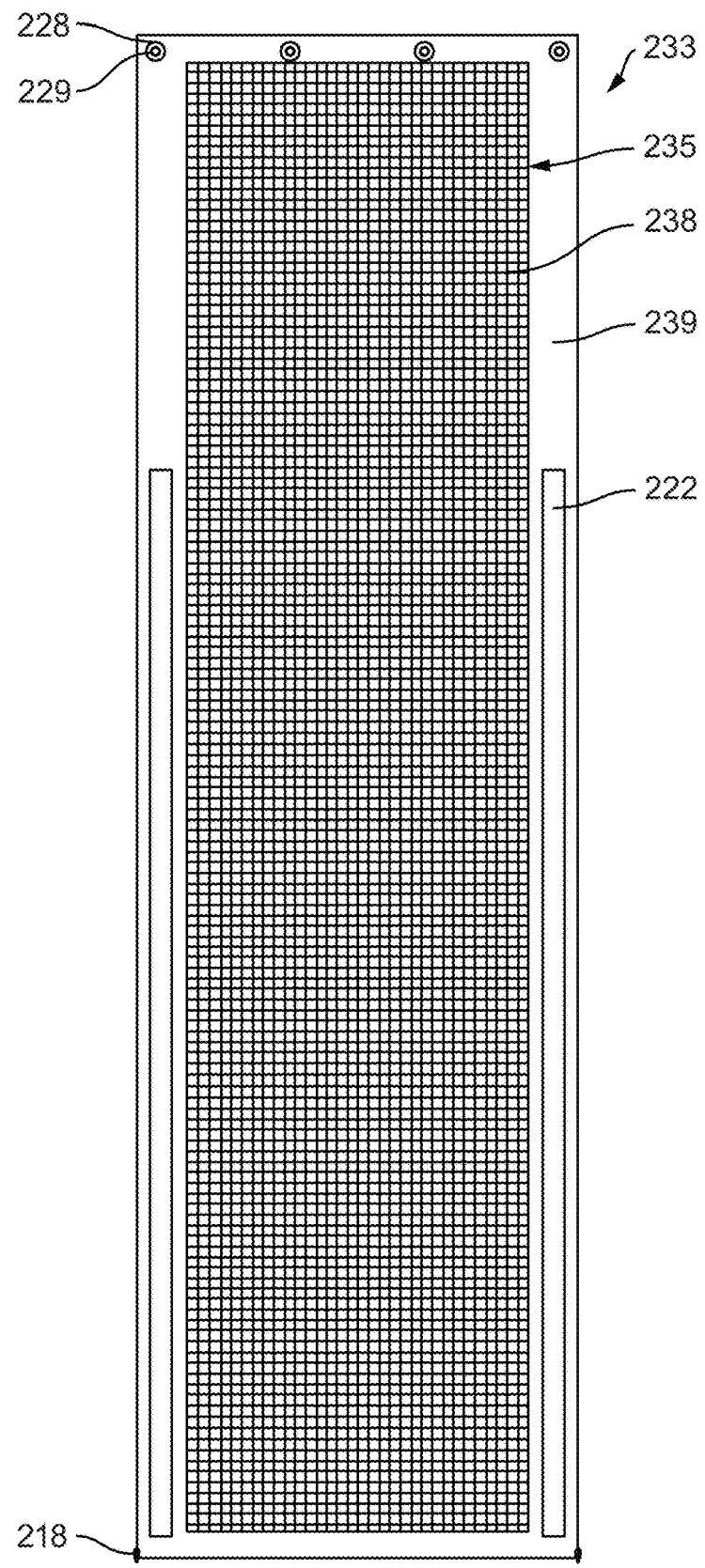
FIG. 52 is a side elevation view of the device of FIG. 51 without a net enclosure lid device.

A net enclosure panel 233 as presented in FIG. 52, is preferably constructed of a flexible, durable, high tensile strength, ultraviolet resistant material such as polyester, nylon or a combination of materials; wherein a net enclosure panel is preferably comprised of a frame 239 with central aperture 235 to which a net fabric 238 is bonded.

Apertures within a net fabric 238 can be specified to offer an optimal shade percentage and air transmission per a desired plant 125 or seedling 93 and insects prohibited. For example, general mesh guidelines for a majority of plants specify a 15-25% shade percentage and a 30-60% air transmission equating to an aperture diameter range of 0.3 $mm^2$ to 0.7 $mm^2$ in contrast to the average size of a standard Aphid (*Aphididae*) throughout its lifecycle measuring between 1 mm to 7 mm in diameter.

PGS and plant maintenance access can be achieved utilizing a net enclosure in the following order or in reverse by unzipping a plurality of desired zippers 218 upward to a desired vertical height and rolling a desired net enclosure panel 233 towards 214 or away 216 from the growing volume and utilizing the hook and eye tape 220, 222 to secure a net enclosure panel 233 upon itself at a desired height.

A plurality of grommets 229 is located within a net enclosure frame 239 in proximity to the superior seam horizontally and parallel as presented in FIG. 52.

A net enclosure lid 234 is preferably made of high flexural strength, ultraviolet and corrosion resistant materials not limited to stainless steel, zinc plated steel, aluminum, polypropylene and carbon fiber.

Figure 53:
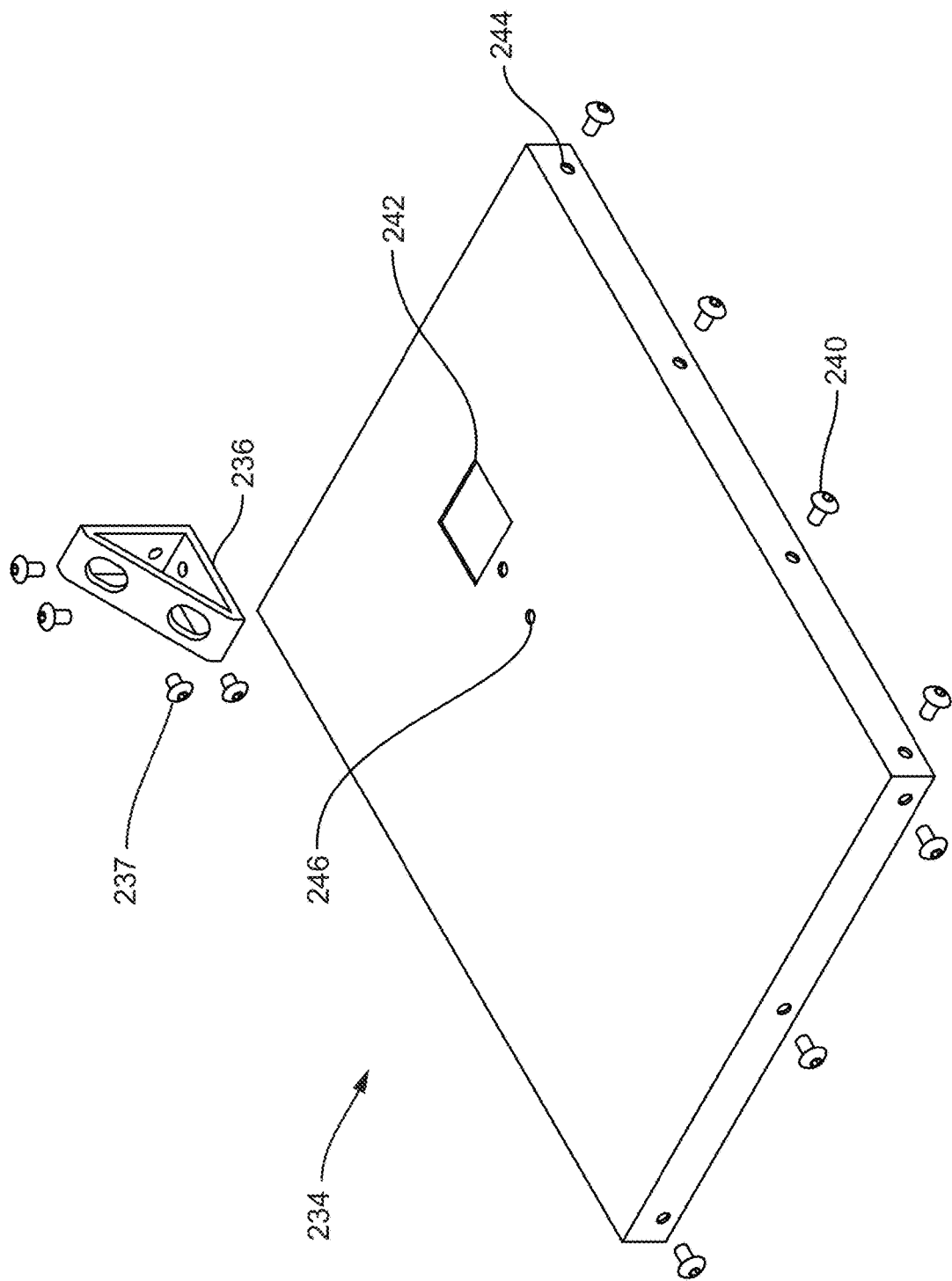
FIG. 53 is an exploded perspective view of a net enclosure lid device of the device of FIG. 51 incorporating securing hardware.

A preferred embodiment of a net enclosure lid as presented in FIG. 53 is comprised of a horizontal plane comprising at least one central aperture 242 to accommodate the passage of a trellis tower 32, a plurality of two central bracket mounting apertures 246 utilizing securing hardware 237 which bonds a net enclosure lid to a net enclosure bracket, a plurality of four vertical planes which contain a plurality of net enclosure lid panel mounting apertures 244 positioned horizontally and in parallel; wherein securing hardware 240 inserted through an enclosure panel mounting grommet aperture 228 secures a net enclosure panel 233 within a lid panel mounting aperture 244.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

From the foregoing description, one skilled in the art can easily ascertain the essential characteristics of this invention and, without departing from the spirit and scope thereof, can make various changes and modifications of the invention to adapt it to various usages and conditions.

I claim:

1. A modular personal growing system capable of indoor and outdoor operation comprising:
   a) Modular vessel for holding liquid, said vessel having:
   at least one vessel floor (57) having at least one floor aperture (58), at least one vessel wall (63) having at least one vessel overflow aperture (56) spaced above a liquid fill or capacity line configured to evacuate liquid from the modular vessel, at least one vertical connection aperture (52) below a liquid fill or capacity line on said vessel wall, b) and a modular stand (22) to support said vessel, said stand having:

four crossbeams (4) attached at right angles adapted to support said vessel floor a plurality of legs, at least one of said legs having a leg mounting aperture (6), and at least one of said crossbeams (4) having a mounting aperture (8), configured to bond said modular stand to another said modular stand, wherein said stand contains at least one opening for maintenance and wherein said modular vessel can operate as a propagation vessel (92), a reservoir vessel (124) and a growing vessel (126).

2. The personal growing system of claim 1, further comprising a vessel lid (48) which may optionally contain one or more apertures (98, 100).

3. The personal growing system of claim 1, wherein an electrical cord (123) passes from the outside to the inside of said vessel through a vertical aperture to a powered accessory that is an air pump (66), a water pump (68), a water heater (70), a water fogger (104), fertigation device(72), and/or a sensor circuit.

4. The personal growing system of claim 3, wherein within the powered accessory is an air pump (66), a water pump (68), a water heater (70), a water fogger (104), and/or an automatic fertigation device (72).

5. The personal growing system of claim 1, wherein said vessel for holding liquids further contains an air pump supported on an air pump support plateau spaced above a liquid fill or capacity line.

6. The personal growing system of claim 1, wherein said at least one floor aperture (58), is located on a most inferior vessel floor drainage plane (59) to provide drainage and filling of nutrient solution to said personal growing system.

7. The personal growing system of claim 1, wherein said at least one floor aperture (58), provides a connection for threaded tubing (85), a ball valve (84), a fill valve (80) and/or a water chiller (82).

8. The personal growing system of claim 1, wherein said vertical connection aperture (52) connects via a connecting pipe (62) to another said modular vessel or said vertical connection aperture (52) may be sealed with an end cap (94).

9. The personal growing system of claim 8, wherein pressurized air and water tubing pass through said connecting pipe (62).

10. The personal growing system of claim 1, wherein said modular vessel is a propagation vessel (92) further comprising a lid comprising at least one aperture and at least one device for maintaining humidity within the propagation vessel.

11. The personal growing system of claim 1, wherein said modular vessel is a growing vessel (126) with at least one device for injecting oxygen into a nutrient solution.

12. The personal growing system of claim 1, wherein said modular vessel is a reservoir vessel (124) further comprising at least one device to create air pressure and at least one device to create water pressure.

13. The personal growing system according to claim 1, wherein said at least one leg(16) comprises four legs attached to and descending from said crossbeams, at least one of said legs containing a leg mounting aperture (6).

14. The personal growing system of claim 1, wherein a bracket (20) is secured to said modular stand.

15. The personal growing system of claim 1, further comprising a trellis comprising at least one tower (32) and at least one mounting leg (24) which contains at least one mounting point (31) to secure to said stand.

16. The personal growing system according to claim 15, comprising a plant support arm.

17. The personal growing system of claim 15, further comprising a luminaire (140), said luminaire comprising at least one lamp (157), one mounting point and one vertical movement aperture (148) to allow vertical movement on said trellis tower (32).

18. The personal growing system of claim 17, wherein said luminaire (140) further comprises at least one fan (190) configured to direct air within a growing volume.

19. The personal growing system of claim 15, wherein said trellis further comprises at least one fan (190) configured to direct air within a growing volume.

20. The personal growing system of claim 1, further comprising an enclosure, said enclosure comprising at least one panel which can surround a plant growing within said vessel.

21. The personal growing system of claim 1, wherein said stand (22) connects to a trellis (45), on which said vessel body (46) and vessel lid (48) can be supported and from which a luminaire (140) and a respective enclosure (224), (232) can be suspended.

22. The personal growing system of claim 1, wherein said vessel is plastic, a plastic polymer, a resin or a reinforced resin comprising polyvinyl chloride, polyethylene, polypropylene, carbon, glass, graphite, polyacrylonitrile, epoxy, polyester, nylon, urethane, rayon and petroleum pitch and stand comprising aluminum, zinc plated steel, stainless steel, carbon fiber or a high flexural strength material that resists oxidation without limitation.

23. The personal growing system of claim 1, wherein said vessel further includes growing media that is expanded clay pellets, open cell foam, non-woven melted plastic, non-woven melted rock, non-woven melted glass, coco coir, peat moss, expanded volcanic glass, volcanic stone, melted glass and calcium carbonate combination stones, rice hulls, pumice stone, gravel, wood fiber, brick, polystyrene, vermiculite and/or a combination thereof.

* * * * *